US012663085B2

(12) United States Patent
Vu

(10) Patent No.: US 12,663,085 B2
(45) Date of Patent: Jun. 23, 2026

(54) CONTROLE PLATE FOR A HIGH CONDUCTANCE VALVE

(71) Applicant: Illinois Tool Works Inc., Glenview, IL (US)

(72) Inventor: Kim Ngoc Vu, Yorba Linda, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/045,336

(22) Filed: Feb. 4, 2025

(65) Prior Publication Data

US 2025/0180125 A1     Jun. 5, 2025

Related U.S. Application Data

(63) Continuation of application No. 18/403,669, filed on Jan. 3, 2024, now Pat. No. 12,215,790, which is a continuation of application No. 17/127,909, filed on Dec. 18, 2020, now Pat. No. 11,885,420, which is a continuation of application No. 16/808,342, filed on Mar. 3, 2020, now Pat. No. 11,248,708, which is a continuation-in-part of application No. 16/178,247, filed on Nov. 1, 2018, now Pat. No. 10,364,897, which is a continuation-in-part of application No. 15/997,172, filed on Jun. 4, 2018, now Pat. No. 10,323,754.

(60) Provisional application No. 62/515,063, filed on Jun. 5, 2017.

(51) Int. Cl.
    *F16K 1/42*     (2006.01)
    *F16K 1/36*     (2006.01)

(52) U.S. Cl.
    CPC . *F16K 1/42* (2013.01); *F16K 1/36* (2013.01)

(58) Field of Classification Search
    CPC ................. F16K 1/42; F16K 1/36; F16K 1/44
    See application file for complete search history.

(56) References Cited

U.S. PATENT DOCUMENTS

| | | | |
|---|---|---|---|
| 2011/0197985 A1* | 8/2011 | Fontenit | F16K 1/446 |
| | | | 137/625.19 |
| 2013/0192690 A1* | 8/2013 | Neuhauser | F16K 1/443 |
| | | | 137/237 |
| 2017/0037974 A1* | 2/2017 | Sauer | F16K 1/446 |

\* cited by examiner

*Primary Examiner* — Patrick C Williams

(74) *Attorney, Agent, or Firm* — McAndrews, Held & Malloy, Ltd.

(57)     ABSTRACT

A high purity control valve for use in high conductance, proportional control applications includes a moveable control plate having a flow-through passage to enhance fluid sweep of the internal valve volume. Nested orifice ridges are used to achieve high conductance with small actuator movement. Enhanced leak tightness can be provided by incorporating into the control plate materials softer than the material comprising the orifice ridge. The control plate comprises a control plate body having a counterbore in fluid communication with a conduit, radial fluid flow paths and axial fluid flow paths. A flat side of the control plate includes a continuous uninterrupted flat portion to shut-off fluid flow in the valve. The radial fluid flow paths provide fluid communication from the counterbore to a circumferential perimeter of the control plate and the axial fluid flow paths provide fluid communication with the fluid conduit through an intermediate valve chamber portion.

11 Claims, 27 Drawing Sheets

100

120    121    112    116

I    I 190    164

121
120    159    121
158    120
164
110    114
190
154    112    116

SECTION I-I 121
159    120
154
158

SECTION II-II

SECTION III-III

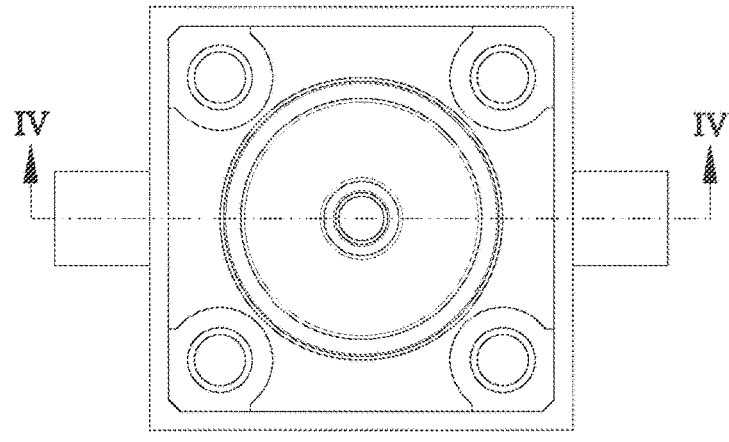
FIG. 4A
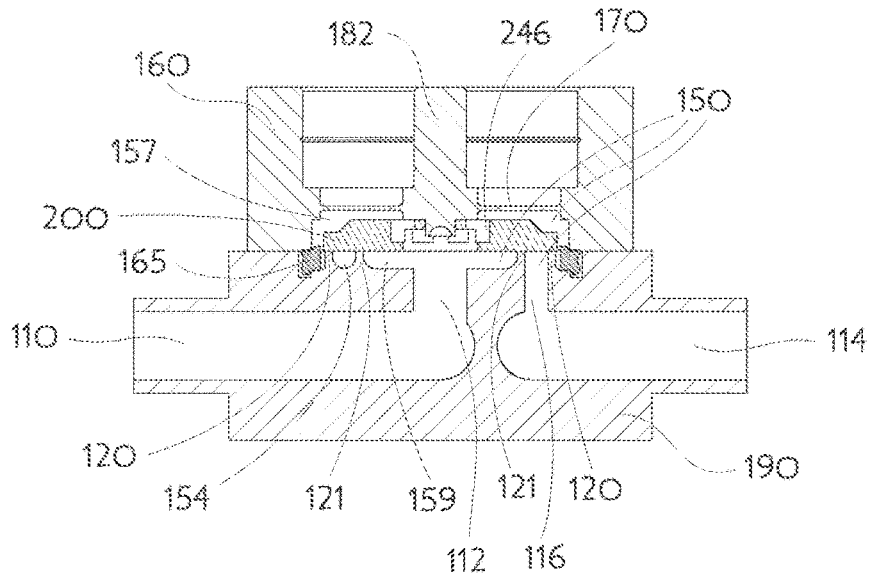
SECTION IV-IV
FIG. 4B
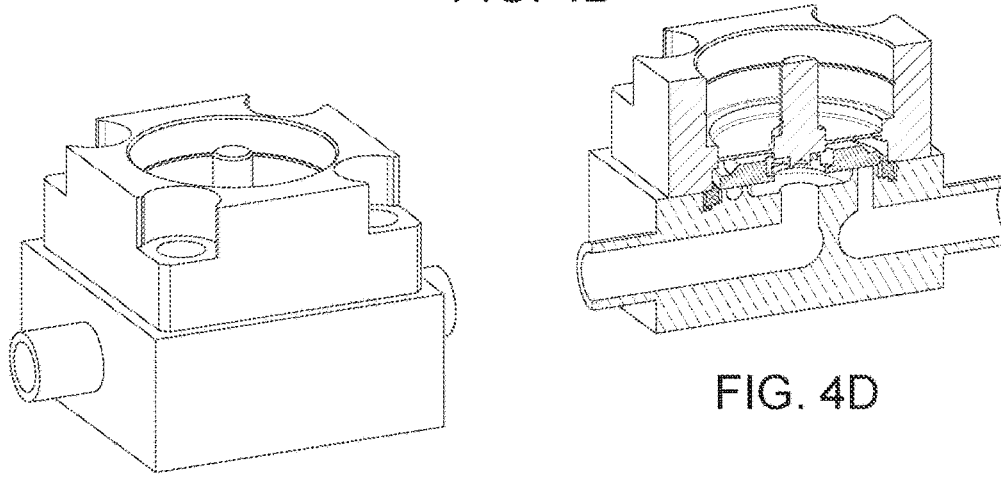
FIG. 4C
FIG. 4D

SECTION V-V

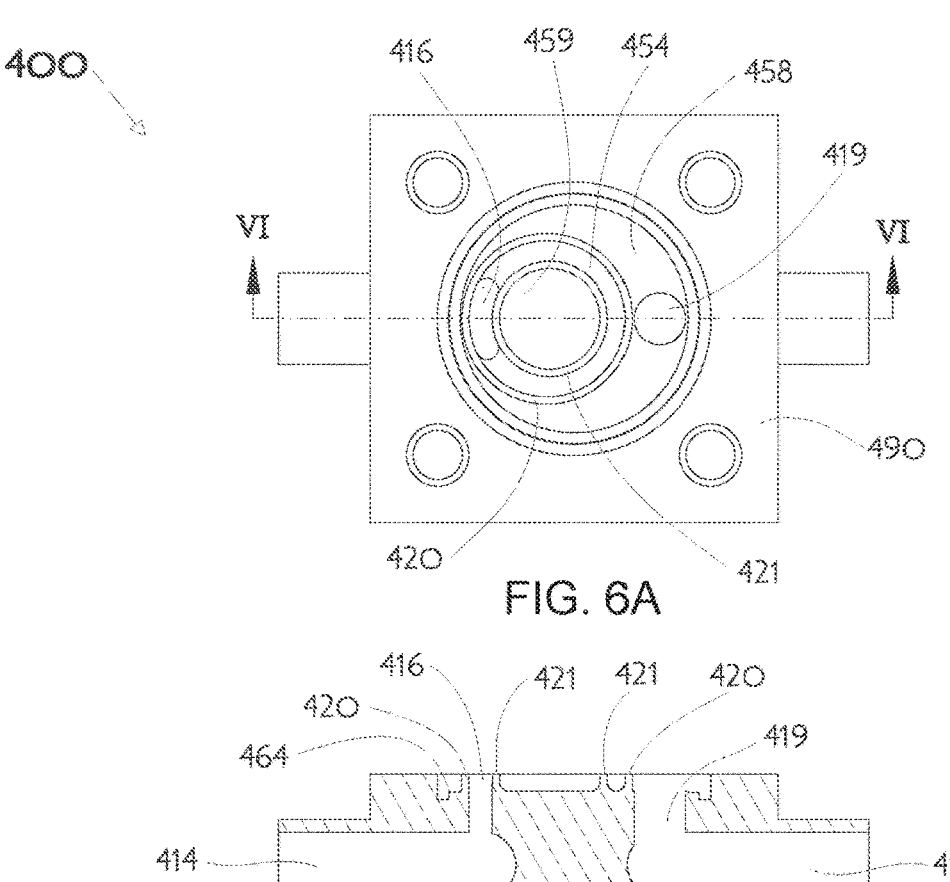
FIG. 6A
FIG. 6B
SECTION VI-VI
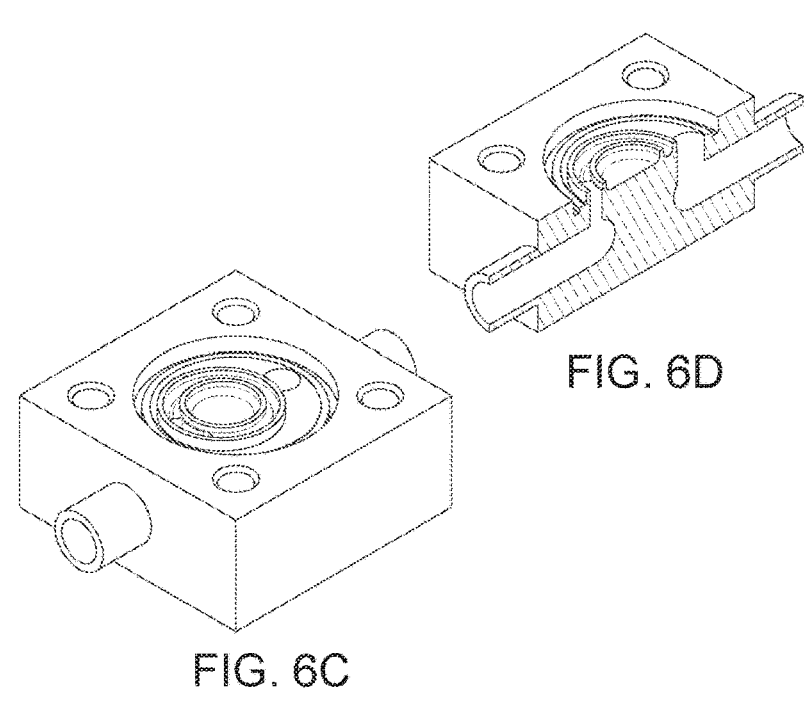
FIG. 6D
FIG. 6C

SECTION VII-VII

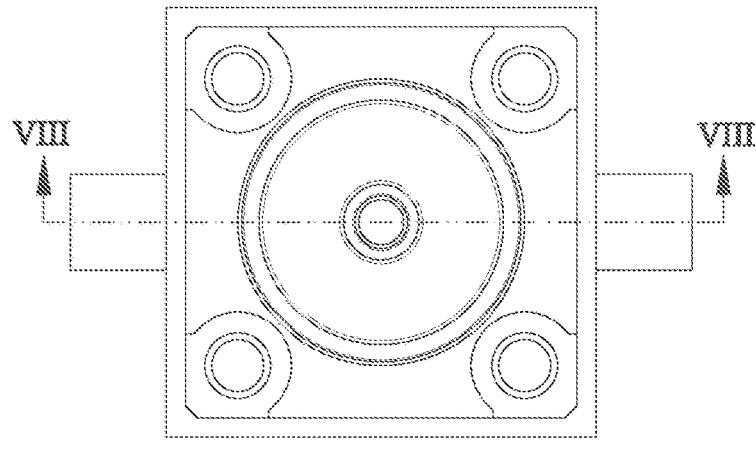
FIG. 8A
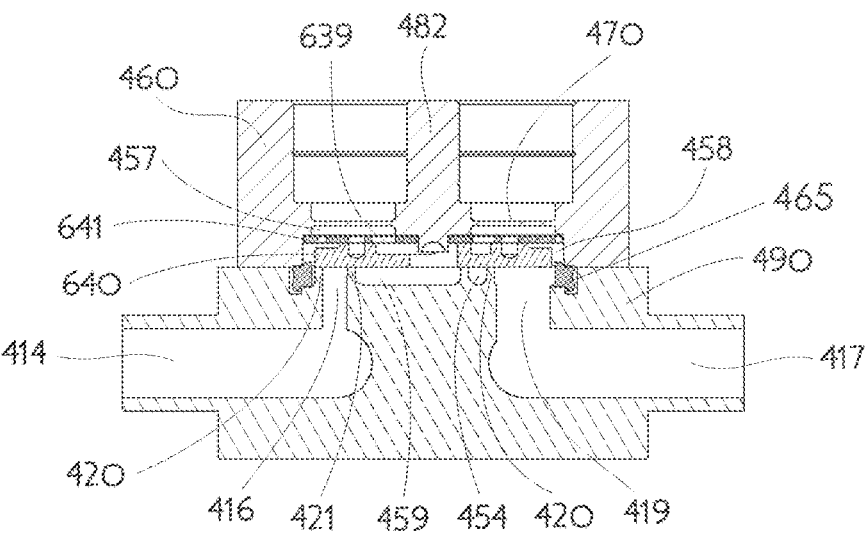
SECTION VIII-VIII
FIG. 8B
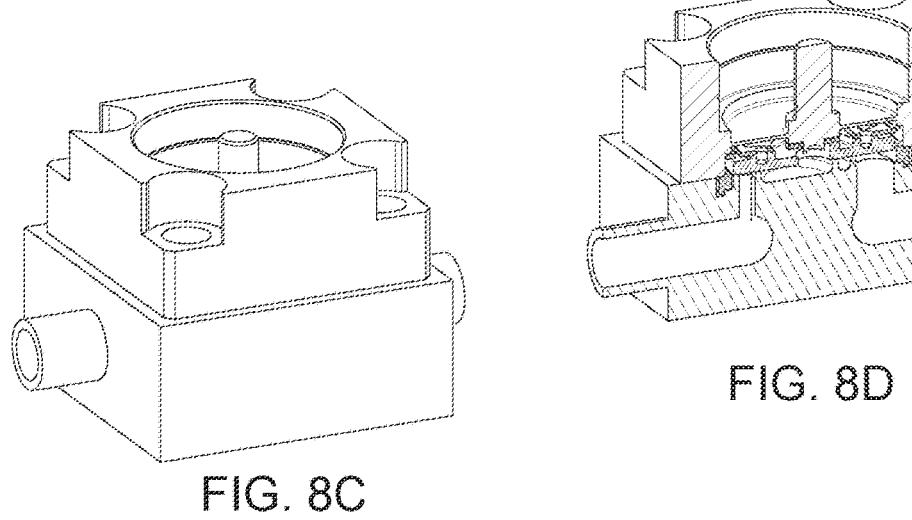
FIG. 8C
FIG. 8D

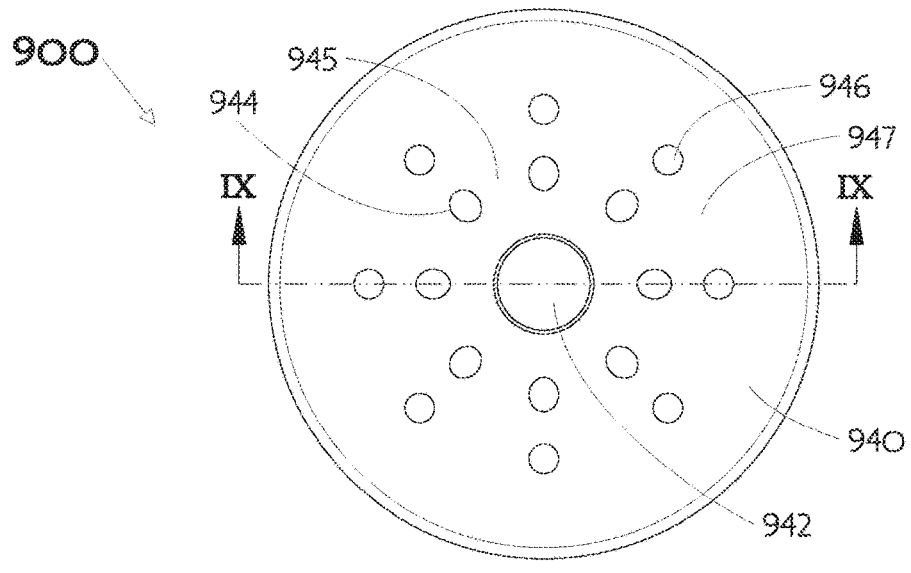
FIG. 9A
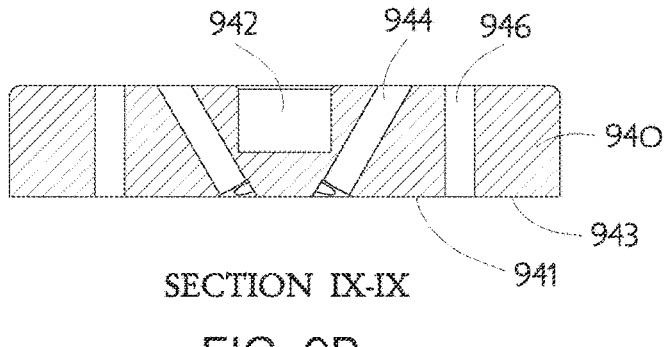
SECTION IX-IX
FIG. 9B
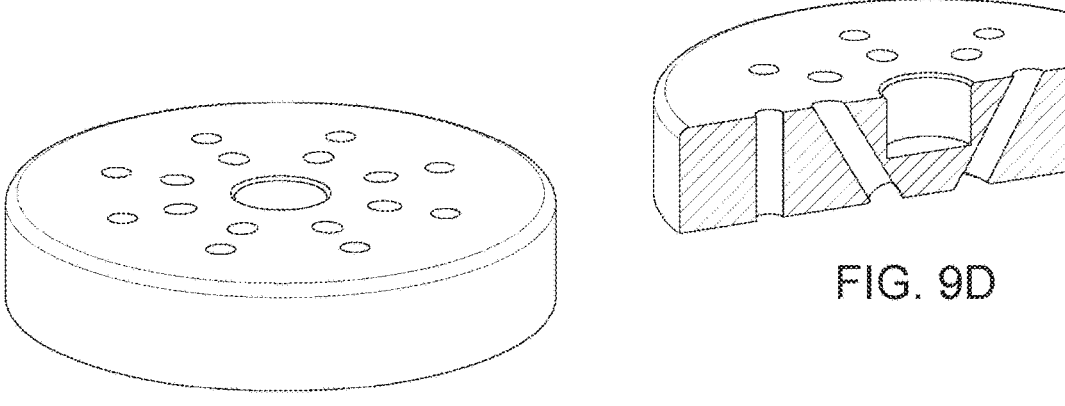
FIG. 9C
FIG. 9D

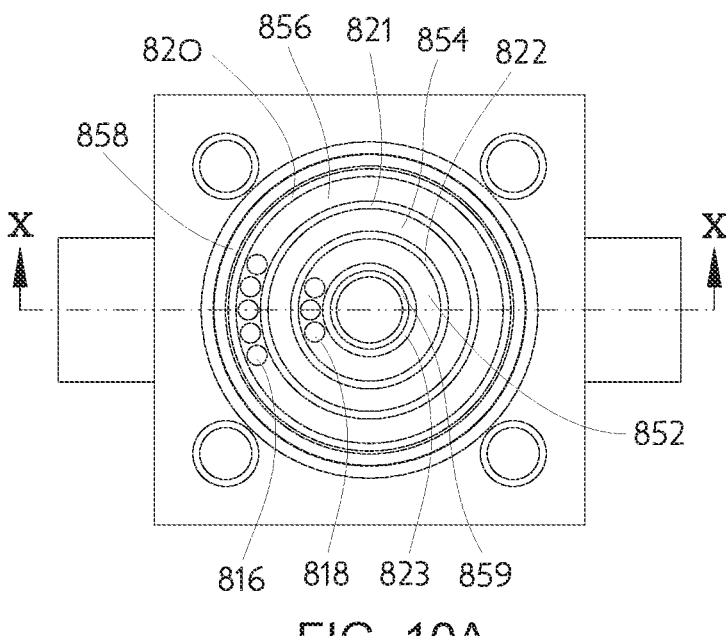
FIG. 10A
SECTION X-X
FIG. 10B
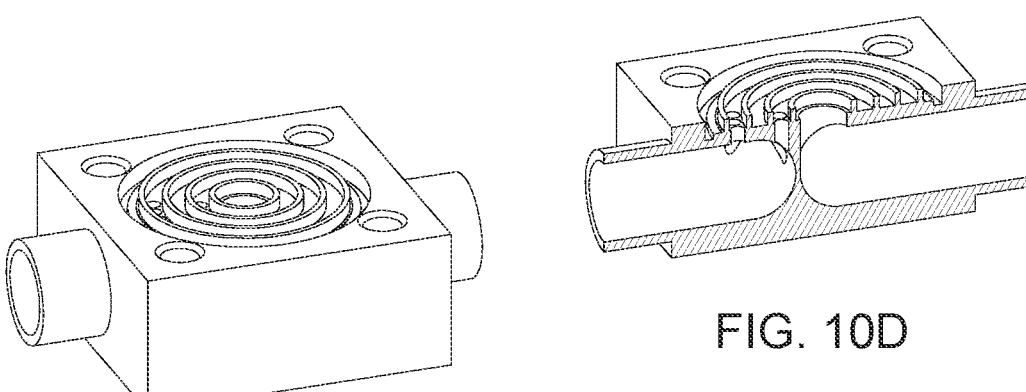
FIG. 10C
FIG. 10D

1000
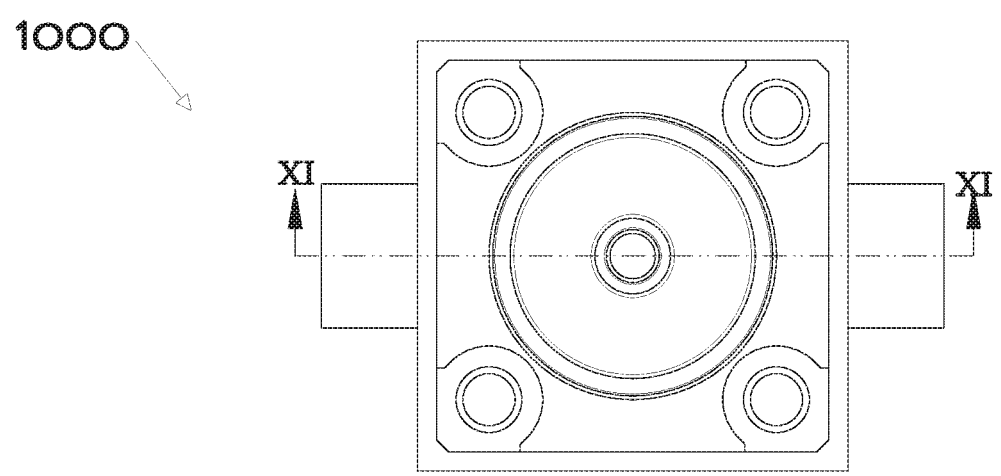
FIG. 11A
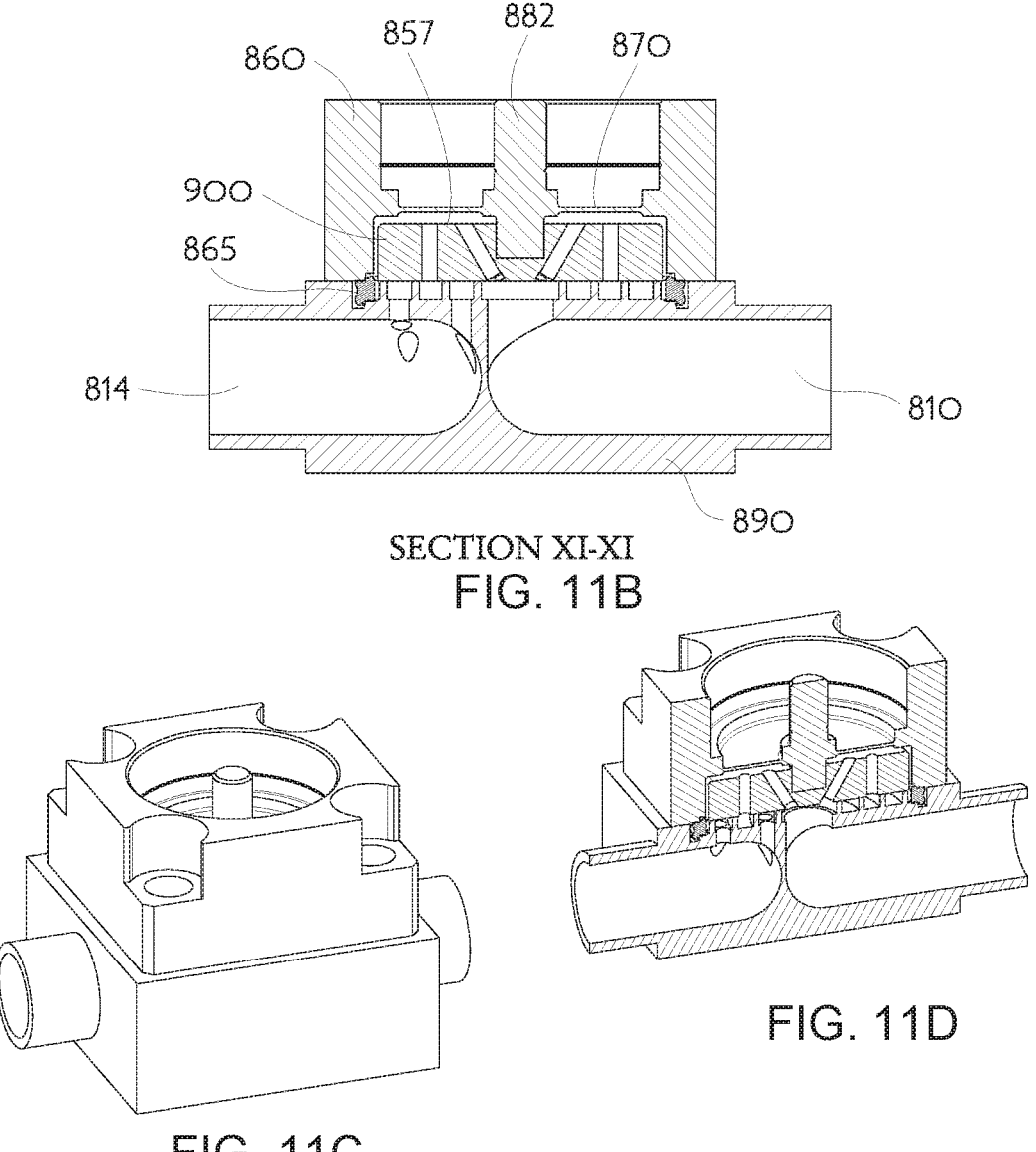
857   882
860           870
900
865
814                                810
890
SECTION XI-XI
FIG. 11B
FIG. 11C
FIG. 11D

FIG. 12B          SECTION XII-XII

1300

SECTION XIII-XIII

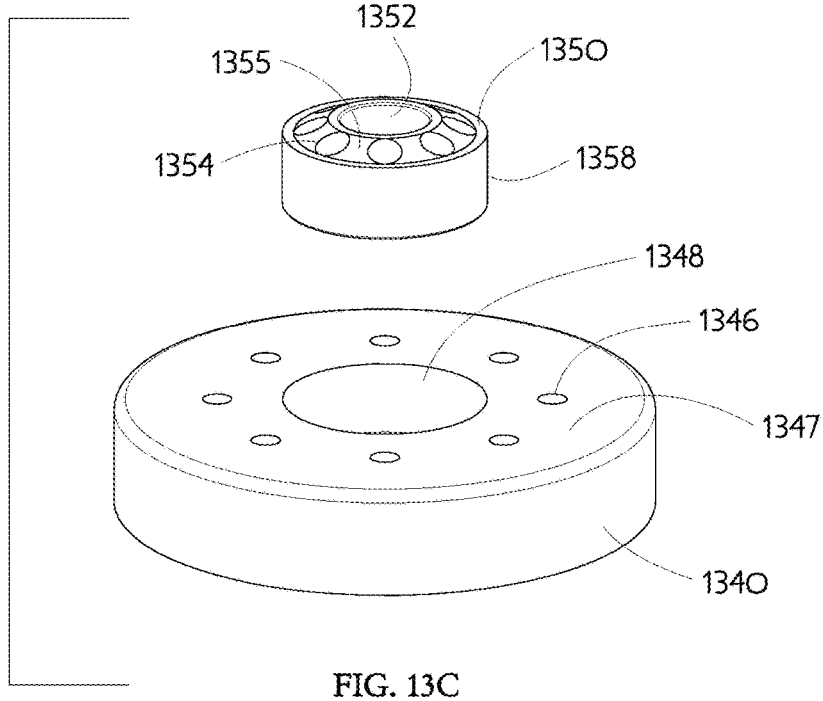
FIG. 13C
1300
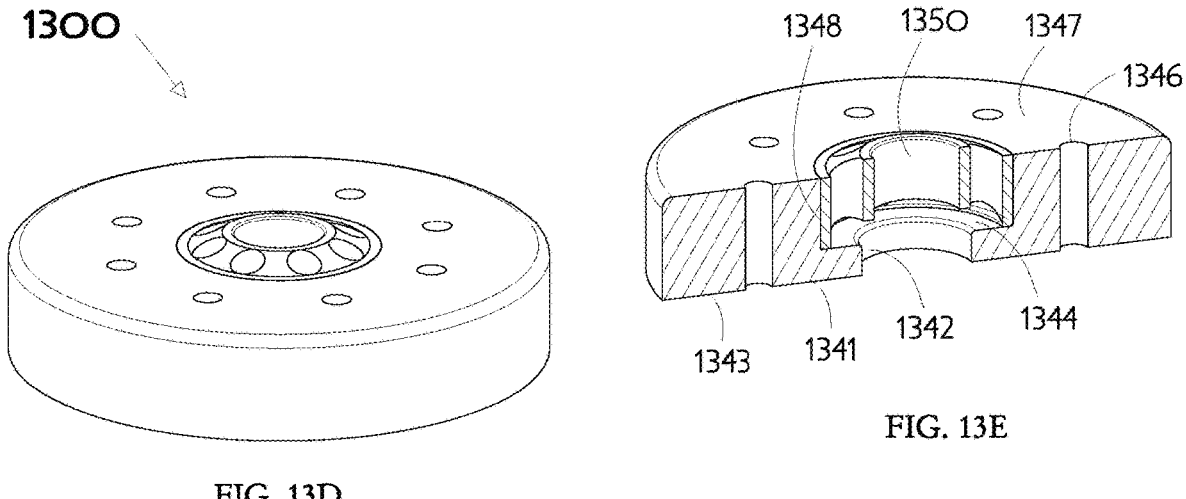
FIG. 13D
FIG. 13E

1400
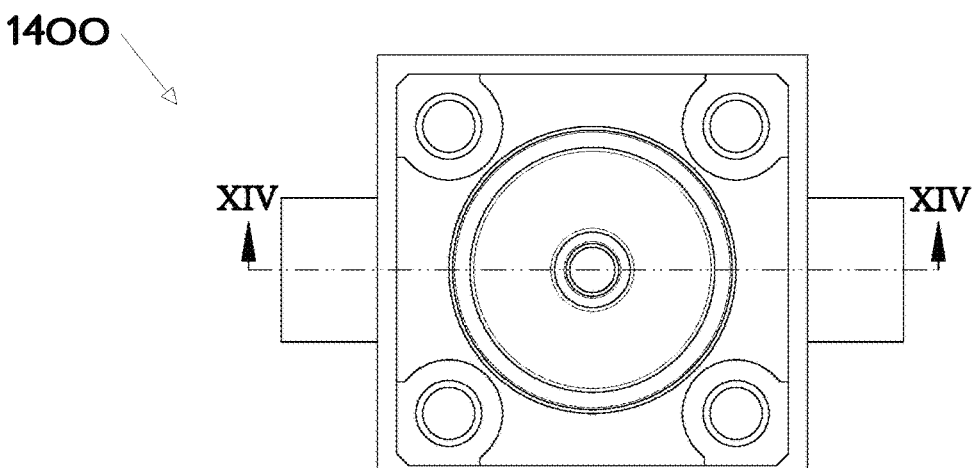
FIG. 14A
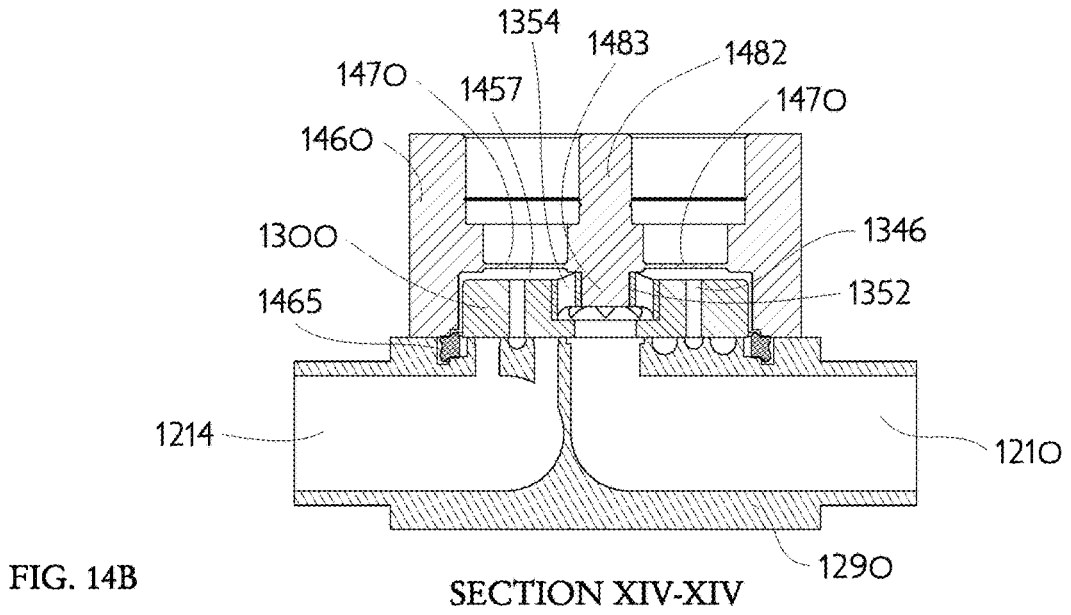
FIG. 14B
SECTION XIV-XIV
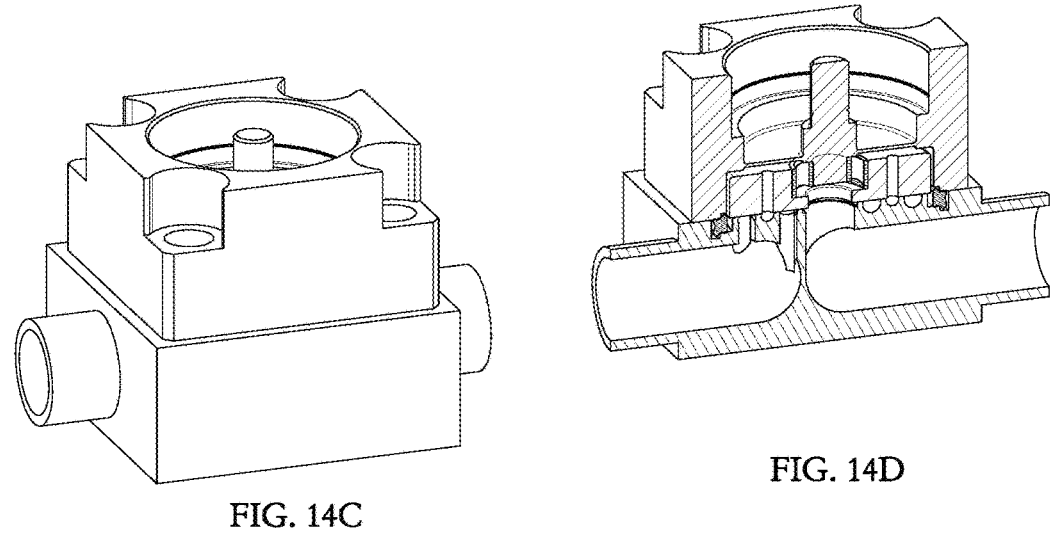
FIG. 14C
FIG. 14D

1500

SECTION XV-XV

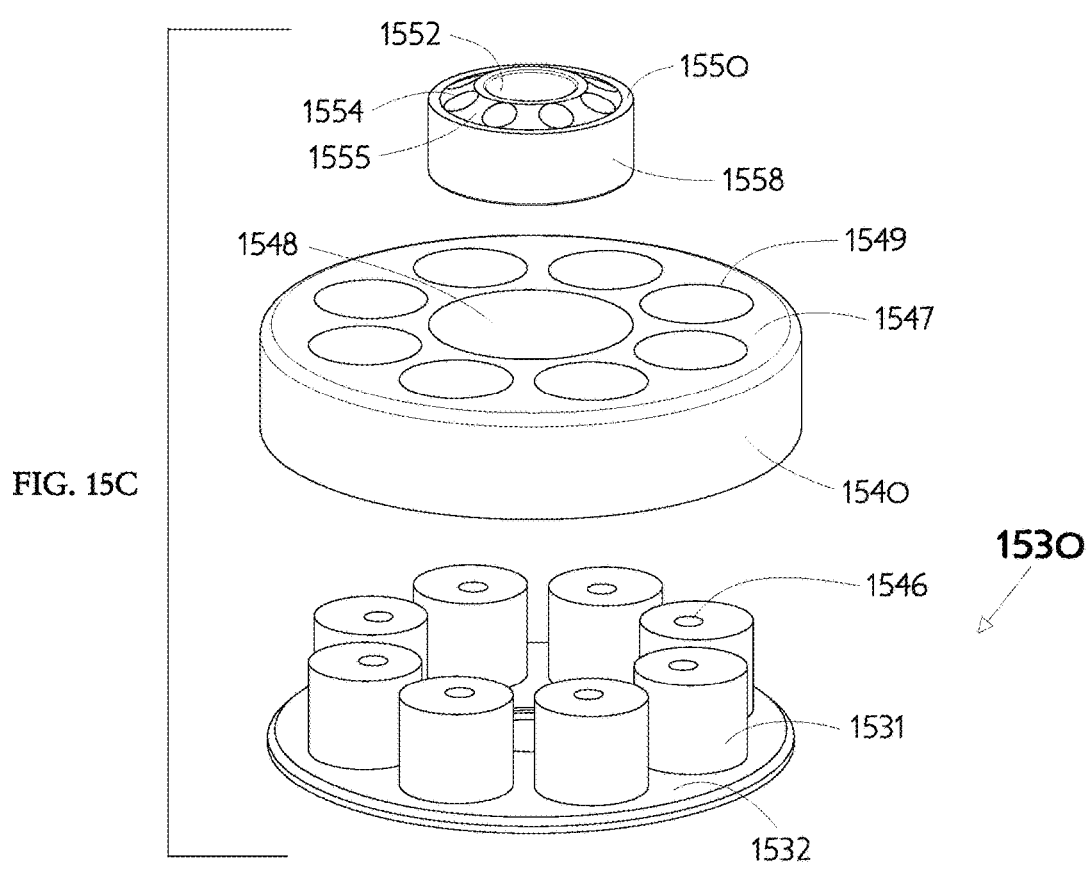
FIG. 15C
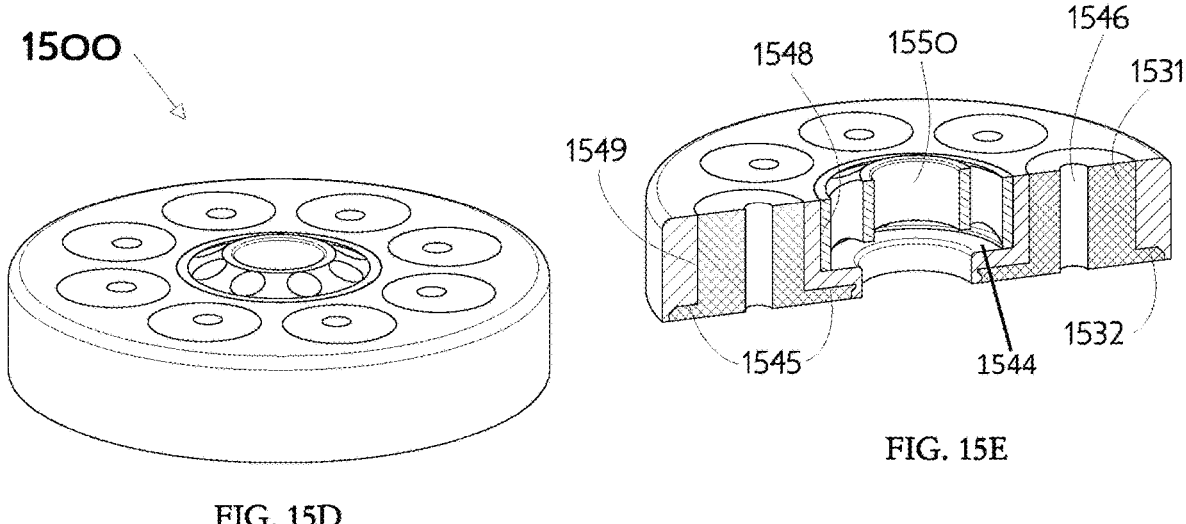
FIG. 15D
FIG. 15E

1600
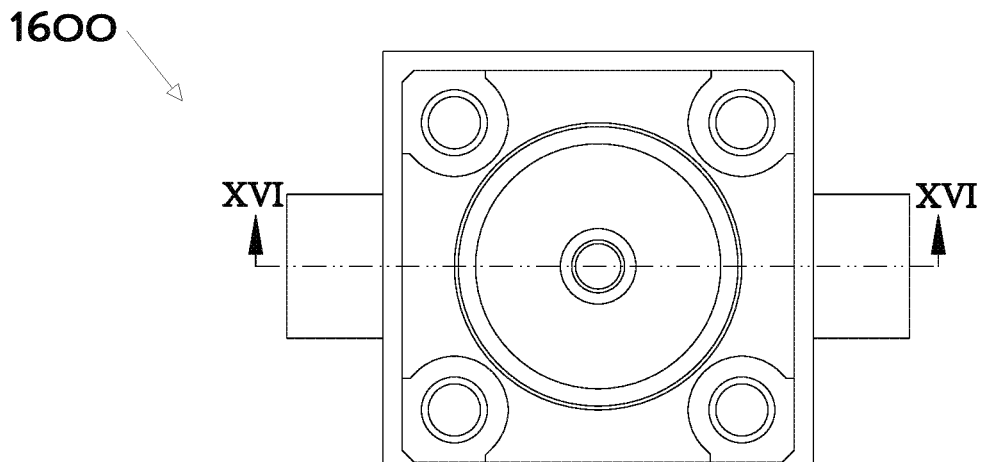
FIG. 16A
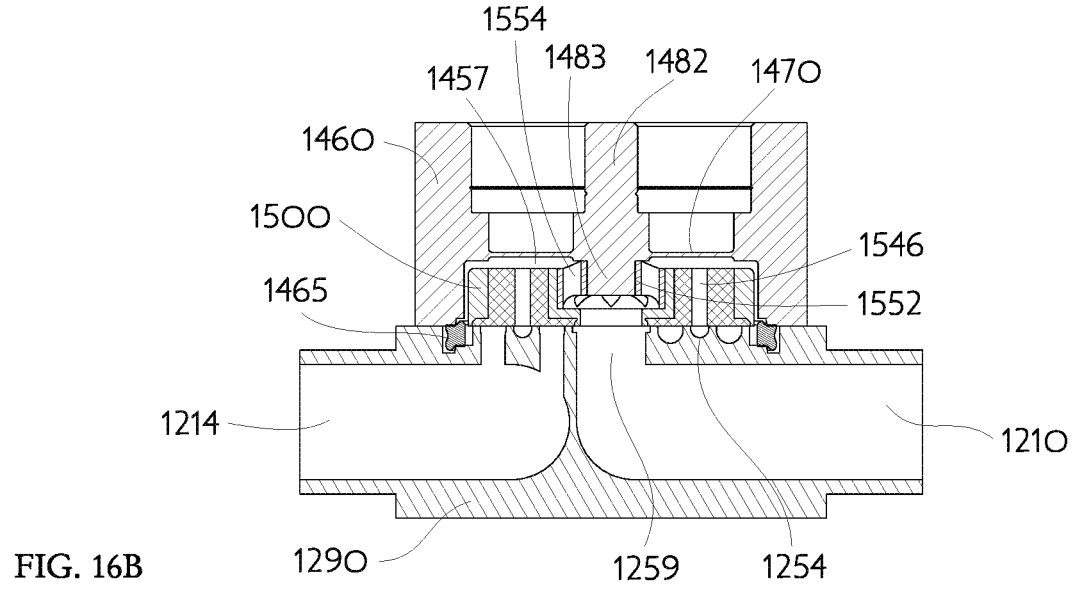
FIG. 16B
SECTION XVI-XVI
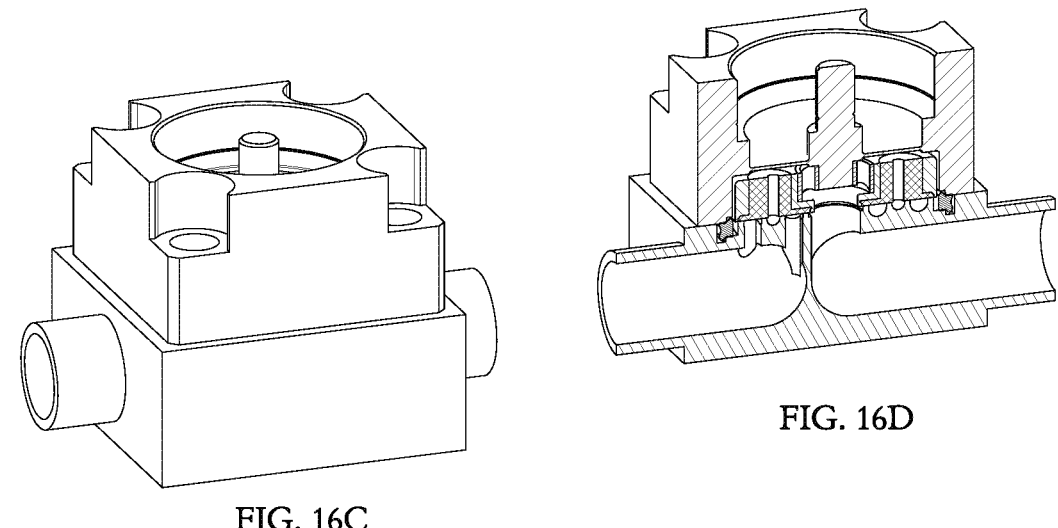
FIG. 16C
FIG. 16D 1700
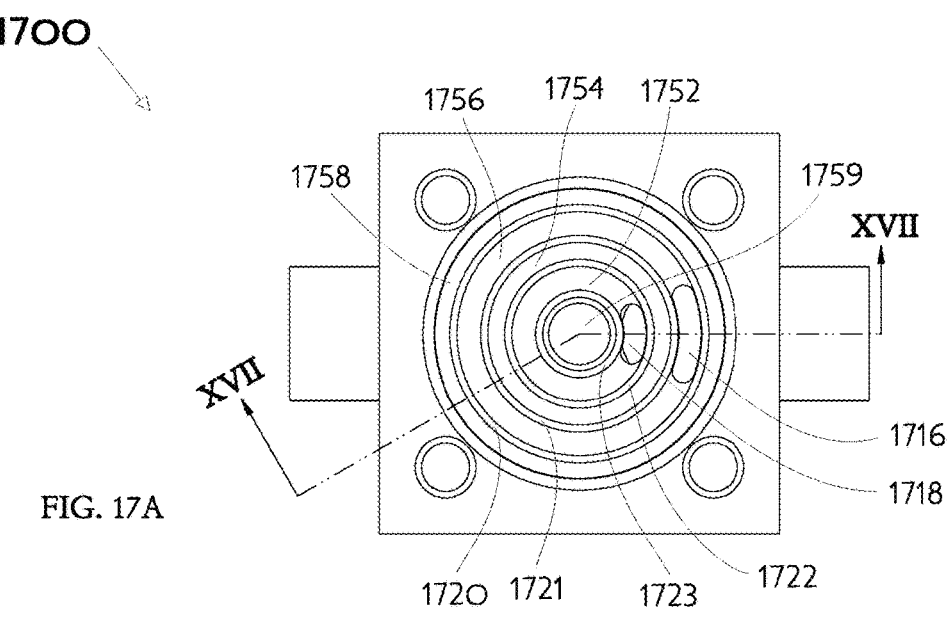
FIG. 17A
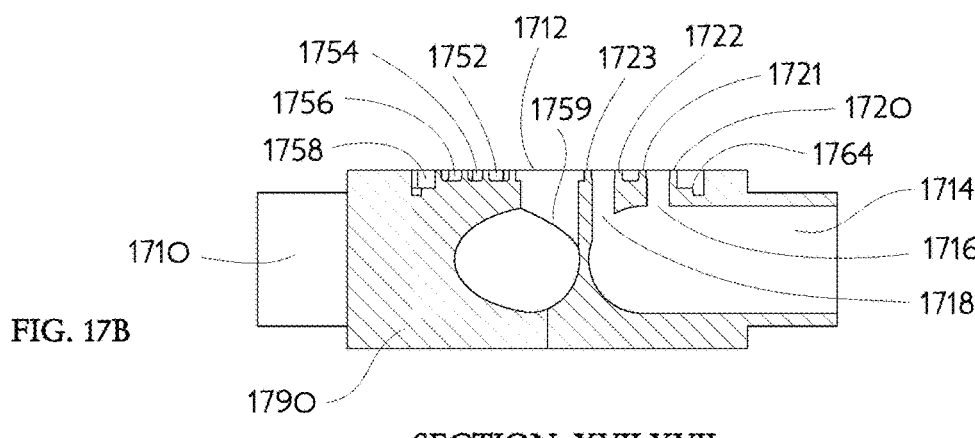
FIG. 17B
SECTION XVII-XVII
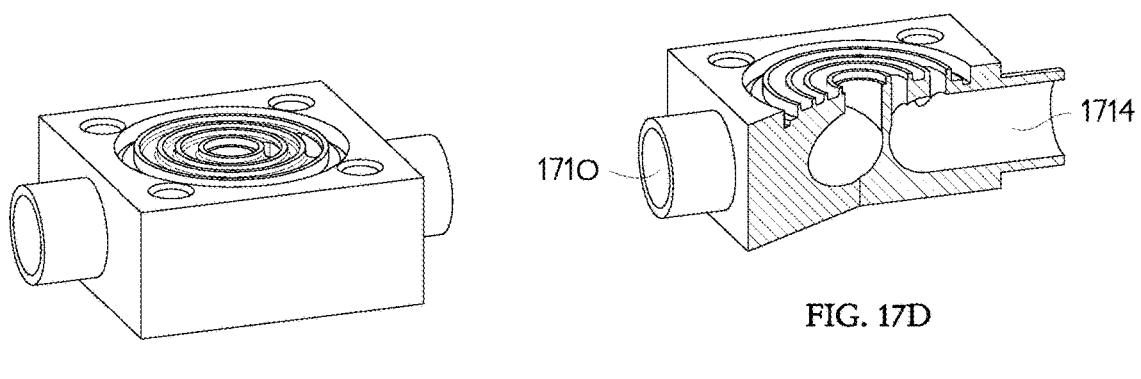
FIG. 17C
FIG. 17D

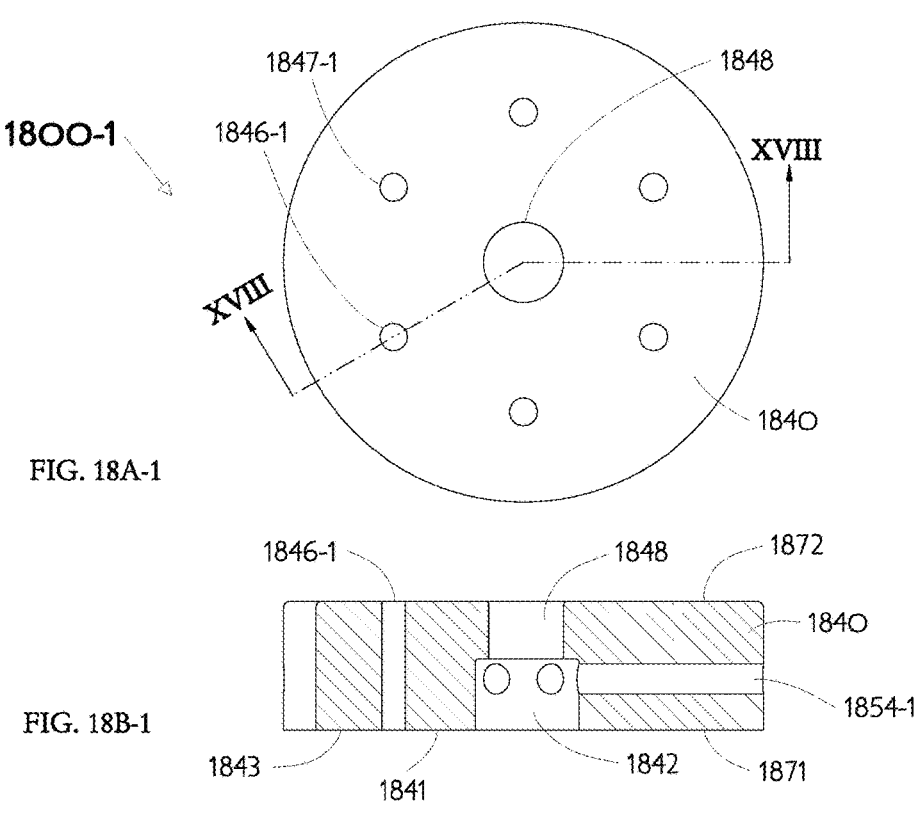
FIG. 18A-1
FIG. 18B-1
SECTION XVIII-XVIII
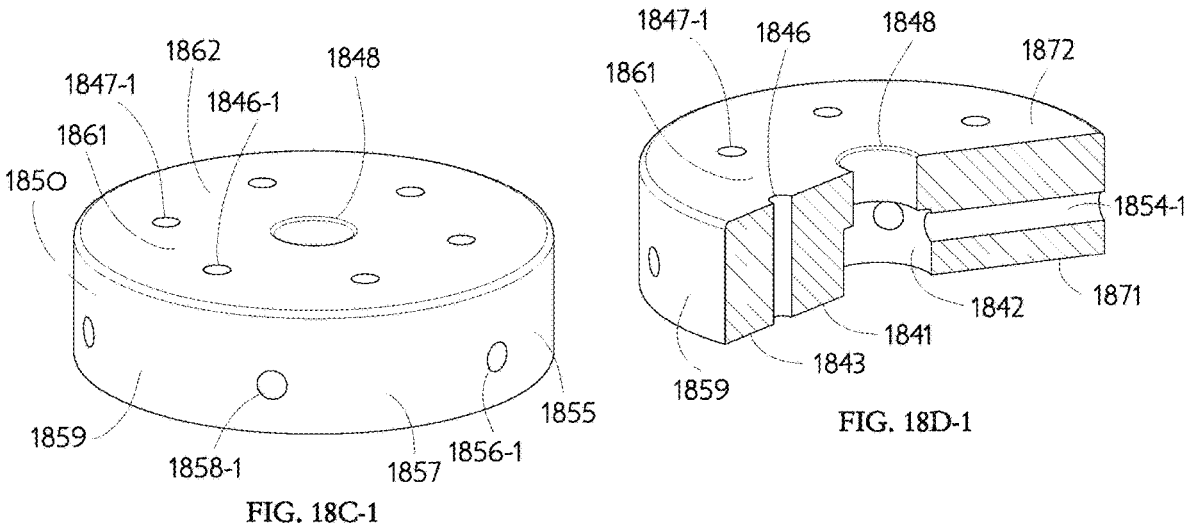
FIG. 18C-1
FIG. 18D-1

SECTION XVIII-XVIII

1900-1
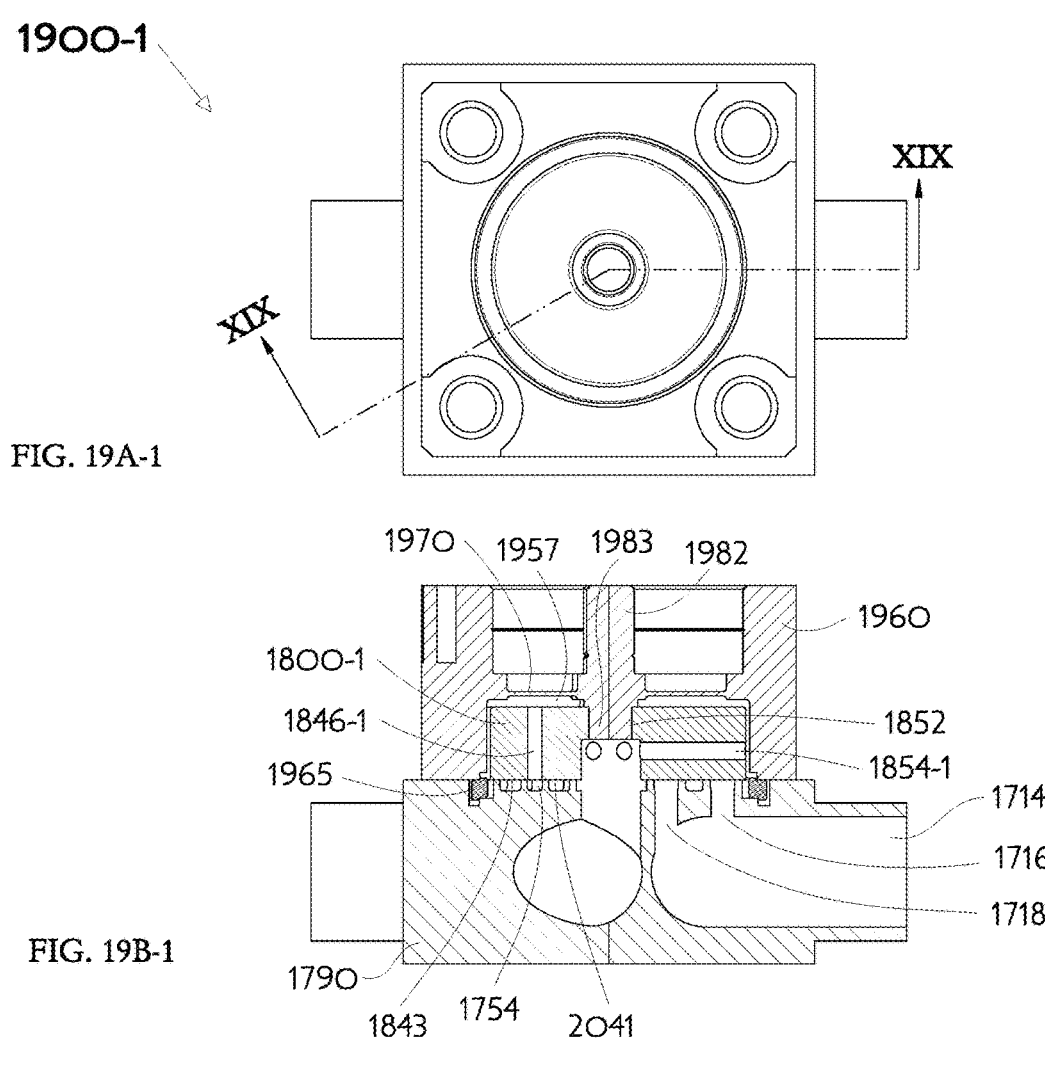
FIG. 19A-1
SECTION XIX-XIX
FIG. 19B-1
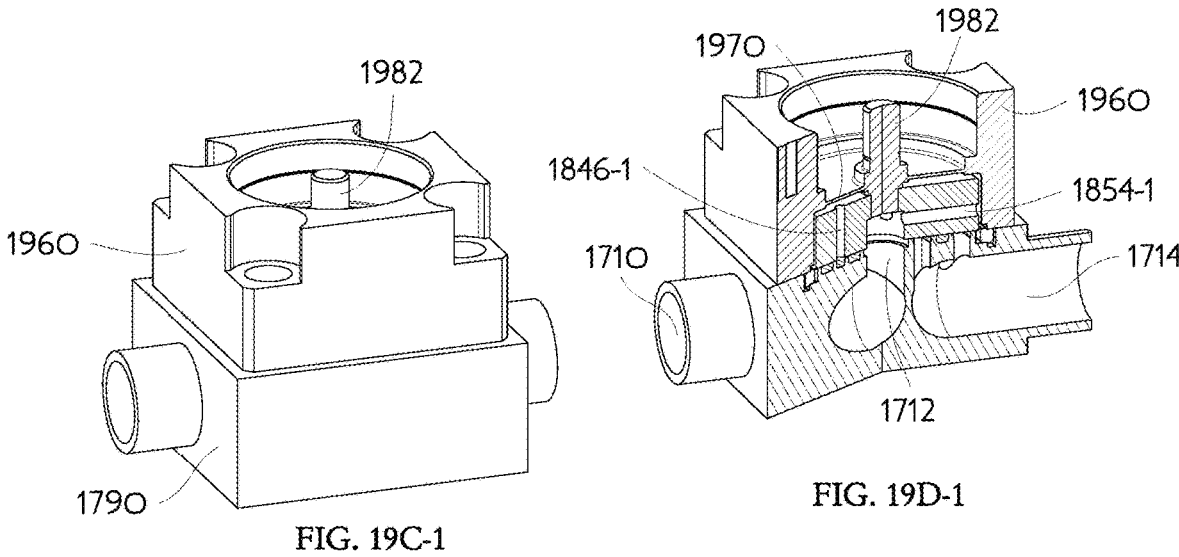
FIG. 19C-1
FIG. 19D-1

1900-2
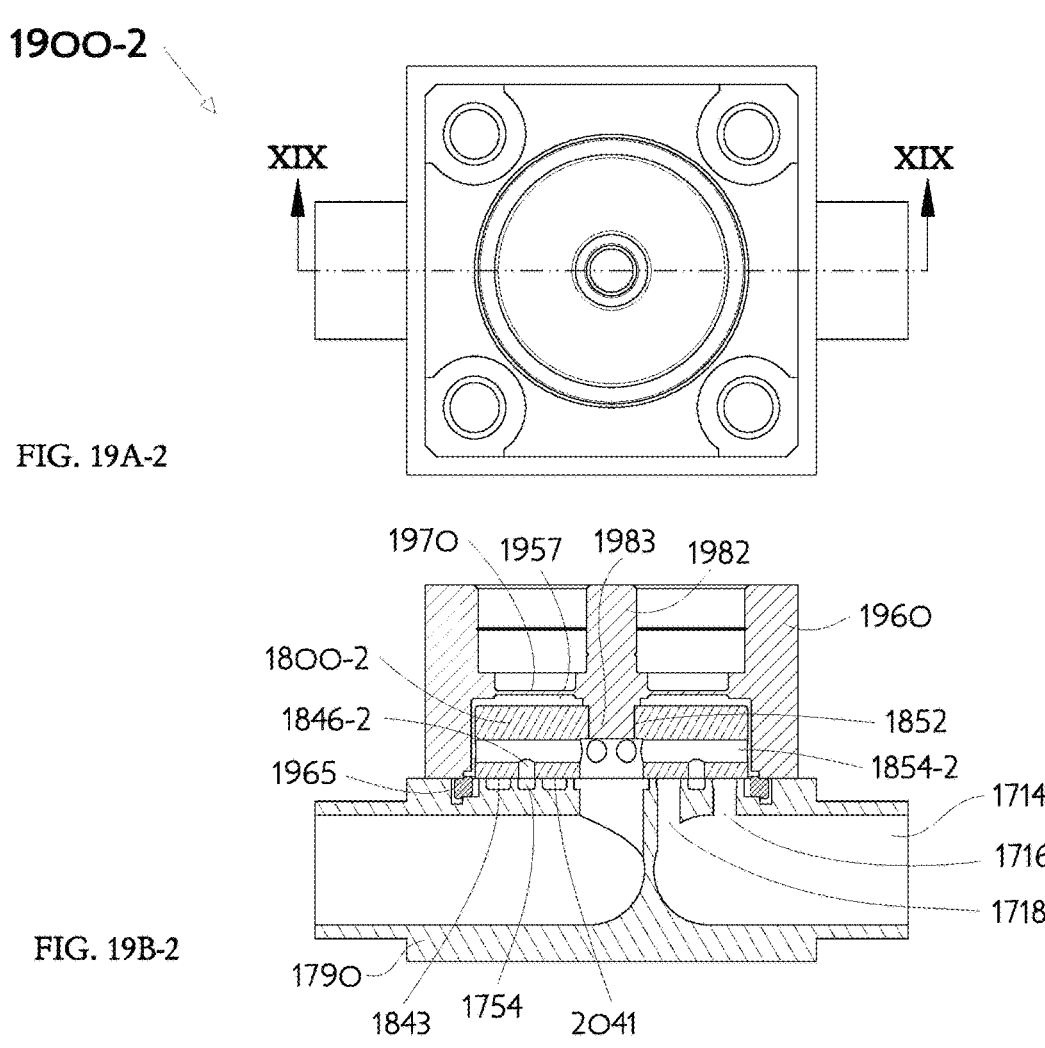
FIG. 19A-2
FIG. 19B-2
SECTION XIX-XIX
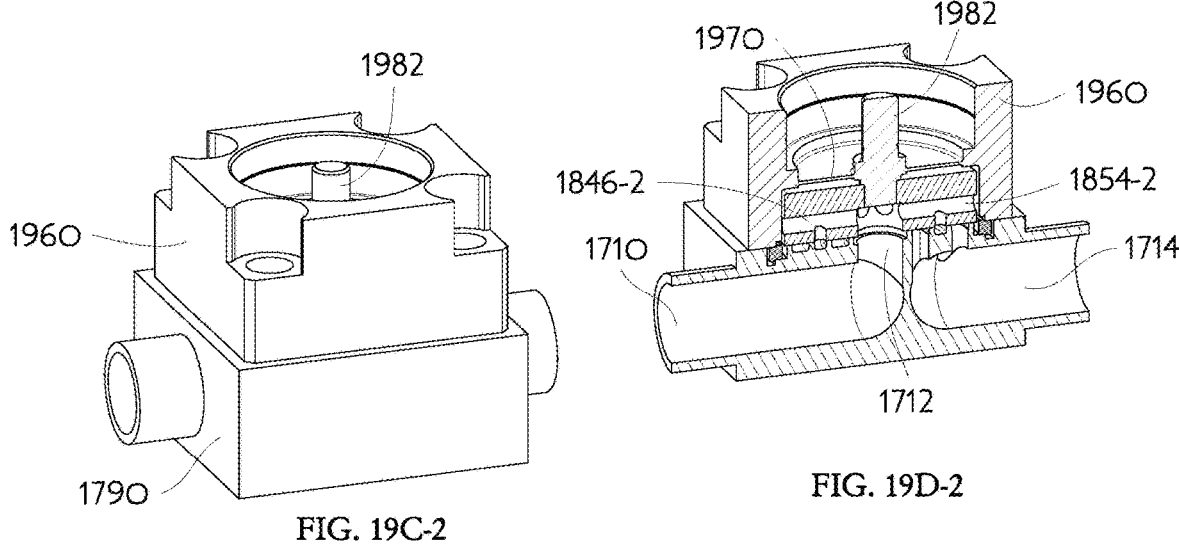
FIG. 19C-2
FIG. 19D-2

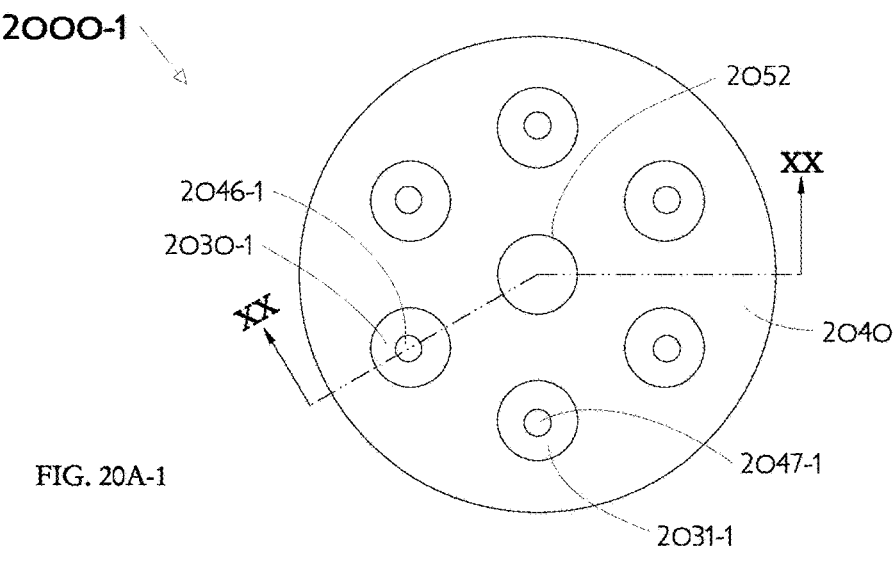
FIG. 20A-1
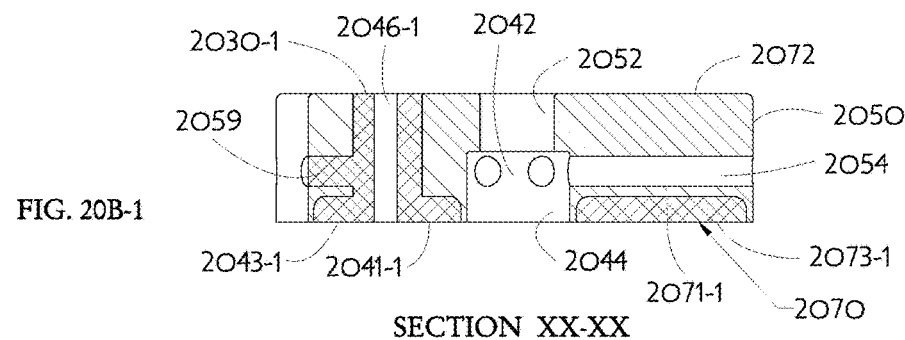
FIG. 20B-1
SECTION XX-XX
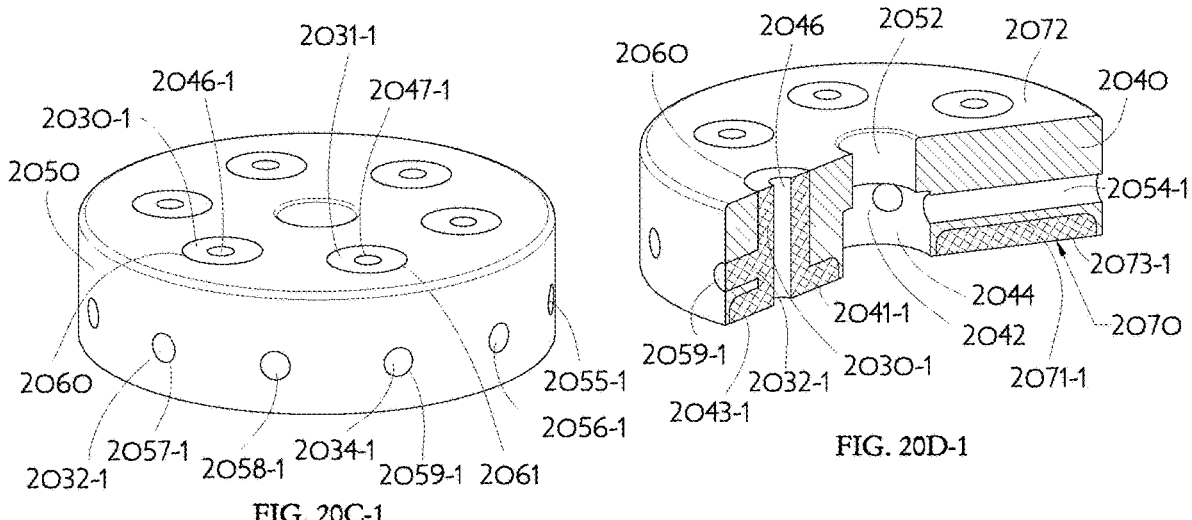
FIG. 20C-1
FIG. 20D-1

SECTION XX-XX 2100-1
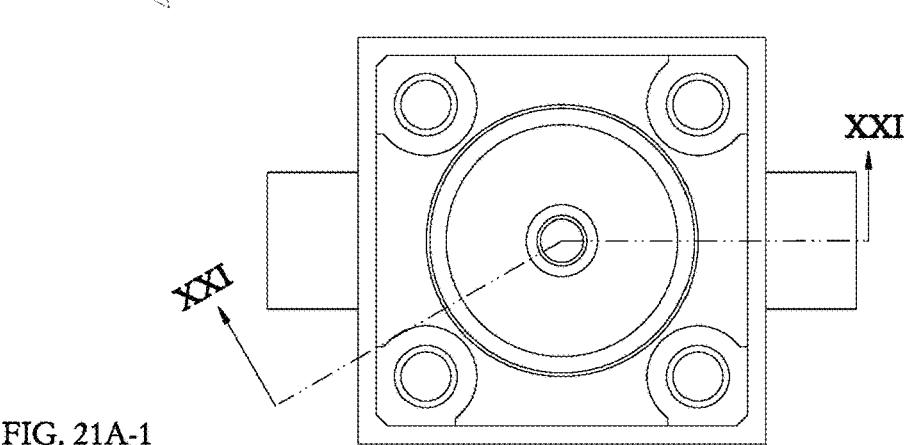
FIG. 21A-1
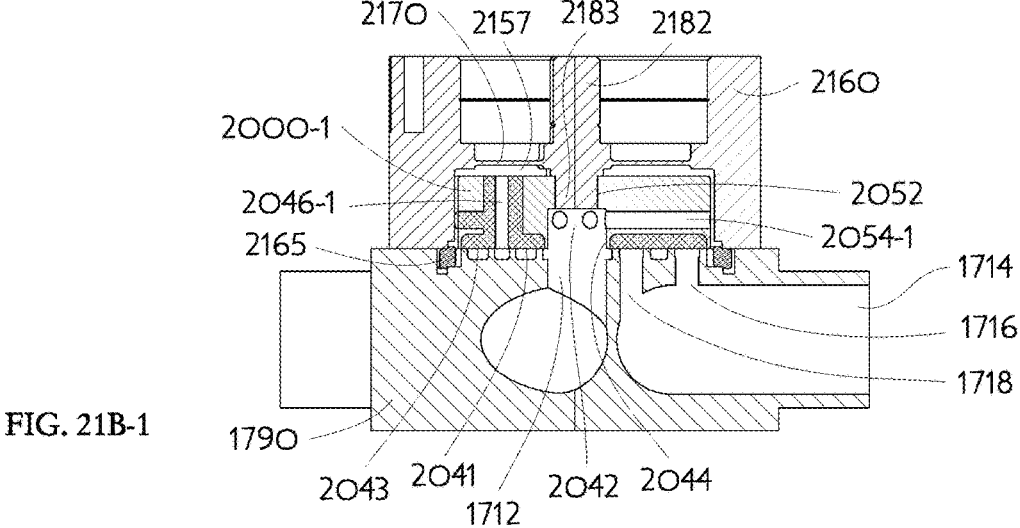
FIG. 21B-1
SECTION XXI-XXI
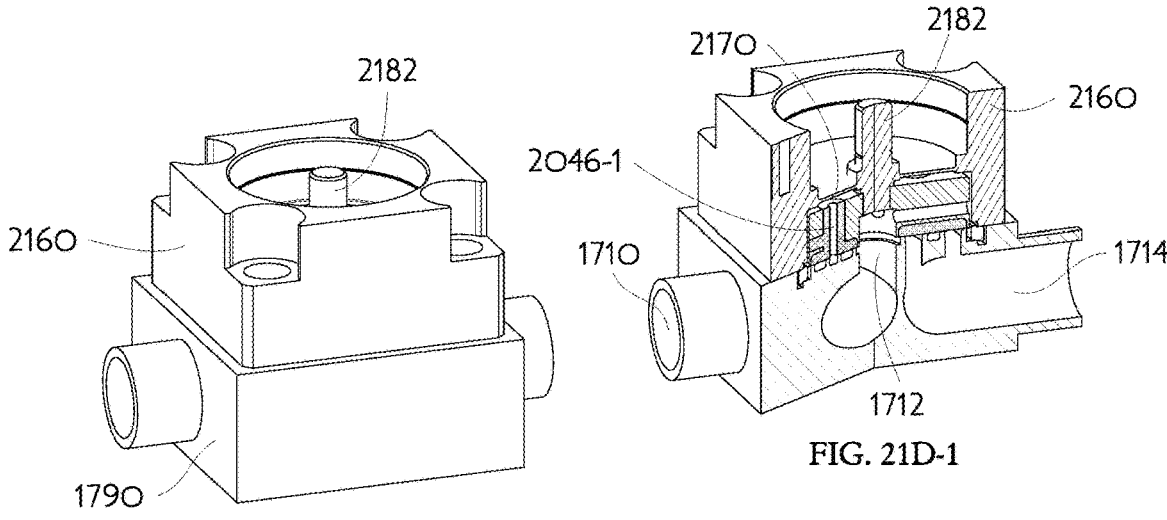
FIG. 21C-1
FIG. 21D-1

2100-2
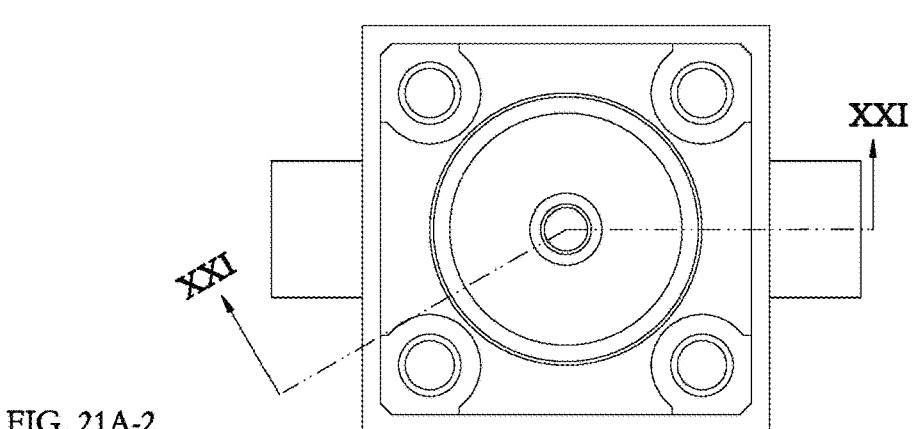
FIG. 21A-2
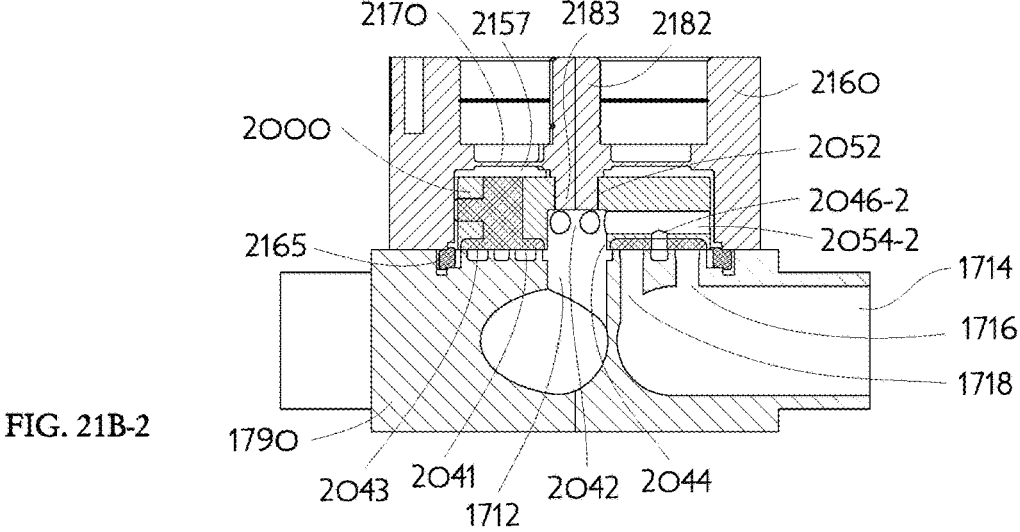
FIG. 21B-2
SECTION XXI-XXI
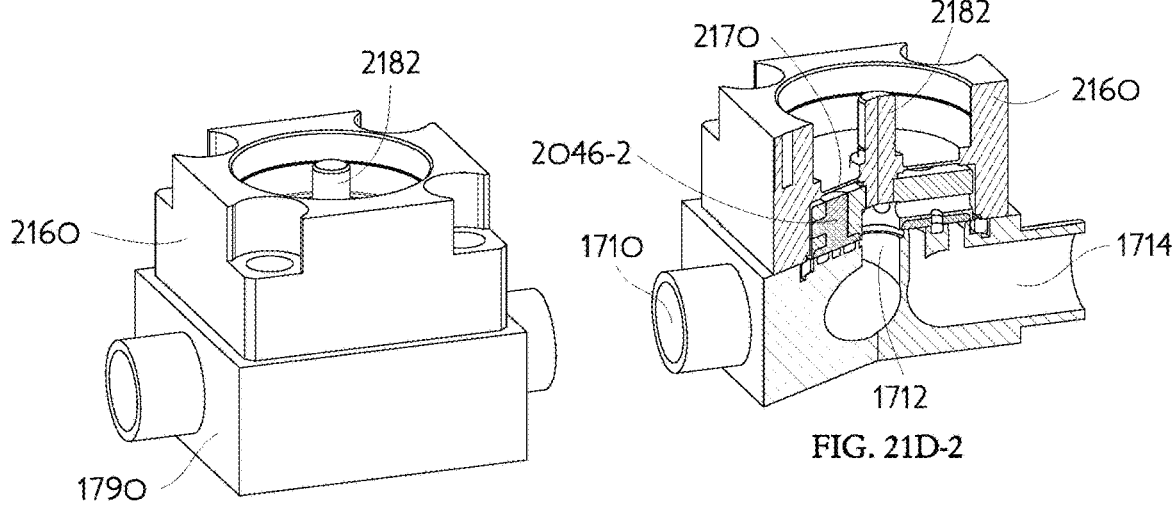
FIG. 21C-2
FIG. 21D-2

CONTROLE PLATE FOR A HIGH CONDUCTANCE VALVE

BACKGROUND

The present invention is related to a moveable portion of a fluid control valve that may be actively positioned, anywhere between an extreme open condition and an extreme closed condition, to adjust a flow of fluid passing through the valve. The movable portion includes provision for a portion of the flowing fluid to pass through a control plate thereby improving cleanliness by reducing potential fluid stagnation. The invention is particularly useful in valves intended for high purity proportional control or modulating control of fluid delivery within industrial processes making semiconductor devices, pharmaceuticals, or fine chemicals, and many similar fluid delivery systems that simultaneously demand a leak-tight shut-off in the fully closed condition along with proportional control.

SUMMARY

In consideration of the foregoing, presented herein is a high purity fluid control valve that includes a moveable control plate having at least one flow-through passage to enhance fluid sweep of the internal valve volume. The valve is of jet and seat type wherein a relatively narrow planar land is formed at the opening of a fluid passageway and a flat seat may be moved into contact with the land to close off fluid flow. In this disclosure the jet element is usually described as an orifice ridge and the seat element is usually described as a control plate. The valve uses nested orifice ridges to achieve high conductance with small actuator movement by providing large control gap length with small enclosed area. The control plate has a continuous uninterrupted flat portion sized to bridge adjacent orifice ridge segments to shut-off fluid flow in the fully closed condition. The orifice ridges are coplanar and may be lapped to provide a smooth surface for the control plate to seat against. The flow-through control plate is especially useful in fast acting proportional control applications such as gas delivery in semiconductor manufacturing.

According to an embodiment, a control plate comprises a control plate body formed as a basically circular disk having a flat side and an opposed side opposite the flat side, the control plate configured to be moved within a valve by an actuator, the flat side having a continuous uninterrupted flat portion to shut-off fluid flow in the valve; a counterbore in the control plate body, the counterbore in fluid communication with a fluid conduit; a plurality of radial fluid flow paths in the control plate body terminating in the counterbore; and a plurality of axial fluid flow paths in the control plate body; wherein the radial fluid flow paths provide fluid communication from the counterbore to a circumferential perimeter of the counterbore and the axial fluid flow paths provide fluid communication with an intermediate valve chamber portion, the intermediate valve chamber portion in fluid communication with the fluid conduit.

According to another embodiment, a valve assembly comprising: a valve body having a valve chamber, at least one first fluid conduit aperture in fluid communication with the valve chamber, at least one second fluid conduit aperture in fluid communication with the valve chamber, and at least one pair of adjacent orifice ridge segments, the at least one pair of adjacent orifice ridge segments extending from the valve body into the valve chamber and defining an intermediate valve chamber portion between the at least one pair of adjacent orifice ridge segments; a control plate body formed as a basically circular disk having a flat side and an opposed side opposite the flat side, the control plate configured to be moved within a valve by an actuator, the flat side having a continuous uninterrupted flat portion to shut-off fluid flow in the valve; a counterbore in the control plate body, the counterbore in fluid communication with a fluid conduit; a plurality of radial fluid flow paths in the control plate body terminating in the counterbore; and a plurality of axial fluid flow paths in the control plate body; wherein the radial fluid flow paths provide fluid communication from the counterbore to a circumferential perimeter of the counterbore and the axial fluid flow paths provide fluid communication with an intermediate valve chamber portion, the intermediate valve chamber portion in fluid communication with the fluid conduit.

According to another embodiment, a method of conducting fluid through a high-conductance valve using a control plate, the method comprising: pumping fluid through a valve body, the valve body having a valve chamber, at least one first fluid conduit aperture in fluid communication with the valve chamber, at least one second fluid conduit aperture in fluid communication with the valve chamber, and at least one pair of adjacent orifice ridge segments, the at least one pair of adjacent orifice ridge segments extending from the valve body into the valve chamber and defining an intermediate valve chamber portion between the at least one pair of adjacent orifice ridge segments; moving a control plate body in the valve body using an valve actuator, the control plate body formed as a circular disk having a flat side and an opposed side opposite the flat side, the flat side having a continuous uninterrupted flat portion to shut-off fluid flow in the valve; channeling the fluid through a plurality of radial fluid flow paths, the radial flow paths formed in the control plate body and terminating in a counterbore of the control plate body; and channeling the fluid through a plurality of axial fluid flow paths, the axial fluid flow paths formed in the control plate body; wherein the radial fluid flow paths provide fluid communication from the counterbore to a circumferential perimeter of the counterbore and the axial fluid flow paths provide fluid communication with an intermediate valve chamber portion, the intermediate valve chamber portion in fluid communication with the fluid conduit.

In some embodiments, the axial fluid flow paths extend through the control plate body creating a fluid communication path between the intermediate valve chamber and an upper valve chamber portion of the high-conductance valve.

In some embodiments, the axial fluid flow paths extend from a radial fluid flow path through the control plate body creating a fluid communication path between the radial fluid flow path to the intermediate valve chamber.

In some embodiments, the intermediate valve chamber is the second intermediate valve chamber of the high-conductance valve.

In some embodiments, the control plate includes further comprises a polymer insert disk, the polymer insert disk comprising: a plurality of pillars, each pillar extending through the control plate body; and a plurality of plugs, each plug extending radially from a pillar.

In some embodiments, an axial flow path extends through at least one pillar creating a fluid communication path between the intermediate valve chamber and an upper valve chamber portion of the high-conductance valve and at least one plug.

In some embodiments, at least one axial fluid flow path extends from the radial fluid flow paths through the polymer insert disk creating a fluid communication path between the radial fluid flow path to the intermediate valve chamber.

In some embodiments, the seat insert includes a disc that fills a circular groove formed in the control plate body, the seat insert including a first continuous uninterrupted flat portion disposed radially inward of the plurality of fluid passageways and a second continuous uninterrupted flat portion disposed radially outward of the plurality of fluid passageways.

In some embodiments, the control plate is mounted on a stub suspended beneath a diaphragm, wherein the distance between the control plate and the diaphragm is minimized to reduce sweep volume.

BRIEF DESCRIPTION OF THE DRAWINGS

FIG. 4A illustrates a plan view of an embodiment of a control plate with flow-through passages in accordance with FIGS. 2A-D combined with a valve topworks installed atop a high-conductance valve body having concentric centered orifice ridges in accordance with FIGS. 1A-1D;

FIG. 4B illustrates a cross-sectional view of the valve assembly of FIG. 4A taken along line IV-IV;

FIG. 4C illustrates a top perspective view of the valve assembly of FIG. 4A;

FIG. 4D illustrates a top perspective cross-sectional view of the valve assembly of FIG. 4A taken along line IV-IV;

4

Figures 7A, 7B, 7C, 7D, 7E, 7F:
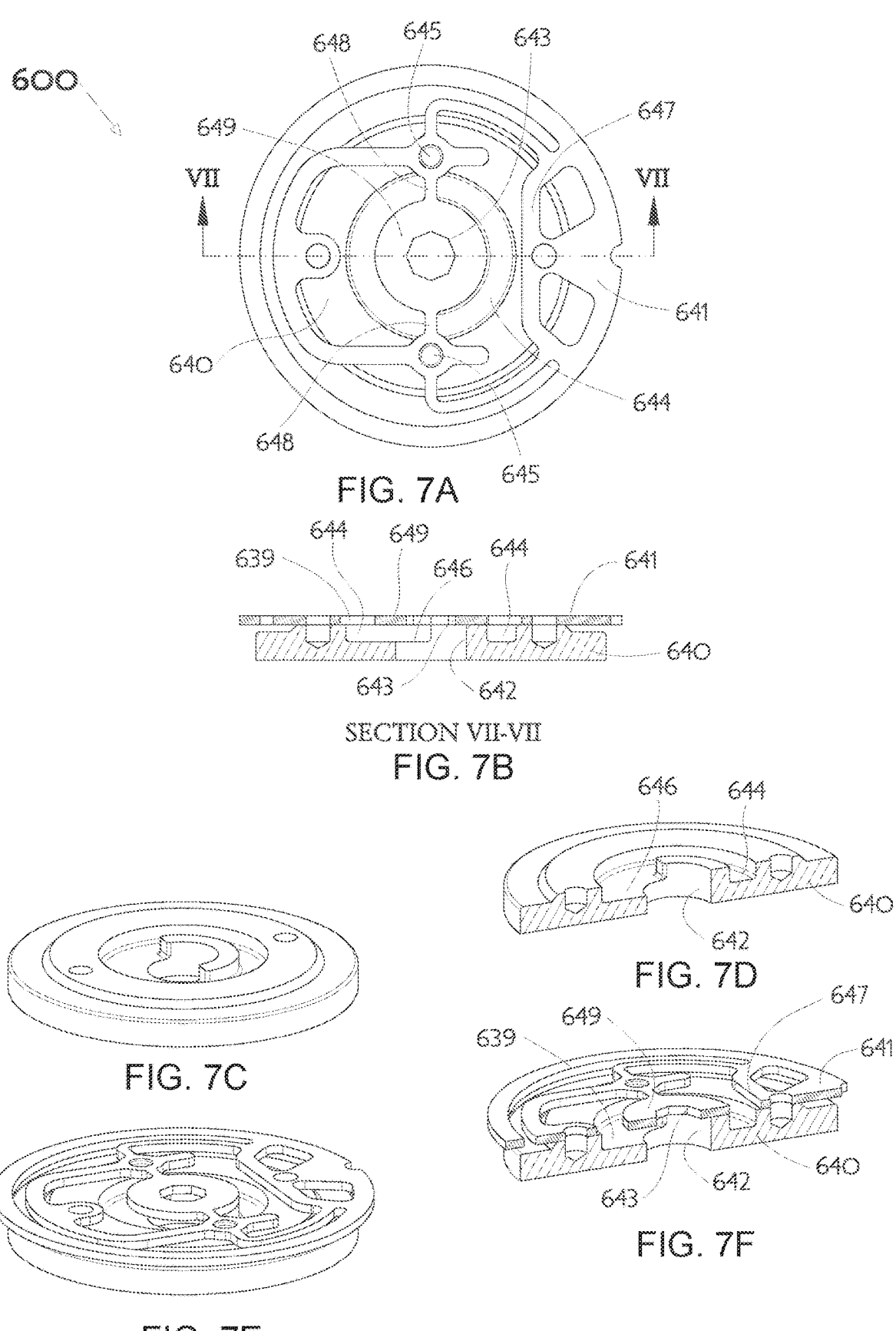
Figure 12A:
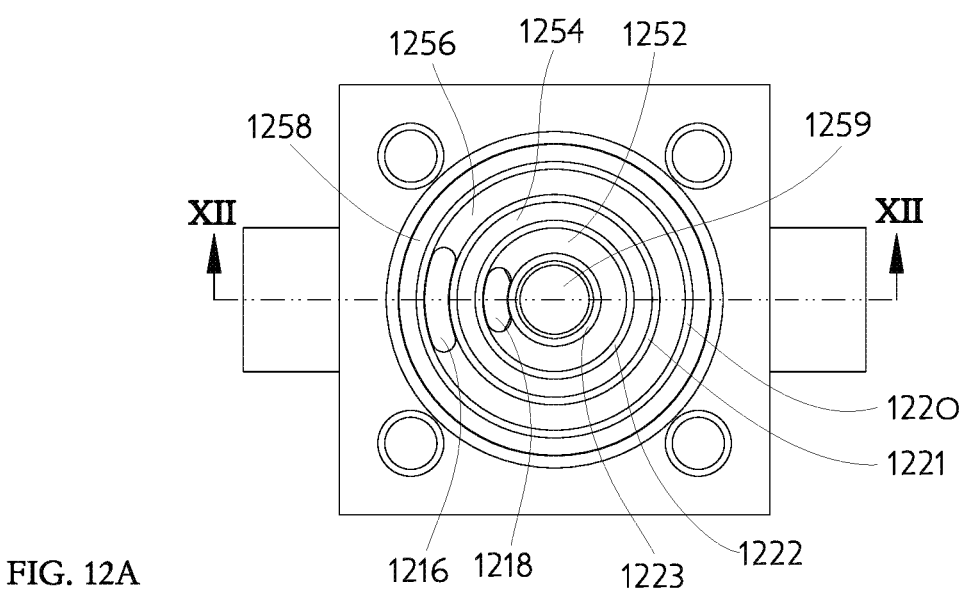
Figure 12C:
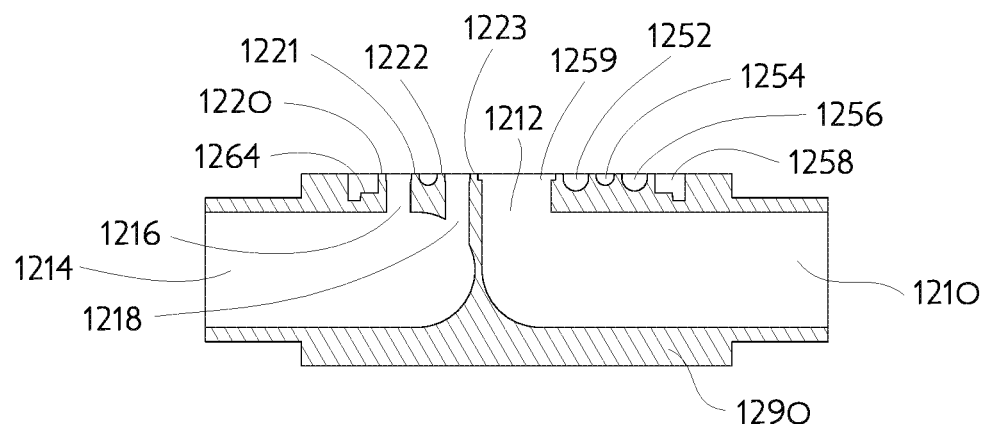
Figure 12C:
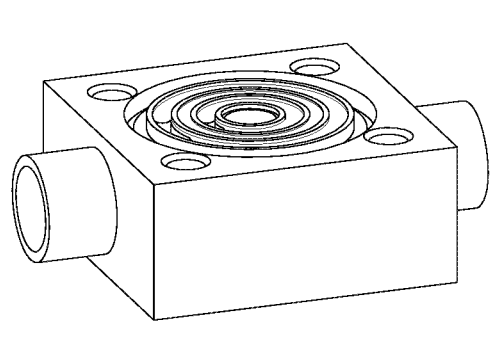
Figure 12D:
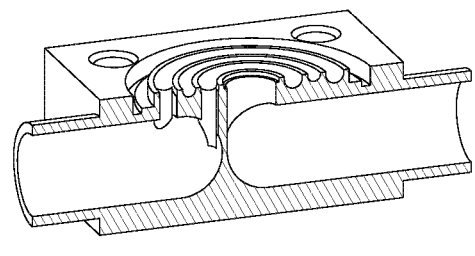
Figure 13A:
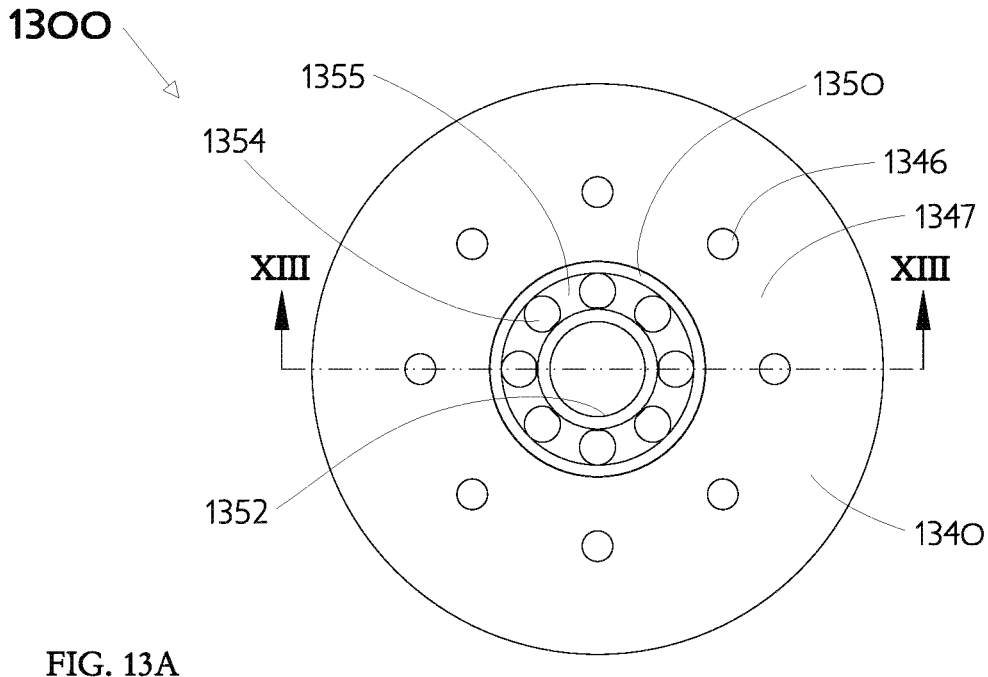
Figure 13B:
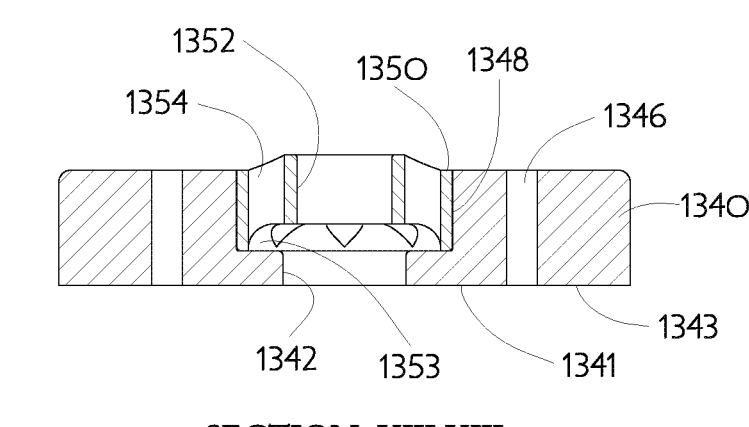
Figure 15A:
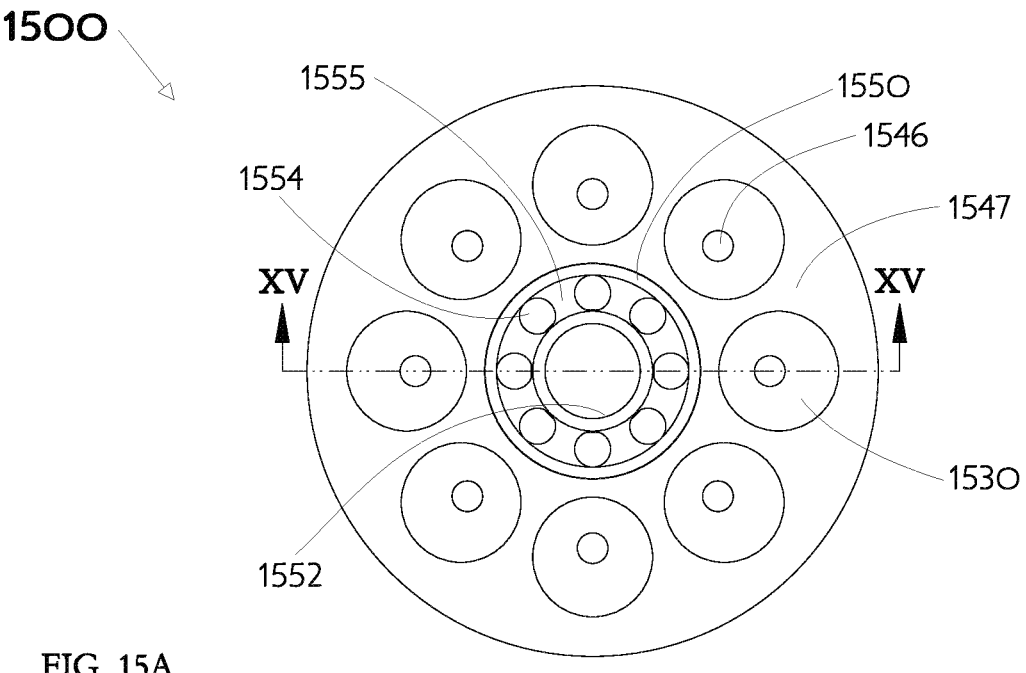
Figure 15B:
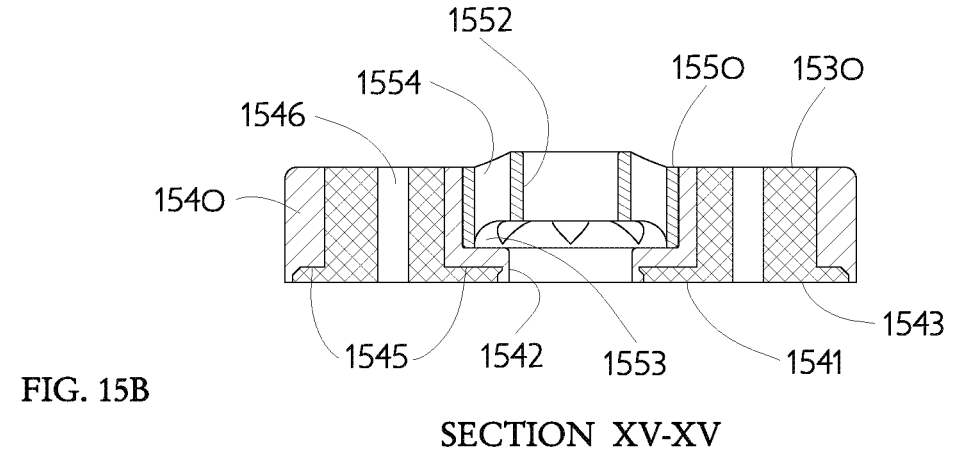

FIG. 6A illustrates a plan view of another representative high-conductance valve body having offset concentric orifice ridges;

FIG. 6B illustrates a cross-sectional view of the high-conductance valve body of FIG. 6A taken along line VI-VI;

FIG. 6C illustrates a top perspective view of the high-conductance valve body of FIG. 6A;

FIG. 6D illustrates a top perspective cross-sectional view of the high-conductance valve body of FIG. 6A taken along line VI-VI;

FIG. 7A illustrates an embodiment of a control plate with flow-through passages combined with a valve stroke amplifier disc;

FIG. 7B illustrates a cross-sectional view of the control plate and valve stroke amplifier disc of FIG. 7A taken along line VII-VII;

FIG. 7C illustrates a top perspective view of the control plate of the combined control plate and valve stroke amplifier disc of FIG. 7A;

FIG. 7D illustrates a top perspective cross-sectional view of the control plate of the combined control plate and valve stroke amplifier disc of FIG. 7A taken along line VII-VII;

FIG. 7E illustrates a top perspective view of the combined control plate and valve stroke amplifier disc of FIG. 7A;

FIG. 7F illustrates a top perspective cross-sectional view of the combined control plate and valve stroke amplifier disc of FIG. 7A taken along line VII-VII;

FIG. 8A illustrates a plan view of a control plate with flow-through passages and amplifier disc in accordance with FIGS. 7A-7F combined with a valve topworks installed atop a high-conductance valve body having offset concentric orifice ridges in accordance with FIGS. 6A-6D;

FIG. 8B illustrates a cross-sectional view of the valve assembly of FIG. 8A taken along line VIII-VIII;

FIG. 8C illustrates a top perspective view of the valve assembly of FIG. 8A;

FIG. 8D illustrates a top perspective cross-sectional view of the valve assembly of FIG. 8A taken along line VIII-VIII;

FIG. 9A illustrates a plan view of another embodiment of a control plate with flow-through passages for a high-conductance valve;

FIG. 9B illustrates a cross-sectional view of the control plate of FIG. 9A taken along line IX-IX;

FIG. 9C illustrates a top perspective view of the control plate of FIG. 9A;

FIG. 9D illustrates a top perspective cross-sectional view of the control plate of FIG. 9A taken along line IX-IX;

FIG. 10A illustrates a plan view of another representative high-conductance valve body having two nested groups of concentric orifice ridges;

FIG. 10B illustrates a cross-sectional view of the high-conductance valve body of FIG. 10A taken along line X-X;

FIG. 10C illustrates a top perspective view of the high-conductance valve body of FIG. 10A, FIG. 10D illustrates a top perspective cross-sectional view of the high-conductance valve body of FIG. 10A taken along line X-X;

FIG. 11A illustrates a plan view of a control plate with flow-through passages in accordance with FIGS. 9A-9D combined with a valve topworks installed atop a high-conductance valve body having nested groups of concentric orifice ridges in accordance with FIGS. 10A-10D;

FIG. 11B illustrates a cross-sectional view of the valve assembly of FIG. 11A taken along line XI-XI;

FIG. 11C illustrates a top perspective view of the valve assembly of FIG. 11A;

FIG. 11D illustrates a top perspective cross-sectional view of the valve assembly of FIG. 11A taken along line XI-XI;

FIG. 12A illustrates a plan view of another representative high-conductance valve body having two nested groups of concentric orifice ridges;

FIG. 12B illustrates a cross-sectional view of the high-conductance valve body of FIG. 12A taken along line FIG. 12C illustrates a top perspective view of the high-conductance valve body of FIG. 12A;

FIG. 12D illustrates a top perspective cross-sectional view of the high-conductance valve body of FIG. 12A taken along line XII-XII;

FIG. 13A illustrates a plan view of another embodiment of a control plate with flow-through passages for a high-conductance valve;

FIG. 13B illustrates a cross-sectional view of the control plate of FIG. 13A taken along line XIII-XIII;

FIG. 13C illustrates an exploded top perspective view of the control plate of FIG. 13A showing two parts that comprise the control plate;

FIG. 13D illustrates a top perspective view of the control plate of FIG. 13A;

FIG. 13E illustrates a top perspective cross-sectional view of the control plate of FIG. 13A taken along line FIG. 14A illustrates a plan view of a control plate with flow-through passages in accordance with FIGS. 13A-13E combined with a valve topworks installed atop a high-conductance valve body having nested groups of concentric orifice ridges in accordance with FIGS. 12A-12D;

FIG. 14B illustrates a cross-sectional view of the valve assembly of FIG. 14A taken along line XEV-XIV;

FIG. 14C illustrates a top perspective view of the valve assembly of FIG. 14A;

FIG. 14D illustrates a top perspective cross-sectional view of the embodiment of FIG. 14A taken along line XIV-XIV;

FIG. 15A illustrates a plan view of another embodiment of a control plate with flow-through passages for a high-conductance valve;

FIG. 15B illustrates a cross-sectional view of the control plate of FIG. 15A taken along line XV-XV;

FIG. 15C illustrates an exploded top perspective view of the control plate of FIG. 15A showing three parts that comprise the control plate;

FIG. 15D illustrates a top perspective view of the control plate of FIG. 15A;

FIG. 15E illustrates a top perspective cross-sectional view of the control plate of FIG. 15A taken along line XV-XV;

FIG. 16A illustrates a plan view of a control plate with flow-through passages in accordance with FIGS. 15A-15E combined with a valve topworks installed atop a high-conductance valve body having nested groups of concentric orifice ridges in accordance with FIGS. 12A-12D;

FIG. 16B illustrates a cross-sectional view of the valve assembly of FIG. 16A taken along line XVI-XVI;

FIG. 16C illustrates a top perspective view of the valve assembly of FIG. 16A;

FIG. 16D illustrates a top perspective cross-sectional view of the valve assembly of FIG. 16A taken along line XVI-XVI.

Figures 1A, 1B, 1C, 1D:
FIG. 1A illustrates a plan view of a representative high-conductance valve body having centered concentric orifice ridges.
FIG. 1B illustrates a cross-sectional view of the high-conductance valve body of FIG. 1A taken along line I-I.
FIG. 1C illustrates a top perspective view of the high-conductance valve body of FIG. 1A.
FIG. 1D illustrates a top perspective cross-sectional view of the high-conductance valve body of FIG. 1A taken along line I-I.
Figure 2A:
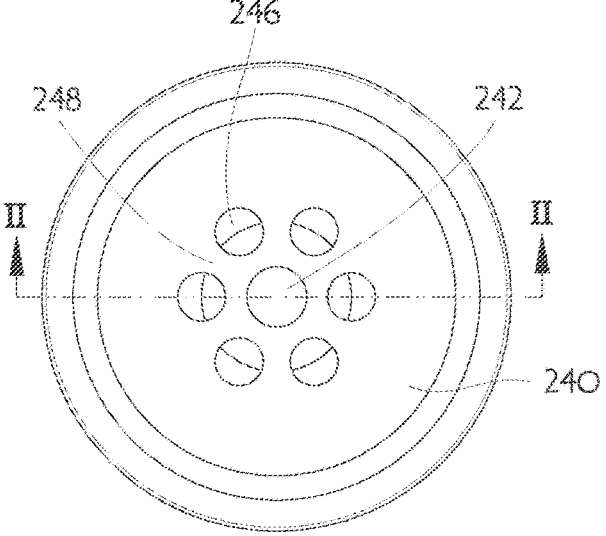
FIG. 2A illustrates a plan view of an embodiment of a control plate with flow-through passages for a high-conductance valve.
Figure 2B:
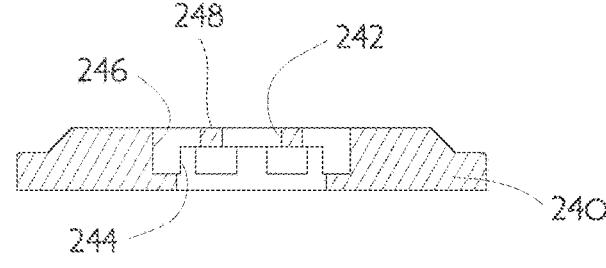
FIG. 2B illustrates a cross-sectional view of the control plate of FIG. 2A taken along line
Figure 2C:
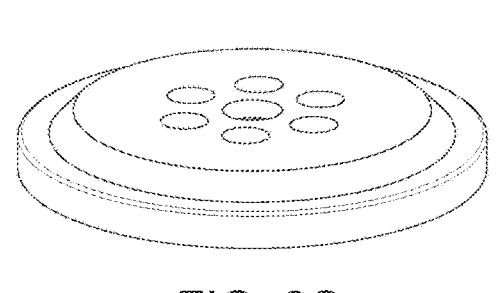
FIG. 2C illustrates a top perspective view of the control plate of FIG. 2A.
Figure 2D:
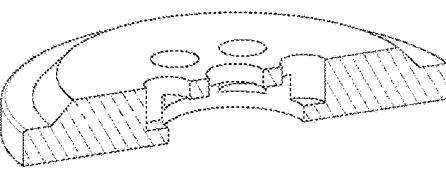
FIG. 2D illustrates a top perspective cross-sectional view of the control plate of FIG. 2A taken along line II-II.
Figure 3A:
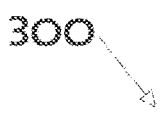
FIG. 3A illustrates a plan view of another embodiment of a control plate with flow-through passages for a high-conductance valve.
Figure 3A:
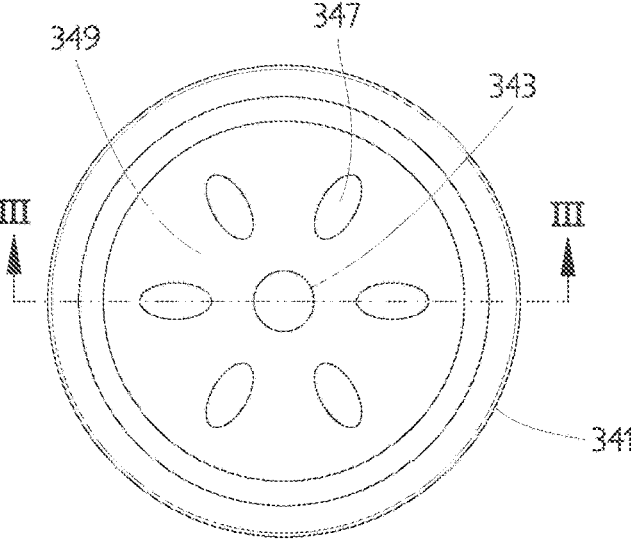
Figure 3B:
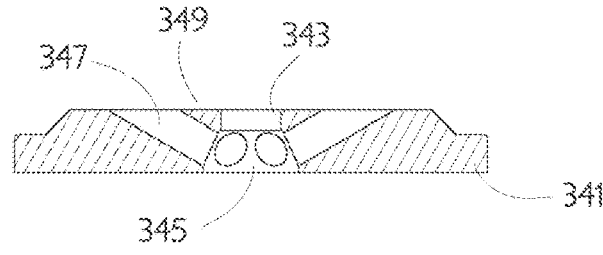
FIG. 3B illustrates a cross-sectional view of the control plate of FIG. 3A taken along line III-III.
Figure 3C:
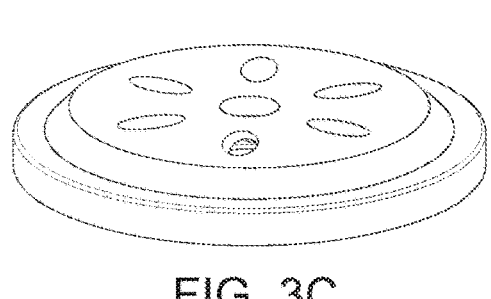
FIG. 3C illustrates a top perspective view of the control plate of FIG. 3A.
Figure 3D:
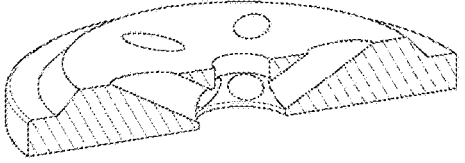
FIG. 3D illustrates a top perspective cross-sectional view of the control plate of FIG. 3A taken along line II-III.
Figure 5A:
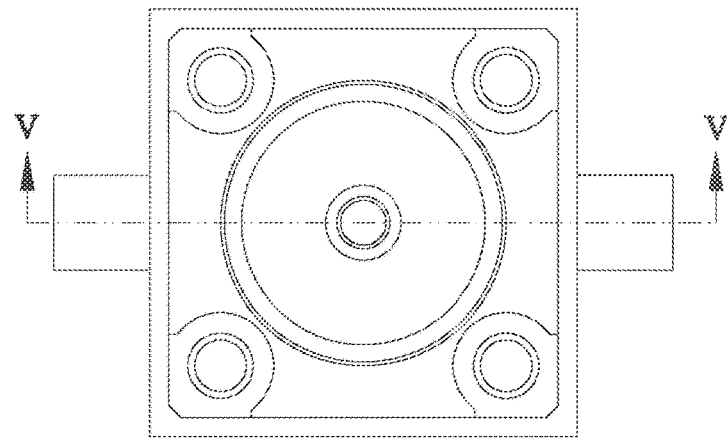
FIG. 5A illustrates a plan view of an embodiment of a control plate with flow-through passages in accordance with FIGS. 3A-3D combined with a valve topworks installed atop a high-conductance valve body having centered concentric orifice ridges in accordance with FIGS. 1A-1D.
Figure 5B:
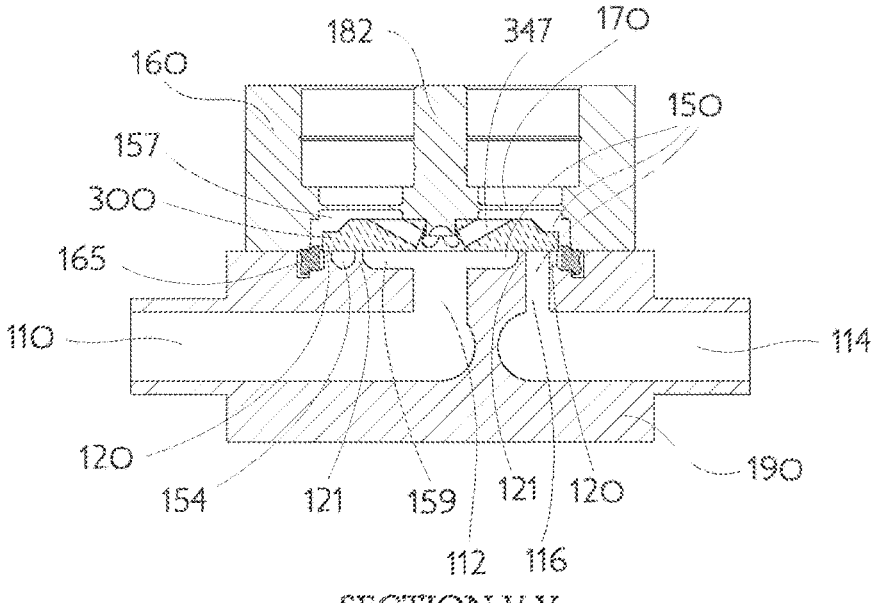
FIG. 5B illustrates a cross-sectional view of the valve assembly of FIG. 5A taken along line V-V.
Figure 5C:
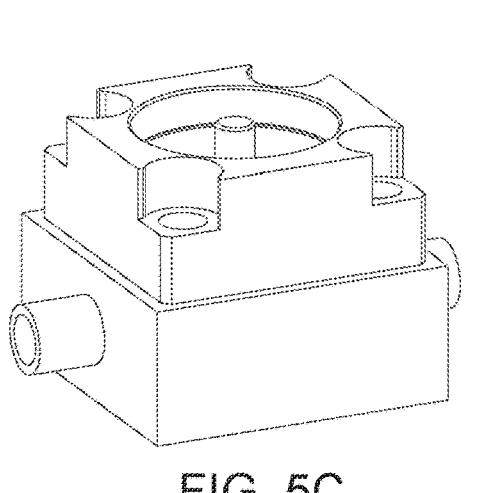
FIG. 5C illustrates a top perspective view of the valve assembly of FIG. 5A.
Figure 5D:
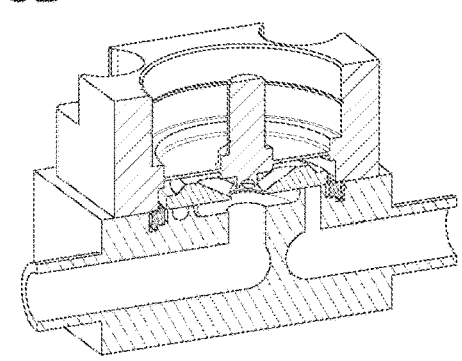
FIG. 5D illustrates a top perspective cross-sectional view of the valve assembly of FIG. 5A taken along line V-V.
Figures 2, 18A, 18B, 18C, 18D:
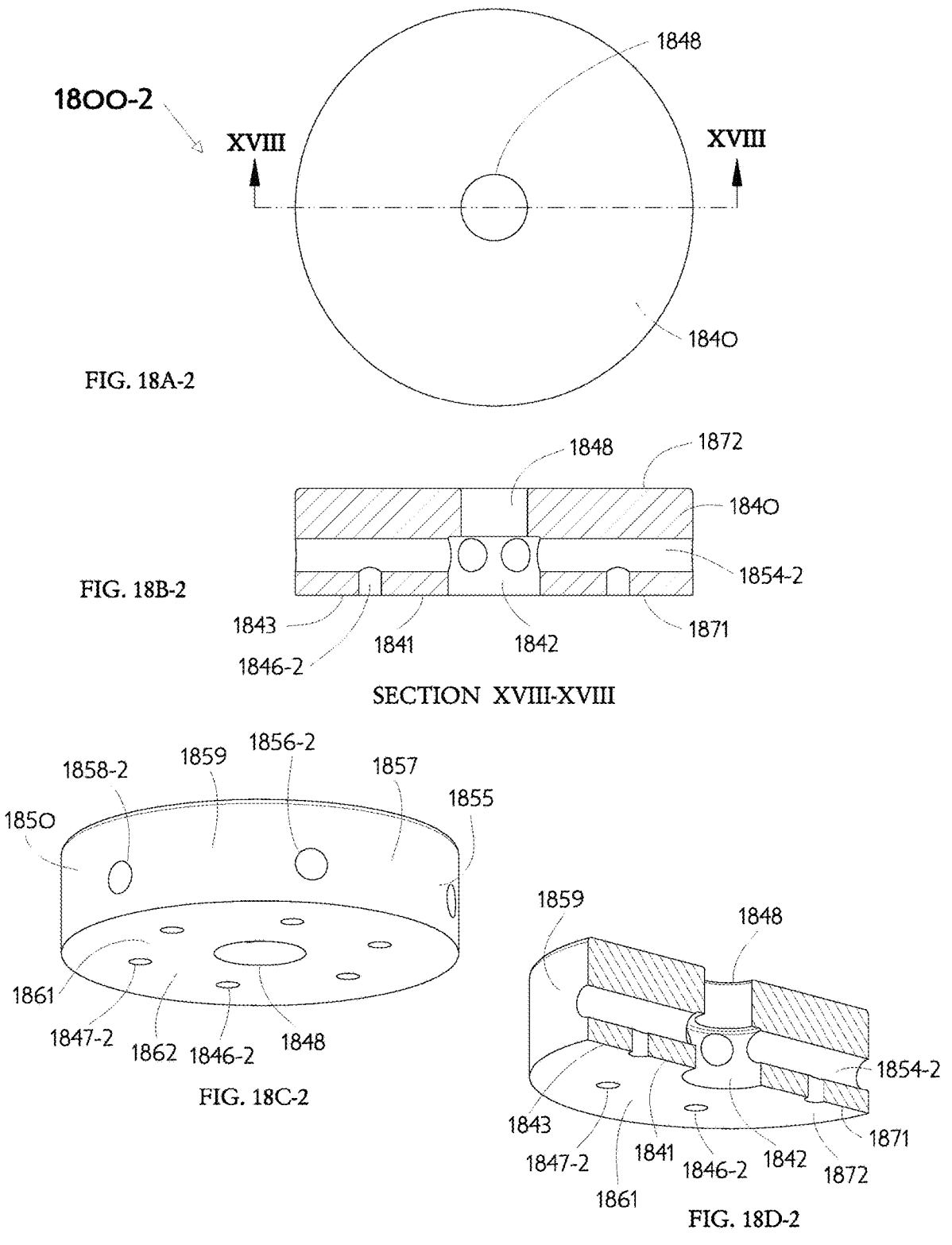
Figures 2, 20A, 20B, 20C, 20D:
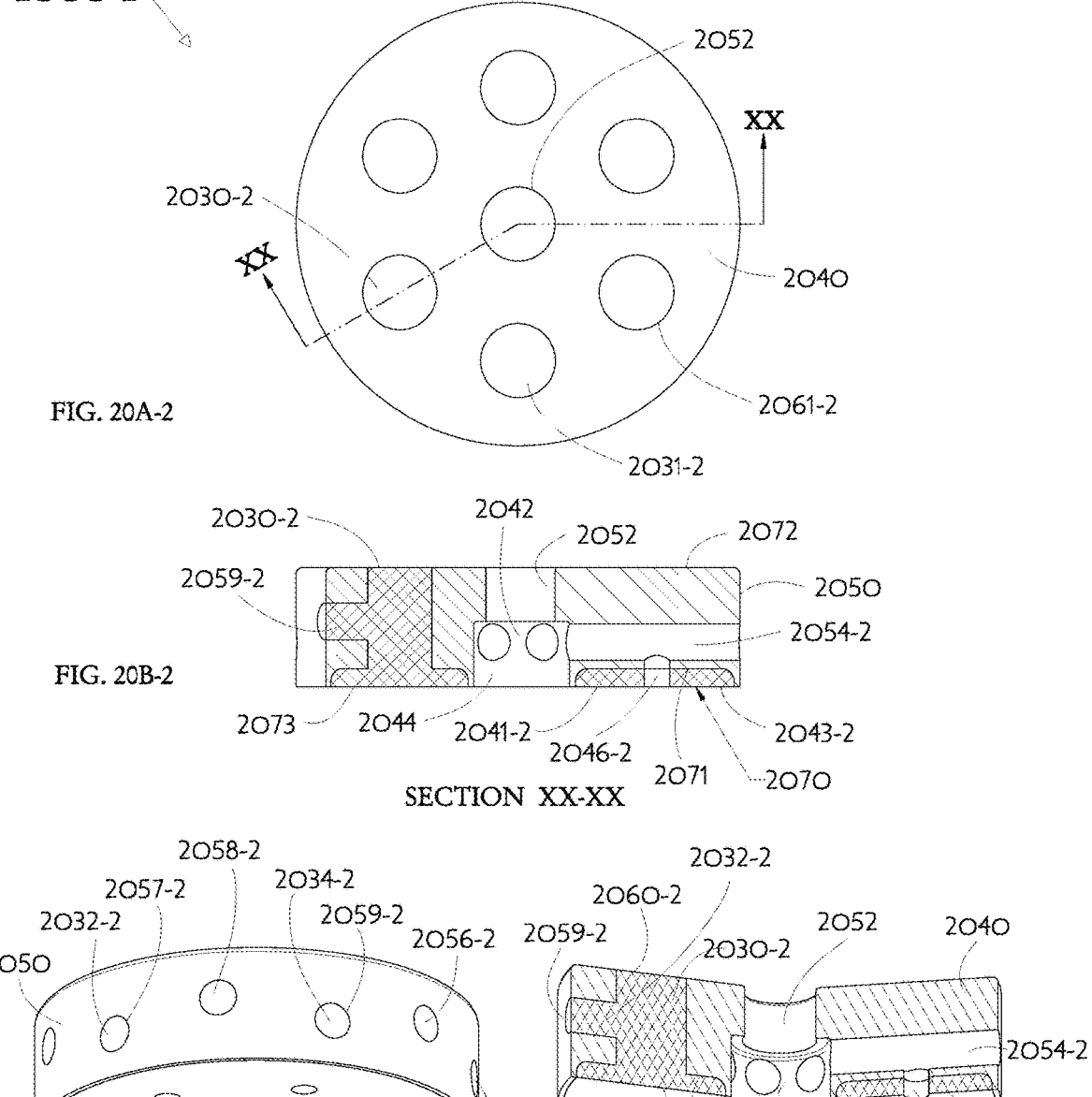

FIG. 17A illustrates a plan view of another representative high-conductance valve body having two nested groups of concentric orifice ridges;

FIG. 17B illustrates a cross-sectional elevation view of the high-conductance valve body of FIG. 17A taken along line XVII-XVII;

FIG. 17C illustrates a top perspective view of the high-conductance valve body of FIG. 17A;

FIG. 17D illustrates a top perspective view of the high-conductance valve body of FIG. 17A angled cross-section along XVII-XVII;

FIG. 18A-1 illustrates a plan view of another embodiment of a control plate with flow-through passages for a high-conductance valve;

FIG. 18A-2 illustrates a plan view of another embodiment of a control plate with flow-through passages for a high-conductance valve;

FIG. 18B-1 illustrates a cross-sectional elevation view of the control plate of FIG. 18A-1 taken along line XVIII-XVIII;

FIG. 18B-2 illustrates a cross-sectional elevation view of the control plate of FIG. 18A-2 taken along line XVIII-XVIII;

FIG. 18C-1 illustrates a top perspective view of the control plate of FIG. 18A-1; FIG. 18C-2 illustrates a top perspective view of the control plate of FIG. 18A-2;

FIG. 18D-1 illustrates atop perspective view of the control plate of FIG. 18A-1 angled cross-section along the line XVIII-XVIII;

FIG. 18D-2 illustrates a top perspective view of the control plate of FIG. 18A-2 angled cross-section along the line XVIII-XVIII;

FIG. 19A-1 illustrates a plan view of a control plate with flow-through passages in accordance with FIGS. 18A-1-18D-1 combined with a valve topworks installed atop a high-conductance valve body having nested groups of concentric orifice ridges in accordance with FIGS. 17A-17D, FIG. 19A-2 illustrates a plan view of a control plate with flow-through passages in accordance with FIGS. 18A-2-18D-2 combined with a valve topworks installed atop a high-conductance valve body having nested groups of concentric orifice ridges in accordance with FIGS. 17A-17D;

FIG. 19B-1 illustrates a cross-sectional view of the valve assembly of FIG. 19A-1 taken along line XIX-XIX;

FIG. 19B-2 illustrates a cross-sectional view of the valve assembly of FIG. 19A-2 taken along line XIX-XIX;

FIG. 19C-1 illustrates a top perspective view of the valve assembly of FIG. 19A-1;

FIG. 19C-2 illustrates a top perspective view of the valve assembly of FIG. 19A-2;

FIG. 19D-1 illustrates a top perspective view of the embodiment of FIG. 19A-1 angled cross-section along the line XIX-XIX;

FIG. 19D-2 illustrates a top perspective view of the embodiment of FIG. 19A-2 angled cross-section along the line XIX-XIX;

FIG. 20A-1 illustrates a plan view of another embodiment of a control plate with flow-through passages for a high-conductance valve;

FIG. 20A-2 illustrates a plan view of another embodiment of a control plate with flow-through passages for a high-conductance valve;

FIG. 20B-1 illustrates a cross-sectional elevation view of the control plate of FIG. 20A-1 taken along line XX-XX;

FIG. 20B-2 illustrates a cross-sectional elevation view of the control plate of FIG. 20A-2 taken along line XX-XX;

FIG. 20C-1 illustrates a top perspective view of the control plate of FIG. 20A-1; FIG. 20C-2 illustrates a top perspective view of the control plate of FIG. 20A-2;

FIG. 20D-1 illustrates a top perspective view of the control plate of FIG. 20A-1 angled cross-section along the line XX-XX;

FIG. 20D-2 illustrates a top perspective view of the control plate of FIG. 20A-2 angled cross-section along the line XX-XX;

FIG. 21A-1 illustrates a plan view of a control plate with flow-through passages in accordance with FIGS. 20A-1-20D-1 combined with a valve topworks installed atop a high-conductance valve body having nested groups of concentric orifice ridges in accordance with FIGS. 17A-17D, FIG. 21A-2 illustrates a plan view of a control plate with flow-through passages in accordance with FIGS. 20A-2-20D-2 combined with a valve topworks installed atop a high-conductance valve body having nested groups of concentric orifice ridges in accordance with FIGS. 17A-17D;

FIG. 21B-1 illustrates a cross-sectional elevation view of the valve assembly of FIG. 21A-1 taken along line XXI-XXI;

FIG. 21B-2 illustrates a cross-sectional elevation view of the valve assembly of FIG. 21A-2 taken along line XXI-XXI;

FIG. 21C-1 illustrates a top perspective view of the valve assembly of FIG. 21A-1;

FIG. 21C-2 illustrates a top perspective view of the valve assembly of FIG. 21A-2;

FIG. 21D-1 illustrates a top perspective view of the valve assembly of FIG. 21A-1 angled cross-section along the line XXI-XXI; and FIG. 21D-2 illustrates a top perspective view of the valve assembly of FIG. 21A-2 angled cross-section along the line XXI-XXI.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner," "outer," "upper," "lower," and like terms, are meant to assist with understanding relative relationships among design elements and should not be construed as meaning an absolute direction in space nor regarded as limiting.

A representative example of a high-conductance valve body 190 having centered concentric orifice ridges 120, 121 is illustrated in FIGS. 1A-1D. A more complete exemplary valve assembly 100 may have a topworks including a valve housing 160 removably joined to the valve body 190 by deforming a metallic gasket 165 as a leak-free assembly further illustrated in FIGS. 4A-4D. The topworks may include an actuator (not shown) chosen for a specific application. For example, a pneumatic actuator might be used for a simple on-off high-conductance valve, but a piezoelectric actuator might be used for a proportional control high-conductance valve adapted to a mass flow controller electronics system. Open cavities 154, 158, 159 formed in an upper surface of the valve body 190 may be considered as lower portions of a valve chamber 150 while an upper portion 157 of the valve chamber is formed in a lower surface of the valve housing 160 thereabove. A large orifice ridge 120 formed as a circular upward projection from the valve body 190 separates an outer valve chamber portion

158 from an intermediate valve chamber portion 154 which is surrounded by the large orifice ridge 120. A generally concentric small orifice ridge 121 is also formed as a circular upward projection from the valve body 190 surrounded by the large orifice ridge 120 and further separates an inner valve chamber portion 159 from the intermediate valve chamber portion 154. Throughout this disclosure a contiguous volume located between a pair of adjacent orifice ridge segments (e.g., between the large orifice ridge 120 and the small orifice ridge 121) may be referred to as an intermediate valve chamber portion, an adjacent contiguous volume disposed outside the pair (or pairs) of adjacent orifice ridge segments may be referred to as an outer valve chamber portion (e.g., 158), and an adjacent contiguous volume disposed inside the pair (or pairs) of adjacent orifice ridge segments may be referred to as an inner valve chamber portion (e.g., 159) for purposes of identification only and is not indicative of the direction of fluid flow. A gasket sealing region 164 may be formed in the upper surface of the valve body 190 to receive the metallic gasket 165 adjacent the periphery of the outer valve chamber portion 158.

The exemplary valve 100 may further comprise a first fluid conduit 110 (typically an inlet) and a second fluid conduit 114 (typically an outlet), both which conduits communicate fluid to the valve chamber 150, a valve chamber sealing diaphragm 170, and a control element moveable by deflection of the valve chamber sealing diaphragm 170. The moveable control element may be comprised of a control plate 200 (further described below) affixed to a control shaft 182 that is affixed to the diaphragm 170. In the design of the exemplary valve 100, a first fluid conduit aperture 112 provides fluid communication between the inner valve chamber portion 159 and the first fluid conduit 110. Similarly, a second fluid conduit aperture 116 provides fluid communication between the intermediate valve chamber portion 154 and the second fluid conduit 114. In the present illustrations of FIGS. 4A-4D, the valve 100 is completely closed in a shut-off no-flow condition so the control plate 200 is shown contacting both the large orifice ridge 120 and the small orifice ridge 121. Designers will appreciate the first fluid conduit 110 and second fluid conduit 114 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 190 may be used with a Hastelloy® nickel alloy control plate 200 and an Elgiloy® cobalt alloy sealing diaphragm 170.

An example of a flow-through control plate 200 illustrated in FIGS. 2A-2D comprises a control plate body 240 formed as a basically circular disk having one or more features on the opposed sides of the disk. Those features may include a central thru-hole 242, a counterbore 244, and one or more top holes 246. The counterbore 244 would typically be centered and usually be formed in a flat disk side intended to face the orifice ridges 120,121. The one or more top holes 246 may pierce the control plate body 240 from the opposite disk side and thereby leave one or more webs 248 between the central thru-hole 242 and the control plate body 240.

Alternatively, the top holes 246 may be placed to intersect the counterbore 244 while also leaving one or more webs 248 between the central thru-hole 242 and the rest of the control plate body 240. The webs 248 bridge over the counterbore 244. In either case the top holes 246 constitute fluid passageways through which fluid may pass from one side of the control plate body 240 to the opposite side without need to transit around the outside diameter periphery. As illustrated in FIGS. 4A-4D, the control plate 200 may be mounted onto a stub of the control shaft 182 and thereby suspended within the valve chamber 150. Any suitable mounting method may be used such as press fit (see, for example, FIGS. 9A-9D), swaging the head of the stub, a threaded fastener, welding, or similar design choices according to the desires of a practitioner, so long as the fluid passageways through the top holes 246 are not obscured. It should be appreciated that, rather than the control plate being mounted to the stub of the control shaft 182 using a through hole 242 as shown in FIGS. 2A-2D, a blind hole mounting may instead be used as depicted in FIGS. 9A-9D.

The manner of controlling fluid flow may be further understood by considering the inner valve chamber portion 159 surrounded by the small orifice ridge 121, being connected by the first fluid conduit aperture 112 in fluid communication with the first fluid conduit 110, whereby at least a portion of the control plate 200 may be moved toward or away from the small orifice ridge 121 to create a first control gap (not shown) through which a first fluid portion may controllably flow. The controllable first fluid portion may transit directly to the intermediate valve chamber portion 154 through the first control gap from the inner valve chamber portion 159 from whence it may exit through an offset second fluid conduit aperture 116 in fluid communication with the second fluid conduit 114. In the present example valve 100, an actuator (not shown) may apply a force to the control shaft 182 to deflect the diaphragm 170 and thereby modulate the conductance through the valve 100 by changing the first control gap.

Simultaneous with the preceding described flow of the first fluid portion, moving at least a portion of the control plate 200 toward or away from the large orifice ridge 120 similarly creates a second control gap (not shown) through which a second fluid portion may controllably flow. The controllable second fluid portion may transit from the inner valve chamber portion 159 through the top holes 246 of the control plate 200 and sweep through the upper valve chamber portion 157 into the outer valve chamber portion 158 from whence the second fluid portion may exit through the second control gap into the intermediate valve chamber portion 154. Upon reaching the intermediate valve chamber portion 154, the controllable second fluid portion also may exit through the offset second fluid conduit aperture 116 in fluid communication with the second fluid conduit 114. Thus in the present example valve 100, the actuator (not shown) applying a force to the control shaft 182 and deflecting the diaphragm 170 thereby additionally modulates the conductance through the valve 100 by changing the second control gap. It should be appreciated that while the valve 100 is closed, fluid may pass through the holes in the control plate 200, but cannot go further. When the valve 100 is closed, fluid cannot pass from the first fluid conduit 110 to the second fluid conduit 114.

Designers may appreciate the large 120 and small 121 orifice ridges need merely be nested rather than exactly concentric; moreover, the nested pair of orifice ridges 120, 121 may be placed asymmetrically with respect to the shape and dimensions of the internal valve chamber 150. The flow-through control plate 200 of course needs to have a continuous uninterrupted surface region, on the lower flat side of the disk shaped body 240, sufficient to span between contacting the large 120 and small 121 orifice ridges and cover the entire intermediate valve chamber portion 154. A single orifice ridge of non-circular shape (not shown) may also have adjacent segments enclosing an intermediate valve chamber portion that a flow-through control plate can entirely cover. Designers will also appreciate the described directions of fluid flow, progressing from the first fluid conduit 110 to the second fluid conduit 114, are used for convenience and clarity but are not limiting. Fluid may flow in an opposite direction, from the second fluid conduit 114 to the first fluid conduit 110, and the complete valve chamber 150 will still be beneficially swept by the controllable fluid flow. The valve design illustrated in FIGS. 4A-4D substantially eliminates any concerns about internal dead space versus swept volumes and may also improve dynamic response of the exemplary valve design. The flow-through control plate enables the use of nested orifice ridges 120,121 that together create total control gap length nearly double the circumference of a single large orifice while substantially reducing the area which must be closed to achieve shut-off. This combination provides high-conductance with low closing force. It should be appreciated that in a diaphragm sealed valve of the type illustrated in FIGS. 4A-4D, the amount of axial displacement (e.g., upward and downward in the cross-sectional view of FIG. 4B) of the control plate 200 is quite limited (e.g., about 50 gm for a piezoelectric actuated valve and about 200 gm for a solenoid actuated valve). The use of nested orifice ridges thus permits higher conductance that is nearly double that which could be achieved with only a single orifice ridge.

Another example of a flow-through control plate 300 is illustrated in FIGS. 3A-3D and comprises a control plate body 341 formed as a basically circular disk having one or more features on the opposed sides of the disk. Those features may include a central thru-hole 343, a spherical pocket (or recess) 345, and one or more angled top holes 347. The spherical pocket 345 would typically be centered and usually be formed in a flat disk side intended to face the orifice ridges 120,121. The one or more angled top holes 347 may pierce the control plate body 341 from the spherical pocket 345 to the opposite disk side and thereby leave one or more webs 349 between the central thru-hole 343 and the rest of the control plate body 341. The webs 349 bridge over the spherical pocket 345. The spherical pocket 345 is useful when drilling the angled top holes 347 because entry of those angled holes may be locally perpendicular to the pocket surface thereby minimizing drill wobble or bending. The angled top holes 347 constitute fluid passageways through which fluid may pass from one side of the control plate body 341 to the opposite side without need to transit around the outside diameter periphery. As illustrated in FIGS. 5A-5D, the control plate 300 may be mounted onto a stub of the control shaft 182 and thereby suspended within the valve chamber 150. Any suitable mounting method may be used such as press fit (see, for example, FIGS. 9A-9D), swaging the stub head, a threaded fastener, welding, or similar design choices according to the desires of a practitioner, so long as the fluid passageways through the angled top holes 347 are not obscured. It should be appreciated that, rather than the control plate being mounted to the stub of the control shaft 182 using a through hole 343 as shown in FIGS. 3A-3D, a blind hole mounting may instead be used as depicted in FIGS. 9A-9D.

The manner of controlling fluid flow for the valve assembly illustrated in FIGS. 5A-5D, using the exemplary flow-through control plate 300, may be further understood as essentially identical to that described for the valve assembly illustrated in FIGS. 4A-4D using the earlier mentioned exemplary flow-through control plate 200. A controllable first fluid portion may transit directly to the intermediate valve chamber portion 154 through a first control gap (not shown) from the inner valve chamber portion 159 from whence it may exit through an offset second fluid conduit aperture 116 in fluid communication with the second fluid conduit 114. Particular to the flow-through control plate design 300, a controllable second fluid portion may transit from the inner valve chamber portion 159 through the angled top holes 347 of the control plate 300 to sweep through the upper valve chamber portion 157 into the outer valve chamber portion 158, from whence the second fluid portion may exit through the second control gap into the intermediate valve chamber portion 154. The flow-through control plate 300 also needs to have a continuous uninterrupted surface region, on the lower flat side of the disk shaped body 341, sufficient to span between contacting the large 120 and small 121 orifice ridges and cover the entire intermediate valve chamber portion 154. Designers will also appreciate the described directions of fluid flow are used for convenience and clarity but are not limiting in the exemplary valve assembly illustrated in FIGS. 5A-5D. Fluid may flow in an opposite direction and the complete valve chamber 150 will still be beneficially swept by the controllable fluid flow. The valve assembly design illustrated in FIGS. 5A-5D substantially eliminates any concerns about internal dead space versus swept volumes and may also improve dynamic response of the exemplary valve design. The flow-through control plate enables the use of nested orifice ridges 120,121 that together create total control gap length nearly double the circumference of a single large orifice while substantially reducing the area which must be closed to achieve shut-off. This combination provides high-conductance with low closing force.

A representative example of another high-conductance valve body 490 having nested orifice ridges 420, 421 is illustrated in FIGS. 6A-6D. A more complete exemplary valve assembly 400 may have a topworks including a valve housing 460 removably joined to the valve body 490 by deforming a metallic gasket 465 as a leak-free assembly further illustrated in FIGS. 8A-8D. The topworks may include an actuator (not shown) chosen for a specific application. For example, a pneumatic actuator might be used for a simple on-off high-conductance valve, but a piezoelectric actuator might be used for a proportional control high-conductance valve adapted to a mass flow controller electronics system. Open cavities 454, 458, 459 formed in an upper surface of the valve body 490 may be considered as lower portions of a valve chamber while an upper portion 457 of the valve chamber is formed in a lower surface of the valve housing 460 thereabove. A large orifice ridge 420 formed as a generally circular upward projection offset within the valve body 490 separates an outer valve chamber portion 458 from an intermediate valve chamber portion 454 which the large orifice ridge 420 surrounds. A nested small orifice ridge 421 also formed as a circular upward projection from the valve body 490 further separates an inner valve chamber portion 459 from the intermediate valve chamber portion 454 which surrounds it. A gasket sealing region 464 may be formed in the upper surface of the valve body 490 to receive the metallic gasket 465 adjacent the periphery of the outer valve chamber portion 458.

The exemplary valve 400 may further comprise a first fluid conduit 417 (typically an inlet) and a second fluid conduit 414 (typically an outlet), both which conduits communicate fluid to the valve chamber, a valve chamber sealing diaphragm 470, and a control element moveable by deflection of the valve chamber sealing diaphragm 470. The control element may be comprised of a control plate 600 (further described below) including a valve stroke amplifier mechanism affixed to a control shaft 482 that is affixed to the diaphragm 470. In the design of the exemplary valve 400, a first fluid conduit aperture 419 provides fluid communication between the outer valve chamber portion 458 and the first fluid conduit 417. Similarly, a second fluid conduit aperture 416 provides fluid communication between the intermediate valve chamber portion 454 and the second fluid conduit 414. In the present illustrations of FIGS. 8A-8D the valve assembly 400 is completely closed in a shut-off no-flow condition so the control plate 600 is shown contacting both the large orifice ridge 420 and the small orifice ridge 421. Designers will appreciate the first fluid conduit 417 and the second fluid conduit 414 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 490 may be used with a Hastelloy® nickel alloy control plate 600 and an Elgiloy® cobalt alloy sealing diaphragm 470.

Another example of a flow-through control plate 600 illustrated in FIGS. 7A-7F, and included in FIGS. 8A-8D, comprises a control plate body 640 and a Valve Stroke Amplification Mechanism amplifier disc 641 as described in U.S. patent application Ser. No. 14/932,086 filed by the present inventor Kim Ngoc Vu on Nov. 4, 2015. As illustrated in FIGS. 7A-7F the control plate body 640 is formed as a basically circular disk with features which include a central thru-hole 642, a ring-shaped groove 644, and a top relief 646. The ring-shaped groove 644 and top relief 646 are formed in the disk side opposite the flat side intended to face one or more orifice ridges. The top relief 646 is placed to intersect the ring-shaped groove 644 and a portion of the central thru-hole 642 thereby providing an open fluid passageway through which fluid may pass from one side of the control plate body 640 to the opposite side without need to transit around its outside diameter periphery. The amplifier disc 641 is described in detail within the cited U.S. patent application Ser. No. 14/932,086. Amplifier disc features of interest for the instant application include a lifting hole 643, a passive segment, an active segment 649, a void passageway 639 adjacent the active segment, attachment points 645, and torsion bars 648. The control plate body 640 and amplifier disc 641 are attached to each other by welding at the two attachment points 645 whereby the torsion bars 648 and active segment 649 constitute a web that bridges over a portion of the top relief 646 and ring-shaped groove 644. A portion of the void passageway 639 is directly next to the top relief 646 thereby providing a fluid pathway through which fluid may pass from one side of the control plate 600 to the opposite side without need to transit around the outside diameter periphery of the assembly. As illustrated in FIGS. 8A-8D, the control plate 600 may be mounted onto a stub of the control shaft 482 using the stroke amplifier disc lifting hole 643 and thereby suspended within the valve chamber. Any suitable mounting method may be used such as press fit, swaging the stub head, a threaded fastener, welding, or similar design choices according to the desires of a practitioner, so long as the fluid passageway through the top relief 646 and amplifier disc void passageway 639 is not obscured.

A force from a topworks actuator (not shown) applied at the amplifier disc lifting hole 643 in the active segment 649 will be communicated to the attachment points 645 by the torsion bars 648. When such applied force is a lifting instance, the passive segment 647 will hold downward an off center first portion of the flow-through control plate body 640 while a diametrically opposite second portion is lifted upward by the diametrical force imparted at the attachment points 645. The resulting motion will open a wedge-like gap between the control plate planar bottom surface and both the large 420 and small 421 orifice ridges in the exemplary valve 400 illustrated in FIGS. 8A-8D. When the valve 400 is in a closed condition (as shown in FIGS. 8A-8D) the various amplifier disc elements are nominally coplanar and the flow-through control plate body 640 contacts the large 420 and small 421 orifice ridges.

The manner of controlling fluid flow may be further understood by considering the outer valve chamber portion 458 fed by the first fluid conduit aperture 419 in fluid communication with the first fluid conduit 417, whereby at least a portion of the control plate 600 may be moved toward or away from the large orifice ridge 420 to create a wedge-like first control gap (not shown) through which a first fluid portion may controllably flow. The controllable first fluid portion may transit directly from the outer valve chamber portion 458 through the first control gap into the intermediate valve chamber portion 454 from whence it may exit through the second fluid conduit aperture 416 in fluid communication with the second fluid conduit 414. In the present example valve 400, an actuator (not shown) may apply a force to the control shaft 482 to deflect the diaphragm 470 and thereby modulate the conductance through the valve 400 by changing the first control gap. It should be appreciated that while the valve 400 is closed, fluid may pass from the first fluid conduit 417, through the first fluid conduit aperture 419, around an outer periphery of the control plate 600, into the outer valve chamber portion 458 and the upper portion 457 of the valve chamber and through the holes in the control plate 600 to the inner valve chamber portion 459, but cannot go further. Thus, when the valve 400 is closed, fluid cannot pass from the first fluid conduit 417 to the second fluid conduit 414.

Simultaneous with the preceding described flow of the first fluid portion, moving at least a portion of the control plate 600 toward or away from the small orifice ridge 421 similarly creates a wedge-like second control gap (not shown) through which a second fluid portion may controllably flow. The controllable second fluid portion may transit from the outer valve chamber portion 458 sweeping through the upper valve chamber portion 457 and then through the control plate 600, via the amplifier disc void passageway 639 and the top relief 646 of the control plate body 640, into the inner valve chamber portion 459, and then the controllable second fluid portion may transit from the inner valve chamber portion 459 through the second control gap into the intermediate valve chamber portion 454 from whence the second fluid portion may exit through the second conduit aperture 416 in fluid communication with the second fluid conduit 414. Thus in the present example valve 400, the actuator (not shown) applying a force to the control shaft 482 and deflecting the diaphragm 470 thereby additionally modulates the conductance through the valve 400 by changing the second control gap. Designers will also appreciate the described directions of fluid flow are used for convenience and clarity but are not limiting in the exemplary valve assembly illustrated in FIGS. 8A-8D. Fluid may flow in an opposite direction and the complete valve chamber 450 will still be beneficially swept by the controllable fluid flow. The valve design illustrated in FIGS. 8A-8D substantially eliminates any concerns about internal dead space versus swept volumes and may also improve dynamic response of the exemplary valve design. The flow-through control plate enables the use of nested orifice ridges 420,421 that together create total control gap length nearly double the circumference of a single large orifice while substantially reducing the area which must be closed to achieve shut-off. This combination provides high-conductance with low closing force.

A representative example of another high-conductance valve body 890 having two nested groups of centered concentric orifice ridges 820, 821, 822, 823 is illustrated in FIGS. 10A-10D. A more complete exemplary valve assembly 1000 may have a topworks including a valve housing 860 removably joined to the valve body 890, by deforming a metallic gasket 865, as a leak-free assembly further illustrated in FIGS. 11A-11D. The topworks may include an actuator (not shown) chosen for a specific application. For example, a manual actuator might be used for a simple on-off high-conductance valve, but a piezoelectric or solenoid actuator might be used for a proportional control high-conductance valve adapted to a mass flow controller electronics system. Open cavities 852, 854, 856, 858, 859 formed in an upper surface of the valve body 890 may be considered as lower portions of a valve chamber while an upper portion 857 of the valve chamber is formed in a lower surface of the valve housing 860 thereabove. A largest orifice ridge 820 formed as a circular upward projection from the valve body 890 separates an outer valve chamber portion 858 from a first intermediate valve chamber portion 856 which is surrounded by the largest orifice ridge 820. A generally concentric first smaller orifice ridge 821 is also formed as a circular upward projection from the valve body 890 surrounded by the largest orifice ridge 820 and further separates an enclosed second intermediate valve chamber portion 854 from the first intermediate valve chamber portion 856. A generally concentric second smaller orifice ridge 822 is also formed as a circular upward projection from the valve body 890 surrounded by the first smaller orifice ridge 821 and further separates an enclosed third intermediate valve chamber portion 852 from the second intermediate valve chamber portion 854. A generally concentric smallest orifice ridge 823 is also formed as a circular upward projection from the valve body 890 surrounded by the second smaller orifice ridge 822 and further separates an inner valve chamber portion 859 from the third intermediate valve chamber portion 852. A gasket sealing region 864 may be formed in the upper surface of the valve body 890 to receive the metallic gasket 865 adjacent the periphery of the outer valve chamber portion 858.

The exemplary valve 1000 may further comprise a first fluid conduit 810 (typically an inlet) and a second fluid conduit 814 (typically an outlet), both which conduits communicate fluid to the valve chamber, a valve chamber sealing diaphragm 870, and a control element moveable by deflection of the valve chamber sealing diaphragm 870. The moveable control element may be additionally comprised of a control plate 900 (further described below) affixed to a control shaft 882 that is affixed to the diaphragm 870. In the design of the exemplary valve 1000, a first fluid conduit aperture 812 provides fluid communication between the inner valve chamber portion 859 and the first fluid conduit 810. Similarly, one or more second fluid conduit apertures 816 provide fluid communication between the first intermediate valve chamber portion 856 and the second fluid conduit 814. Also provided are one or more third inner fluid conduit apertures 818 which provide fluid communication between the third intermediate valve chamber portion 852 and the second fluid conduit 814. In the present illustration of FIGS. 11A-11D, the valve 1000 is completely closed in a shut-off no-flow condition so the control plate 900 is shown contacting all four orifice ridges: largest 820, first smaller 821, second smaller 822, and smallest 823. Designers will appreciate the first fluid conduit 810 and second fluid conduit 814 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 890 may be used with a Hastelloy® nickel alloy control plate 900 and an Elgiloy® cobalt alloy sealing diaphragm 870. Alternatively, the valve body, sealing diaphragm, and control plate body, may all be made from the same stainless steel alloy.

An example of a flow-through control plate 900 illustrated in FIGS. 9A-9D comprises a control plate body 940 formed as a basically circular disk having one or more features on the opposed sides of the disk. Those features may include a central mounting hole 942 (blind or through), one or more first middle thru-holes 944, and one or more second middle thru-holes 946. As illustrated in FIGS. 11A-11D, the control plate 900 may be mounted onto a stub of the control shaft 882 and thereby suspended within the valve chamber. Any suitable mounting method may be used such as press fit, swaging the head of the stub, a threaded fastener, welding, or similar design choices according to the desires of a practitioner, so long as the fluid passageways formed by the first middle 944 and second middle 946 thru-holes are not obscured. It should be appreciated that, rather than the control plate 900 being mounted to the stub of the control shaft 882 using a blind hole as shown in FIGS. 9A-9D, a through hole mounting may instead be used as depicted in FIGS. 2A-2D, 3A-3D, and 7A-7F.

The one or more first middle thru-holes 944 pierce the control plate body 940 and typically are uniformly spaced around a constant diameter first circle surrounding the central mounting hole 942. The diameter of the first circle and diameter of the first middle thru-holes 944 are chosen so those thru-holes only cover the inner valve chamber portion 859 and do not overlap the adjacent smallest orifice ridge 823. Angle drilling the first middle thru-holes 944, as illustrated in FIGS. 9A-9D and FIGS. 11A-11D, allows use of larger diameter holes while not overlapping the smallest orifice ridge 823. It should be appreciated that although not shown, a spherical pocket or recess may be used to aid in drilling of the first middle thru-holes 944 in the manner discussed previously with respect to FIGS. 3A-3D. The first middle thru-holes 944 constitute fluid passageways through which fluid may pass from one side of the control plate body 940 to the opposite side without need to transit around the outside diameter periphery. More particularly, the first middle thru-holes 944 fluidly connect the inner valve chamber portion 859 with the upper valve chamber portion 857. Webs of material 945 between the one or more adjacent first middle thru-holes 944 provide mechanical connection from the central mounting hole 942 to a continuous uninterrupted first surface region 941, on the lower flat side of the disk shaped control plate body 940, that first surface region 941 having radial extent sufficient to span between contacting the second smaller orifice ridge 822 and the smallest orifice ridge 823 while covering the entire third intermediate valve chamber portion 852.

The one or more second middle thru-holes 946 pierce the control plate body 940 and typically are uniformly spaced around a constant diameter second circle further surrounding the first surface region 941 and first middle thru-holes 944. The diameter of the second circle and diameter of the second middle thru-holes 946 are chosen so those thru-holes only cover the second intermediate valve chamber portion 854 and do not overlap the adjacent first smaller orifice ridge 821 nor the second smaller orifice ridge 822. The second middle thru-holes 946 constitute fluid passageways through which fluid may pass from one side of the control plate body 940 to the opposite side without need to transit around the outside diameter periphery. More particularly, the second middle thru-holes 946 fluidly connect the second intermediate valve chamber portion 854 with the upper valve chamber portion 857. Webs of material 947 between the one or more adjacent middle thru-holes 946 provide mechanical connection from the first surface region 941 to a continuous uninterrupted second surface region 943, on the lower flat side of the disk shaped body 940, that second surface region 943 having radial extent sufficient to span between contacting the largest orifice ridge 820 and first smaller orifice ridge 821 while covering the entire first intermediate valve chamber portion 856.

The manner of controlling fluid flow may be further understood by considering the inner valve chamber portion 859 surrounded by the smallest orifice ridge 823, being fed by the first fluid conduit aperture 812 in fluid communication with the first fluid conduit 810, whereby at least a portion of the control plate 900 may be moved toward or away from the smallest orifice ridge 823 to create a first control gap (not shown) through which a first fluid portion may controllably flow. The controllable first fluid portion may transit directly into the third intermediate valve chamber portion 852 from whence it may exit through one or more third fluid conduit apertures 818 in fluid communication with the second fluid conduit 814. A second fluid portion may transit from the inner valve chamber portion 859 upward through the one or more first middle thru-holes 944 into the upper portion 857 of the valve chamber, and therefrom transit downward through the one or more second middle thru-holes 946 into the second intermediate valve chamber portion 854. Moving at least a portion of the control plate 900 toward or away from the second smaller orifice ridge 822 will create a second control gap (not shown) through which the second fluid portion may also controllably flow directly into the third intermediate valve chamber portion 852 from the second intermediate valve chamber portion 854 and then exit through one or more third fluid conduit apertures 818 in fluid communication with the second fluid conduit 814. In the present example valve 1000, an actuator (not shown) may apply a force to the control shaft 882 to deflect the diaphragm 870 and thereby modulate the conductance through the valve 1000 by changing the first control gap and the second control gap.

Simultaneous with the preceding described flow of the first fluid portion and second fluid portion, moving at least a portion of the control plate 900 toward or away from the largest orifice ridge 820 similarly creates a third control gap (not shown) through which a third fluid portion may controllably flow. The controllable third fluid portion may transit from the inner valve chamber portion 859 upward through the one or more first middle thru-holes 944 of the control plate 900 and sweep through the upper valve chamber portion 857 into the outer valve chamber portion 858 from whence the third fluid portion may exit through the third control gap into the first intermediate valve chamber portion 856. Upon reaching the first intermediate valve chamber portion 856 the controllable third fluid portion may exit through the one or more second fluid conduit apertures 816 in fluid communication with the second fluid conduit 814. A fourth fluid portion may transit from the inner valve chamber portion 859 upward through the one or more first middle thru-holes 944 into the upper portion 857 of the valve chamber, and therefrom transit downward through the one or more second middle thru-holes 946 into the second intermediate valve chamber portion 854. Moving at least a portion of the control plate 900 toward or away from the first smaller orifice ridge 821 will create a fourth control gap (not shown) through which the fourth fluid portion may also controllably flow directly into the first intermediate valve chamber portion 856 from whence it may exit through one or more second inner fluid conduit apertures 816 in fluid communication with the second fluid conduit 814. Thus in the present example valve 1000, the actuator (not shown) applying a force to the control shaft 882 and deflecting the diaphragm 870 thereby additionally modulates the conductance through the valve 1000 by changing the third control gap and the fourth control gap. It should be appreciated that while the valve 1000 is closed, fluid may pass through the holes in the control plate 900 and into the upper portion 857 of the valve chamber, the outer valve chamber portion 858 and the second intermediate valve chamber portion 854, but cannot go further. Thus, when the valve 1000 is closed, fluid cannot pass from the first fluid conduit 810 to the second fluid conduit 814.

Designers may appreciate the largest 820 and first smaller 821 orifice ridges need merely be nested rather than exactly concentric; moreover, the nested pair of orifice ridges 820, 821 may be placed asymmetrically with respect to the shape and dimensions of the lower valve chamber. The flow-through control plate 900 of course primarily needs to have a continuous uninterrupted second surface region 943, on the lower flat side of the disk shaped body 940, sufficient to span between contacting the largest 820 and first smaller 821 orifice ridges and cover the entire first intermediate valve chamber portion 856. In similar fashion the second smaller 822 and smallest 823 orifice ridges need merely be nested rather than exactly concentric; moreover, the nested pair of orifice ridges 822,823 may be placed asymmetrically with respect to the shape and dimensions of the lower valve chamber. The flow-through control plate 900 of course primarily needs to have a continuous uninterrupted first surface region 941, on the lower flat side of the disk shaped body 940, sufficient to span between contacting the second smaller 822 and smallest 823 orifice ridges and cover the entire third intermediate valve chamber portion 852. Designers will also appreciate the described directions of fluid flow, progressing from the first fluid conduit 810 to the second fluid conduit 814, are used for convenience and clarity but are not limiting. Fluid may flow in an opposite direction, from the second fluid conduit 814 to the first fluid conduit 810, and the complete valve chamber will still be beneficially swept by the controllable fluid flow. The valve design illustrated in FIGS. 11A-11D substantially eliminates any concerns about internal dead space versus swept volumes and may also improve dynamic response of the exemplary valve design. The flow-through control plate enables the use of nested orifice ridges 820,821,822,823 that together create total control gap length about triple the circumference of a single large orifice while substantially reducing the area which must be closed to achieve shutoff This combination provides high-conductance with low closing force.

A representative example of another high-conductance valve body 1290 having two nested groups of centered concentric orifice ridges 1220, 1221, 1222, 1223 is illustrated in FIGS. 12A-12D. A more complete exemplary valve assembly 1400 may have a topworks including a valve housing 1460 removably joined to the valve body 1290, by deforming a metallic gasket 1465, as a leak-free assembly further illustrated in FIGS. 14A-14D. The topworks may include an actuator (not shown) chosen for a specific application. For example, a manual or solenoid actuator might be used for a simple on-off high-conductance valve, but a piezoelectric actuator might be used for a proportional control high-conductance valve adapted to a mass flow controller electronics system. Open cavities 1252, 1254, 1256, 1258, 1259 formed in an upper surface of the valve body 1290 may be considered as lower portions of a valve chamber while an upper portion 1457 of the valve chamber is formed in a lower surface of the valve housing 1460 thereabove. Consideration of FIGS. 12A-12D will acquaint designers with the fact said open cavities 1252, 1254, 1256, 1258 appear as generally circular grooves which may be all the same depth, or may vary in depth compared one to another and around the extent of any specific circular groove. A largest orifice ridge 1220 formed as a circular upward projection from the valve body 1290 separates an outer valve chamber portion 1258 from a first intermediate valve chamber portion 1256 which is surrounded by the largest orifice ridge 1220. A generally concentric first smaller orifice ridge 1221 is also formed as a circular upward projection from the valve body 1290 surrounded by the largest orifice ridge 1220 and further separates an enclosed second intermediate valve chamber portion 1254 from the first intermediate valve chamber portion 1256. A generally concentric second smaller orifice ridge 1222 is also formed as a circular upward projection from the valve body 1290 surrounded by the first smaller orifice ridge 1221 and further separates an enclosed third intermediate valve chamber portion 1252 from the second intermediate valve chamber portion 1254. A generally concentric smallest orifice ridge 1223 is also formed as a circular upward projection from the valve body 1290 surrounded by the second smaller orifice ridge 1222 and further separates an inner valve chamber portion 1259 from the third intermediate valve chamber portion 1252. It should be appreciated the top surface of each orifice ridge 1220, 1221, 1222, 1223 is coplanar with the adjacent other orifice ridges, while the depth of the individual intermediate valve chamber cavities 1252, 1254, 1256, may have varied depths and may even be contoured to encourage flow toward an aperture in the valve body 1290. A gasket sealing region 1264 may be formed in the upper surface of the valve body 1290 to receive the metallic gasket 1465 adjacent the periphery of the outer valve chamber portion 1258.

The exemplary valve 1400 may further comprise a first fluid conduit 1210 (typically an inlet) and a second fluid conduit 1214 (typically an outlet), both which conduits communicate fluid to the valve chamber, a valve chamber sealing diaphragm 1470, and a control element moveable by deflection of the valve chamber sealing diaphragm 1470. The moveable control element may be additionally comprised of a control plate 1300 (further described below) that is affixed to a control shaft 1482 that is affixed to the valve chamber sealing diaphragm 1470. In the illustration of FIGS. 14B and 14D a central insert 1350 of the control plate 1300 may be mounted onto a stub 1483 of the control shaft 1482 and thereby suspended within the upper valve chamber portion 1457. Any suitable mounting method may be used such as press fit, swaging the head of the stub, a threaded fastener, welding, or similar design choices according to the desires of a practitioner, so long as the fluid passageways through the various control plate holes are not obscured. It should be appreciated that, rather than the control plate being mounted to the stub 1483 of the control shaft 1482 using a through hole 1352 as shown in FIG. 14B and FIG. 14D, a blind hole mounting may instead be used similar to what is depicted in FIGS. 9A-9D. In the design of the exemplary valve 1400, a first fluid conduit aperture 1212 provides fluid communication between the inner valve chamber portion 1259 and the first fluid conduit 1210. Similarly, a second fluid conduit aperture 1216 shaped as a curved slot provides fluid communication between the first intermediate valve chamber portion 1256 and the second fluid conduit 1214. Also provided is a third inner fluid conduit aperture 1218 shaped as a curved slot which provides fluid communication between the third intermediate valve chamber portion 1252 and the second fluid conduit 1214. In the present illustration of FIGS. 14A-14D, the valve 1400 is completely closed in a shut-off no-flow condition so the control plate 1300 is shown contacting all four orifice ridges: largest 1220, first smaller 1221, second smaller 1222, and smallest 1223. Designers will appreciate the first fluid conduit 1210 and second fluid conduit 1214 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 1290 may be used with a Hastelloy® nickel alloy control plate 1300 and an Elgiloy® cobalt alloy sealing diaphragm 1470. Alternatively, the valve body, sealing diaphragm, and control plate body, may all be made from the same stainless steel alloy.

An example of a flow-through control plate 1300 illustrated in FIGS. 13A-13E may be comprised of two pieces pressed together: a control plate body 1340 formed as a basically circular disk having one or more features on the opposed sides of the disk, and a central insert 1350. The features of the control plate body 1340 may include a centered insert mounting hole 1348, said mounting hole effectively being defined as a counterbore 1344 that terminates in a lesser diameter control plate through hole 1342, and one or more middle thru-holes 1346. The axisymmetric central insert 1350 includes a central thru-hole 1352 and an outer rim 1358. The region between the central thru-hole 1352 and the outer rim 1358 is pierced through by one or more insert holes 1354 which are generally parallel to the central thru-hole 1352. Leaving webs of material 1355 of the central insert between the insert holes 1354 assures the outside diameter is robust enough to allow the central insert 1350 to be locked into the insert mounting hole 1348 by a simple press fit (see exploded view FIG. 13C and sectioned view FIG. 13B). Other assembly methods such as welding or brazing (in the case of metallic parts) may be contemplated, and the insert holes 1354 might be curved slots rather than round, but the illustrated design is likely least expensive to machine. The central insert 1350 can be made by injection molding, or die casting as appropriate, but such methods may not meet the density and cleanliness requirements of high purity fluid delivery apparatus as typically used in semiconductor capital equipment. The insert holes 1354 in conjunction with the control plate through hole 1342 constitute fluid passageways through which fluid may pass from one side of the control plate body 1340 to the opposite side without need to transit around the outside diameter periphery. A concave insert bottom relief (or concave bottom relief) 1353 may guide flow from the insert thru-holes 1354 toward the control plate through hole 1342. More particularly, the insert holes 1354 fluidly connect the inner valve chamber portion 1259 with the upper valve chamber portion 1457 (further explained below with respect to FIG. 14B).

An alternative design (not illustrated) for the central insert 1350 might comprise an insert shaft and an insert flange projecting radially outward. The insert flange would be pierced through by one or more flange holes generally parallel to the insert shaft. Again, leaving webs of material between the flange holes would assure the outside diameter of the insert flange would be robust enough to allow the alternative central insert to be locked into the insert mounting hole 1348 by a simple press fit. An undesirable lack of robustness has been observed when connecting such an insert shaft to a valve topworks diaphragm so this alternative design is not considered further in this disclosure with respect to any of the control plate types described herein and following below.

The diameter of the control plate through hole 1342 is chosen so as to create a continuous uninterrupted first surface region 1341, on the lower flat side of the disk shaped control plate body 1340, such that the first surface region 1341 has radial extent sufficient to span between contacting the second smaller orifice ridge 1222 and the smallest orifice ridge 1223 while covering the entire third intermediate valve chamber portion 1252. The one or more middle thru-holes 1346 pierce the control plate body 1340 and typically are uniformly spaced around a constant diameter circle further surrounding the first surface region 1341. In some embodiments, the middle thru-holes 1346 extend substantially straight through the control plate body 1340. The diameter of the constant diameter circle, and diameter of the middle thru-holes 1346, are chosen so those middle thru-holes 1346 only cover the second intermediate valve chamber portion 1254 and do not overlap the adjacent first smaller orifice ridge 1221 nor the second smaller orifice ridge 1222. The middle thru-holes 1346 constitute fluid passageways through which fluid may pass from one side of the control plate body 1340 to the opposite side without need to transit around the outside diameter periphery. More particularly, the middle thru-holes 1346 fluidly connect the second intermediate valve chamber portion 1254 with the upper valve chamber portion 1457. Webs of material 1347 between the one or more adjacent middle thru-holes 1346 provide mechanical connection from the first surface region 1341 to a continuous uninterrupted second surface region 1343, on the lower flat side of the disk shaped body 1340, that second surface region 1343 having radial extent sufficient to span between contacting the largest orifice ridge 1220 and first smaller orifice ridge 1221 while covering the entire first intermediate valve chamber portion 1256.

The manner of the exemplary valve 1400 controlling fluid flow may be further understood by considering the inner valve chamber portion 1259 surrounded by the smallest orifice ridge 1223, being fed by the first fluid conduit aperture 1212 in fluid communication with the first fluid conduit 1210, whereby at least a portion of the control plate 1300 may be moved toward or away from the smallest orifice ridge 1223 to create a first control gap (not shown) through which a first fluid portion may controllably flow. The controllable first fluid portion may transit directly into the third intermediate valve chamber portion 1252 from whence it may exit through the third inner fluid conduit aperture 1218 in fluid communication with the second fluid conduit 1214. A second fluid portion may transit from the inner valve chamber portion 1259 upward via the control plate through hole 1342 and the insert holes 1354 into the upper portion 1457 of the valve chamber, and therefrom transit downward through the middle thru-holes 1346 into the second intermediate valve chamber portion 1254. Moving at least a portion of the control plate 1300 toward or away from the second smaller orifice ridge 1222 will create a second control gap (not shown) through which the second fluid portion may also controllably flow directly into the third intermediate valve chamber portion 1252 from the second intermediate valve chamber portion 1254 and then exit through the third inner fluid conduit aperture 1218 in fluid communication with the second fluid conduit 1214. In the present example valve 1400, an actuator (not shown) may apply a force to the control shaft 1482 to deflect the diaphragm 1470, which will move the affixed control plate 1300, and thereby modulate the conductance through the valve 1400 by changing the first control gap and the second control gap.

Simultaneous with the preceding described flow of the first fluid portion and second fluid portion, moving at least a portion of the control plate 1300 toward or away from the largest orifice ridge 1220 similarly creates a third control gap (not shown) through which a third fluid portion may controllably flow. The controllable third fluid portion may transit from the inner valve chamber portion 1259 upward through the one or more insert holes 1354 of the control plate 1300 and sweep through the upper valve chamber portion 1457 into the outer valve chamber portion 1258 from whence the third fluid portion may exit through the third control gap into the first intermediate valve chamber portion 1256. Upon reaching the first intermediate valve chamber portion 1256 the controllable third fluid portion may exit through the second fluid conduit aperture 1216 in fluid communication with the second fluid conduit 1214. A fourth fluid portion may transit from the inner valve chamber portion 1259 upward through the one or more insert holes 1354 into the upper valve chamber portion 1457, and therefrom transit downward through the one or more middle thru-holes 1346 into the second intermediate valve chamber portion 1254. Moving at least a portion of the control plate 1300 toward or away from the first smaller orifice ridge 1221 will create a fourth control gap (not shown) through which the fourth fluid portion may also controllably flow directly into the first intermediate valve chamber portion 1256 from whence it may exit through the second inner fluid conduit aperture 1216 in fluid communication with the second fluid conduit 1214. Thus in the present example valve 1400, the actuator (not shown) applying a force to the control shaft 1482 and deflecting the diaphragm 1470 thereby additionally modulates the conductance through the valve 1400 by changing the third control gap and the fourth control gap. It should be appreciated that while the valve 1400 is closed, fluid may pass through the holes in the control plate 1300 and into the upper portion 1457 of the valve chamber, the outer valve chamber portion 1258 and the second intermediate valve chamber portion 1254, but cannot go further. Thus, when the valve 1400 is closed, fluid cannot pass from the first fluid conduit 1210 to the second fluid conduit 1214.

Designers may appreciate the largest 1220 and first smaller 1221 orifice ridges need merely be nested rather than exactly concentric; moreover, the nested pair of orifice ridges 1220,1221 may be placed asymmetrically with respect to the shape and dimensions of the lower valve chamber. The flow-through control plate 1300 of course primarily needs to have a continuous uninterrupted second surface region 1343, on the lower flat side of the disk shaped body 1340, sufficient to span between contacting the largest 1220 and first smaller 1221 orifice ridges and cover the entire first intermediate valve chamber portion 1256. In similar fashion the second smaller 1222 and smallest 1223 orifice ridges need merely be nested rather than exactly concentric; moreover, the nested pair of orifice ridges 1222, 1223 may be placed asymmetrically with respect to the shape and dimensions of the lower valve chamber. The flow-through control plate 1300 of course primarily needs to have a continuous uninterrupted first surface region 1341, on the lower flat side of the disk shaped body 1340, sufficient to span between contacting the second smaller 1222 and smallest 1223 orifice ridges and cover the entire third intermediate valve chamber portion 1252. Designers will also appreciate the described directions of fluid flow, progressing from the first fluid conduit 1210 to the second fluid conduit 1214, are used for convenience and clarity but are not limiting. Fluid may flow in an opposite direction, from the second fluid conduit 1214 to the first fluid conduit 1210, and the complete valve chamber will still be beneficially swept by the controllable fluid flow. The valve design illustrated in FIGS. 14A-14D substantially eliminates any concerns about internal dead space versus swept volumes and may also improve dynamic response of the exemplary valve design. The flow-through control plate enables the use of nested orifice ridges 1220,1221,1222,1223 that together create total control gap length about triple the circumference of a single large orifice while substantially reducing the area which must be closed to achieve shut-off. This combination provides high-conductance with low closing force.

Another exemplary high conductance valve 1600 is illustrated in FIGS. 16A-16D. Similar to the previously described valve 1400, this valve uses the high conductance valve body 1290 having two nested groups of centered concentric orifice ridges and a valve topworks including a valve housing 1460 removably joined to the valve body 1290, by deforming a metallic gasket 1465, a valve chamber sealing diaphragm 1470, and a control element moveable by deflection of the valve chamber sealing diaphragm 1470. The moveable control element may be additionally comprised of another control plate 1500 (further described below) that is affixed to a control shaft 1482 that is affixed to the diaphragm 1470. In the illustration of FIGS. 16B and 16D a central insert 1550 of the control plate 1500 may be mounted onto a stub 1483 of the control shaft 1482 and thereby suspended within the upper valve chamber portion 1457. Any suitable mounting method may be used such as press fit, swaging the head of the stub, a threaded fastener, welding, or similar design choices according to the desires of a practitioner, so long as the fluid passageways through the various control plate holes are not obscured. It should be appreciated that, rather than the control plate being mounted to the stub 1483 of the control shaft 1482 using a through hole 1552 as shown in FIG. 16B and FIG. 16D, a blind hole mounting may instead be used similar to what is depicted in FIGS. 9A-9D. In the design of the exemplary valve 1600, a first fluid conduit aperture 1212 provides fluid communication between the inner valve chamber portion 1259 and the first fluid conduit 1210. Similarly, a second fluid conduit aperture 1216 shaped as a curved slot provides fluid communication between the first intermediate valve chamber portion 1256 and the second fluid conduit 1214. Also provided is a third inner fluid conduit aperture 1218 shaped as a curved slot which provides fluid communication between the third intermediate valve chamber portion 1252 and the second fluid conduit 1214. In the present illustration of FIGS. 16A-16D, the valve 1600 is completely closed in a shut-off no-flow condition so the control plate 1500 is shown contacting all four orifice ridges: largest 1220, first smaller 1221, second smaller 1222, and smallest 1223. Designers will appreciate the first fluid conduit 1210 and second fluid conduit 1214 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 1290 may be used with a Hastelloy® nickel alloy control plate 1500 and an Elgiloy® cobalt alloy sealing diaphragm 1470. Alternatively, the valve body, sealing diaphragm, and control plate body, may all be made from the same stainless steel alloy.

An example of a flow-through control plate 1500 illustrated in FIGS. 15A-15E may be comprised of three elements assembled by a combination of processes: a control plate body 1540 formed as a basically circular disk, with a polymeric insert (seat insert) 1530, together having one or more features on the opposed sides of the disk, and a central insert 1550. The features of the control plate body 1540 may include a centered insert mounting hole 1548, said mounting hole effectively being defined as a counterbore 1544 that terminates in a lesser diameter control plate through hole 1542, and one or more middle through cavities 1549. The axisymmetric central insert 1550 includes a central thru-hole 1552 and an outer rim 1558. The region between the central thru-hole 1552 and the outer rim 1558 is pierced through by one or more insert holes 1554 which are generally parallel to the central thru-hole 1552. Leaving webs of material 1555 between the insert holes 1554 assures the outside diameter of the outer rim 1558 is robust enough to allow the central insert 1550 to be locked into the insert mounting hole 1548 by a simple press fit (see exploded view FIG. 15C and sectioned view FIG. 15B). Other assembly methods such as welding or brazing (in the case of metallic parts) may be contemplated, and the insert holes 1554 might be curved slots rather than round, but the illustrated design is likely least expensive to machine. The central insert 1550 can be made by injection molding, or die casting as appropriate, but such methods may not meet the density and cleanliness requirements of high purity fluid delivery apparatus as typically used in semiconductor capital equipment. The insert holes 1554 in conjunction with the control plate through hole 1542 constitute fluid passageways through which fluid may pass from one side of the control plate body 1540 to the opposite side without need to transit around the outside diameter periphery. A concave insert bottom relief (or concave bottom relief) 1553 may guide flow from the insert thru-holes 1554 toward the control plate through hole 1542. More particularly, the insert holes 1554 fluidly connect the inner valve chamber portion 1259 with the upper valve chamber portion 1457 (further explained below with respect to FIG. 16B). As previously noted, an alternative design (not illustrated) for the central insert 1550 might comprise an insert shaft and an insert flange projecting radially outward. The insert flange would be pierced through by one or more flange holes generally parallel to the insert shaft. An undesirable lack of robustness has been observed when connecting such an insert shaft to a valve topworks diaphragm and therefore is not further discussed herein.

The representative polymeric insert 1530 illustrated in FIGS. 15B, 15C and 15E, may have specific features formed as a consequence of being compression molded into openings within the control plate body 1540. For example, the insert may include a plurality of pillars that are each received into one of a plurality of openings in the control plate body due to a molding process. A typical compression molding process starts with polychlorotrifluoroethylene (PCTFE) powder filling the control plate body 1540 openings 1545, 1549 and then polymerizes the powder under the effect of heat and pressure applied directly into the control plate body 1540 by known methods. The exemplary polymer insert 1530 has a plurality of polymer pillars 1531 formed into and mating the plurality of middle through cavities 1549 while also being interconnected by a contiguous relatively thin polymer disc 1532 which fills a wide shallow circular groove 1545 formed in the control plate body 1540 (facing toward the orifice ridges as further explained with respect to FIG. 16B below). Middle thru-holes 1546 pierce the polymer pillars 1531 and constitute fluid passageways through which fluid may pass from one side of the control plate body 1540 to the opposite side without need to transit around the outside diameter periphery. Inside diameter of the thin polymer disc 1532 which fills a wide shallow circular groove 1545 (slightly larger than diameter of the control plate through hole 1542) is chosen so as to create a continuous uninterrupted first surface region 1541, on the lower flat side of the disk shaped control plate body 1540, such that the first surface region 1541 has radial extent sufficient to span between contacting the second smaller orifice ridge 1222 and the smallest orifice ridge 1223 while covering the entire third intermediate valve chamber portion 1252. The one or more middle thru-holes 1546 pierce the one or more polymer pillars 1531, which fill the one or more middle through cavities 1549 formed in the control plate body 1540, and typically are uniformly spaced around a constant diameter circle further surrounding the first surface region 1541. In some embodiments, the middle thru-holes 1546 extend substantially straight through the one or more polymer pillars 1531 and thin polymer disc 1532. The diameter of the constant diameter circle and diameter of the middle thru-holes 1546 are chosen so those thru-holes only cover the second intermediate valve chamber portion 1254 and do not overlap the adjacent first smaller orifice ridge 1221 nor the second smaller orifice ridge 1222. More particularly, the middle thru-holes 1546 fluidly connect the intermediate valve chamber portion 1254 with the upper valve chamber portion 1457. Webs of material 1547 between the one or more adjacent middle through cavities 1549 provide additional mechanical support for the polymer disc 1532 that spans from the first surface region 1541 to a continuous uninterrupted second surface region 1543, on the lower flat side of the disk shaped body 1540, that second surface region 1543 having radial extent sufficient to span between contacting the largest orifice ridge 1220 and first smaller orifice ridge 1221 while covering the entire first intermediate valve chamber portion 1256.

The manner of the exemplary valve 1600 controlling fluid flow may be further understood by considering the inner valve chamber portion 1259 surrounded by the smallest orifice ridge 1223, being fed by the first fluid conduit aperture 1212 in fluid communication with the first fluid conduit 1210, whereby at least a portion of the control plate 1500 may be moved toward or away from the smallest orifice ridge 1223 to create a first control gap (not shown) through which a first fluid portion may controllably flow. The controllable first fluid portion may transit directly into the third intermediate valve chamber portion 1252 from whence it may exit through the third inner fluid conduit aperture 1218 in fluid communication with the second fluid conduit 1214. A second fluid portion may transit from the inner valve chamber portion 1259 upward via the control plate through hole 1542 and the insert holes 1554 into the upper portion 1457 of the valve chamber, and therefrom transit downward through the middle thru-holes 1546 into the second intermediate valve chamber portion 1254. Moving at least a portion of the control plate 1500 toward or away from the second smaller orifice ridge 1222 will create a second control gap (not shown) through which the second fluid portion may also controllably flow directly into the third intermediate valve chamber portion 1252 from the second intermediate valve chamber portion 1254 and then exit through the third inner fluid conduit aperture 1218 in fluid communication with the second fluid conduit 1214. In the present example valve 1600, an actuator (not shown) may apply a force to the control shaft 1482 to deflect the diaphragm 1470, which will move the affixed control plate 1500, and thereby modulate the conductance through the valve 1600 by changing the first control gap and the second control gap.

Simultaneous with the preceding described flow of the first fluid portion and second fluid portion, moving at least a portion of the control plate 1500 toward or away from the largest orifice ridge 1220 similarly creates a third control gap (not shown) through which a third fluid portion may controllably flow. The controllable third fluid portion may transit from the inner valve chamber portion 1259 upward through the one or more insert holes 1554 of the control plate 1500 and sweep through the upper valve chamber portion 1457 into the outer valve chamber portion 1258 from whence the third fluid portion may exit through the third control gap into the first intermediate valve chamber portion 1256. Upon reaching the first intermediate valve chamber portion 1256 the controllable third fluid portion may exit through the second fluid conduit aperture 1216 in fluid communication with the second fluid conduit 1214. A fourth fluid portion may transit from the inner valve chamber portion 1259 upward through the one or more insert holes 1554 into the upper valve chamber portion 1457, and therefrom transit downward through the one or more middle thru-holes 1546 into the second intermediate valve chamber portion 1254. Moving at least a portion of the control plate 1500 toward or away from the first smaller orifice ridge 1221 will create a fourth control gap (not shown) through which the fourth fluid portion may also controllably flow directly into the first intermediate valve chamber portion 1256 from whence it may exit through the second inner fluid conduit aperture 1216 in fluid communication with the second fluid conduit 1214. Thus in the present example valve 1600, the actuator (not shown) applying a force to the control shaft 1482 and deflecting the diaphragm 1470 thereby additionally modulates the conductance through the valve 1600 by changing the third control gap and the fourth control gap. It should be appreciated that while the valve 1600 is closed, fluid may pass through the holes in the control plate 1500 and into the upper portion 1457 of the valve chamber, the outer valve chamber portion 1258 and the second intermediate valve chamber portion 1254, but cannot go further. Thus, when the valve 1600 is closed, fluid cannot pass from the first fluid conduit 1210 to the second fluid conduit 1214.

Designers may appreciate the largest 1220 and first smaller 1221 orifice ridges need merely be nested rather than exactly concentric; moreover, the nested pair of orifice ridges 1220,1221 may be placed asymmetrically with respect to the shape and dimensions of the lower valve chamber. The flow-through control plate 1500 of course primarily needs to have a continuous uninterrupted second surface region 1543, on the lower flat side of the disk shaped body 1540, sufficient to span between contacting the largest 1220 and first smaller 1221 orifice ridges and cover the entire first intermediate valve chamber portion 1256. In similar fashion the second smaller 1222 and smallest 1223 orifice ridges need merely be nested rather than exactly concentric; moreover, the nested pair of orifice ridges 1222, 1223 may be placed asymmetrically with respect to the shape and dimensions of the lower valve chamber. The flow-through control plate 1500 of course primarily needs to have a continuous uninterrupted first surface region 1541, on the lower flat side of the disk shaped body 1540, sufficient to span between contacting the second smaller 1222 and smallest 1223 orifice ridges and cover the entire third intermediate valve chamber portion 1252. Designers will also appreciate the described directions of fluid flow, progressing from the first fluid conduit 1210 to the second fluid conduit 1214, are used for convenience and clarity but are not limiting. Fluid may flow in an opposite direction, from the second fluid conduit 1214 to the first fluid conduit 1210, and the complete valve chamber will still be beneficially swept by the controllable fluid flow. The valve design illustrated in FIGS. 16A-16D substantially eliminates any concerns about internal dead space versus swept volumes and may also improve dynamic response of the exemplary valve design. The flow-through control plate enables the use of nested orifice ridges 1220,1221,1222,1223 that together create total control gap length about triple the circumference of a single large orifice while substantially reducing the area which must be closed to achieve shut-off. This combination provides high-conductance with low closing force and the inclusion of the relatively soft polymer insert 1530 will further improve shut-off tightness of the valve 1600.

A representative example of another high-conductance valve body 1790 having two nested groups of centered concentric orifice ridges 1720, 1721, 1722, 1723 is illustrated in FIGS. 17A-17D. A more complete exemplary valve assembly 1900-1 may have a topworks including a valve housing 1960 removably joined to the valve body 1790, by deforming a metallic gasket 1965, as a leak-free assembly further illustrated in FIGS. 19A-1-19D-1. Another more complete exemplary valve assembly 1900-2 may have a topworks including a valve housing 1960 removably joined to the valve body 1790, by deforming a metallic gasket 1965, as a leak-free assembly further illustrated in FIGS. 19A-2-19D-2. The topworks may include an actuator (not shown) chosen for a specific application. For example, a manual or solenoid actuator might be used for a simple on-off high-conductance valve, but a piezoelectric actuator might be used for a proportional control high-conductance valve adapted to a mass flow controller electronics system. Open cavities 1752, 1754, 1756, 1758, 1759 formed in an upper surface of the valve body 1790 may be considered as lower portions of a valve chamber while an upper portion 1957 of the valve chamber is formed in a lower surface of the valve housing 1960 thereabove. Consideration of FIGS. 17A-17D will acquaint designers with the fact said open cavities 1752, 1754, 1756, 1278 appear as generally circular grooves which may be all the same depth, or may vary in depth compared one to another and around the extent of any specific circular groove. A largest orifice ridge 1720 formed as a circular upward projection from the valve body 1790 separates an outer valve chamber portion 1758 from a first intermediate valve chamber portion 1756 which is surrounded by the largest orifice ridge 1720. A generally concentric first smaller orifice ridge 1721 is also formed as a circular upward projection from the valve body 1790 surrounded by the largest orifice ridge 1720 and further separates an enclosed second intermediate valve chamber portion 1754 from the first intermediate valve chamber portion 1756. A generally concentric second smaller orifice ridge 1722 is also formed as a circular upward projection from the valve body 1790 surrounded by the first smaller orifice ridge 1721 and further separates an enclosed third intermediate valve chamber portion 1752 from the second intermediate valve chamber portion 1754. A generally concentric smallest orifice ridge 1723 is also formed as a circular upward projection from the valve body 1790 surrounded by the second smaller orifice ridge 1722 and further separates an inner valve chamber portion 1759 from the third intermediate valve chamber portion 1752. It should be appreciated the top surface of each orifice ridge 1720, 1721, 1722, 1723 is coplanar with the adjacent other orifice ridges, while the depth of the individual intermediate valve chamber cavities 1752, 1754, 1756, may have varied depths and may even be contoured to encourage flow toward an aperture in the valve body 1790. A gasket sealing region 1764 may be formed in the upper surface of the valve body 1790 to receive the metallic gasket 1765 adjacent the periphery of the outer valve chamber portion 1758.

The exemplary valve 1900-1, 1900-2 may further comprise a first fluid conduit 1710 (typically an inlet) and a second fluid conduit 1714 (typically an outlet), both which conduits communicate fluid to the valve chamber upper and lower portions, a valve chamber sealing diaphragm 1970, and a control element moveable by deflection of the valve chamber sealing diaphragm 1970. The moveable control element may be additionally comprised of a control plate 1800-1, 1800-2 (further described below) that is affixed to the valve chamber sealing diaphragm 1970. In the illustration of FIGS. 19B-1, 19B-2 and 19D-1, 19D-2 the control plate 1800-1, 1800-2 may be mounted onto a stub 1983 projecting from the diaphragm 1970 and thereby suspended within the upper valve chamber portion 1957. The distance between the control plate 2000-2 and the valve chamber sealing diaphragm 2170 is minimized to reduce or eliminate sweep volume. Any suitable mounting method may be used such as press fit, swaging the head of the stub, a threaded fastener, welding, or similar design choices according to the desires of a practitioner, so long as the fluid passageways through the various control plate holes are not obscured. It should be appreciated that, rather than the control plate being mounted to the stub 1983 using a through hole 1952 as shown in FIGS. 19B-1, 19B-1 and 19D-1, 19D-2, a blind hole mounting may instead be used similar to what is depicted in FIGS. 9A-9D. In the design of the exemplary valve 1900-1, 1900-2 a first fluid conduit aperture 1712 provides fluid communication between the inner valve chamber portion 1759 and the first fluid conduit 1710.

Similarly, a second fluid conduit aperture 1716 shaped as a curved slot provides fluid communication between the first intermediate valve chamber portion 1756 and the second fluid conduit 1714. Also provided is a third inner fluid conduit aperture 1718 shaped as a curved slot which provides fluid communication between the third intermediate valve chamber portion 1752 and the second fluid conduit 1714. In the present illustration of FIGS. 19A-1-19D-1 and 19A-2-19D-2, the valve 1900-1, 1900-2 is completely closed in a shut-off no-flow condition so the control plate 1800-1, 1800-2 is shown contacting all four orifice ridges: largest 1720, first smaller 1721, second smaller 1722, and smallest 1723. Designers will appreciate the first fluid conduit 1710 and second fluid conduit 1714 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 1790 may be used with a Hastelloy® nickel alloy control plate 1800-1, 1800-2 and an Elgiloy® cobalt alloy sealing diaphragm 1970. Alternatively, the valve body, sealing diaphragm, and control plate body, may all be made from the same stainless steel alloy.

An example of a flow-through control plate 1800-1 illustrated in FIGS. 18A-118D-1 comprises a control plate body 1840 formed as a basically circular disk having a first side 1871 and an opposed second side 1872 axially separated by a circumferential perimeter 1850 of the control plate body 1840. One or more holes or features are formed in the circumferential perimeter 1850 and opposed sides of the disk. Those holes may include a central mounting hole 1848 (blind or through) in the second side 1872, one or more axial thru-holes 1846-1,1847-1 which provide fluid communication from the first side 1871 to the second side 1872, a counterbore 1842 in the first side, and one or more radial holes 1854-1, 1856-1, 1858-1 which provide fluid communication from the counterbore 1842 to the circumferential perimeter 1850. As illustrated in FIGS. 18A-1-18D-1, the control plate 1800-1 may be mounted onto a stub 1983 projecting from the diaphragm 1970 and thereby suspended within the upper valve chamber portion 1957. Any suitable mounting method may be used such as press fit, swaging the head of the stub, a threaded fastener, welding, or similar design choices according to the desires of a practitioner, so long as the fluid passageways formed by the axial thru-holes 1846-1, 1847-1 are not obscured. It should be appreciated that, rather than the control plate 1800-1 being mounted to the stub 1983 using a blind hole as shown in FIGS. 9A-9D, a through hole mounting may instead be used as depicted in FIGS. 2A-2D, 3A-3D, and 7A-7F.

The one or more axial thru-holes 1846-1, 1847-1 pierce the control plate body 1840 and typically are uniformly spaced around a constant diameter first circle surrounding the central mounting hole 1848. The diameter of the first circle and diameter of the axial thru-holes 1846-1, 1847-1 are chosen so those axial thru-holes only cover the second intermediate valve chamber portion 1754 and do not overlap the adjacent first smaller orifice ridge 1721 nor the second smaller orifice ridge 1722. The axial thru-holes 1846-1, 1847-1 constitute fluid passageways through which fluid may pass from the first side 1871 of the control plate body 1840 to the opposite second side 1872. More particularly, the axial thru-holes 1846-1, 1847-1 fluidly connect the second intermediate valve chamber portion 1754 with the upper valve chamber portion 1957. Solid material of the control plate body 1840 provides mechanical connection from the central mounting hole 1848 to a continuous uninterrupted first surface region 1841, on the first side 1871 of the disk shaped control plate body 1840, that first surface region 1841 having radial extent sufficient to span between contacting the second smaller orifice ridge 1722 and the smallest orifice ridge 1723 while covering the entire third intermediate valve chamber portion 1752. Solid portions 1861, 1862 of the control plate body 1840 between the one or more adjacent axial thru-holes 1846-1, 1847-1 provide mechanical connection from the central mounting hole 1848 to a continuous uninterrupted second surface region 1843, on the first side 1871 of the disk shaped control plate body 1840, that second surface region 1843 having radial extent sufficient to span between contacting the largest orifice ridge 1720 and the first smaller orifice ridge 1721 while covering the entire first intermediate valve chamber portion 1756.

A central counterbore 1842 is formed in the first side 1871 of the control plate body 1840 projecting into the body toward the opposed second side 1872. One or more radial holes 1854-1, 1856-1, 1858-1 extend from the counterbore 1842 through the control plate body 1840 creating fluid passageways connecting to the circumferential perimeter 1850. The radial holes 1854-1, 1856-1, 1858-1 are typically formed at equal angles thereby resulting in uniform spacing around the circumferential perimeter 1850 alternating with solid regions 1855, 1857, 1859 between the holes. It should be appreciated the depth of the central counterbore 1842 may be varied but must be greater than the penetrating radial holes 1854-1, 1856-1, 1858-1. The counterbore diameter must be less than the inside diameter of the smallest orifice ridge 1723 to ensure the continuous uninterrupted first surface region 1841 seals the third intermediate valve chamber portion 1752 when the valve 1900-1 is in the illustrated closed condition. The counterbore 1842 may intersect the central mounting hole 1848, or may not (blind mounting hole), and may be of same or different diameter.

The manner of the exemplary valve 1900-1 controlling fluid flow may be further understood by considering the inner valve chamber portion 1759 surrounded by the smallest orifice ridge 1723, being fed by the first fluid conduit aperture 1712 in fluid communication with the first fluid conduit 1710, whereby at least a portion of the control plate 1800-1 may be moved toward or away from the smallest orifice ridge 1723 to create a first control gap (not shown) through which a first fluid portion may controllably flow. The controllable first fluid portion may transit directly into the third intermediate valve chamber portion 1752 from whence it may exit through the third inner fluid conduit aperture 1718 in fluid communication with the second fluid conduit 1714. A second fluid portion may transit from the inner valve chamber portion 1759 upward via the control plate counterbore 1842 and the radial holes 1854-1, 1856-1, 1858-1 past the circumferential perimeter 1850 into the upper portion 1957 of the valve chamber, and therefrom transit downward through the axial thru-holes 1846-1, 1847-1 into the second intermediate valve chamber portion 1754. Moving at least a portion of the control plate 1800-1 toward or away from the second smaller orifice ridge 1722 will create a second control gap (not shown) through which the second fluid portion may also controllably flow directly into the third intermediate valve chamber portion 1752 from the second intermediate valve chamber portion 1754 and then exit through the third inner fluid conduit aperture 1718 in fluid communication with the second fluid conduit 1714. In the present example valve 1900-1, an actuator (not shown) may apply a force to the control shaft 1982 to deflect the diaphragm 1970, which will move the affixed control plate 1800-1, and thereby modulate the conductance through the valve 1900-1 by changing the first control gap and the second control gap.

Simultaneous with the preceding described flow of the first fluid portion and second fluid portion, moving at least a portion of the control plate 1800-1 toward or away from the largest orifice ridge 1720 similarly creates a third control gap (not shown) through which a third fluid portion may controllably flow. The controllable third fluid portion may transit from the inner valve chamber portion 1759 upward through the control plate counterbore 1842 and the radial holes 1854-1, 1856-1, 1858-1 past the circumferential perimeter 1850 and sweep through the upper valve chamber portion 1957 into the outer valve chamber portion 1758 from whence the third fluid portion may exit through the third control gap into the first intermediate valve chamber portion 1756. Upon reaching the first intermediate valve chamber portion 1756 the controllable third fluid portion may exit through the second fluid conduit aperture 1716 in fluid communication with the second fluid conduit 1714. A fourth fluid portion may transit from the inner valve chamber portion 1759 upward through the control plate counterbore 1742 and the radial holes 1854-1, 1856-1, 1858-1 past the circumferential perimeter 1850 into the upper valve chamber portion 1957, and therefrom transit downward through the one or more axil thru-holes 1846-1, 1847-1 into the second intermediate valve chamber portion 1754. Moving at least a portion of the control plate 1800-1 toward or away from the first smaller orifice ridge 1721 will create a fourth control gap (not shown) through which the fourth fluid portion may also controllably flow directly into the first intermediate valve chamber portion 1756 from whence it may exit through the second inner fluid conduit aperture 1716 in fluid communication with the second fluid conduit 1714. Thus in the present example valve 1900-1, the actuator (not shown) applying a force to the control shaft 1982 and deflecting the diaphragm 1970 thereby additionally modulates the conductance through the valve 1900-1 by changing the third control gap and the fourth control gap. It should be appreciated that while the valve 1900-1 is closed, fluid may pass through the axial and radial holes in the control plate 1800-1 and into the upper portion 1957 of the valve chamber, the outer valve chamber portion 1758 and the second intermediate valve chamber portion 1754, but cannot go further. Thus, when the valve 1900-1 is closed, fluid cannot pass from the first fluid conduit 1710 to the second fluid conduit 1714.

Designers may appreciate the largest 1720 and first smaller 1721 orifice ridges need merely be nested rather than exactly concentric; moreover, the nested pair of orifice ridges 1220,1221 may be placed asymmetrically with respect to the shape and dimensions of the lower valve chamber. The flow-through control plate 1800-1 of course primarily needs to have a continuous uninterrupted second surface region 1843, on the lower first side 1871 of the disk shaped body 1840, sufficient to span between contacting the largest 1720 and first smaller 1721 orifice ridges and cover the entire first intermediate valve chamber portion 1756. In similar fashion the second smaller 1722 and smallest 1723 orifice ridges need merely be nested rather than exactly concentric; moreover, the nested pair of orifice ridges 1722, 1723 may be placed asymmetrically with respect to the shape and dimensions of the lower valve chamber. The flow-through control plate 1800-1 of course primarily needs to have a continuous uninterrupted first surface region 1841, on the lower first side 1871 of the disk shaped body 1840, sufficient to span between contacting the second smaller 1722 and smallest 1723 orifice ridges and cover the entire third intermediate valve chamber portion 1752. Designers will also appreciate the described directions of fluid flow, progressing from the first fluid conduit 1710 to the second fluid conduit 1714, are used for convenience and clarity but are not limiting. Fluid may flow in an opposite direction, from the second fluid conduit 1714 to the first fluid conduit 1710, and the complete valve chamber will still be beneficially swept by the controllable fluid flow. The valve design illustrated in FIGS. 19A-1-19D-1 substantially eliminates any concerns about internal dead space versus swept volumes and may also improve dynamic response of the exemplary valve design. The flow-through control plate enables the use of nested orifice ridges 1720,1721,1722, 1723 that together create total control gap length about triple the circumference of a single large orifice while substantially reducing the area which must be closed to achieve shut-off. This combination provides high-conductance with low closing force.

Another exemplary valve assembly 2100-1 may have a topworks including a valve housing 2160 removably joined to the valve body 1790, by deforming a metallic gasket 2165, as a leak-free assembly further illustrated in FIGS. 21A-1-21D-1. The topworks may include an actuator (not shown) chosen for a specific application. For example, a manual or solenoid actuator might be used for a simple on-off high-conductance valve, but a piezoelectric actuator might be used for a proportional control high-conductance valve adapted to a mass flow controller electronics system. Open cavities 1752, 1754, 1756, 1758, 1759 formed in an upper surface of the valve body 1790 may be considered as lower portions of a valve chamber while an upper portion 2157 of the valve chamber is formed in a lower surface of the valve housing 2160 thereabove.

The exemplary valve 2100-1 may further comprise a first fluid conduit 1710 (typically an inlet) and a second fluid conduit 1714 (typically an outlet), both which conduits communicate fluid to the valve chamber upper and lower portions, a valve chamber sealing diaphragm 2170, and a control element moveable by deflection of the valve chamber sealing diaphragm 2170. The moveable control element may be additionally comprised of a control plate 2000-1 (further described below) that is affixed to the valve chamber sealing diaphragm 2170. In the illustration of FIGS. 21B-1 and 21D-1 the control plate 2000-1 may be mounted onto a stub 2183 projecting from the diaphragm 2170 and thereby suspended within the upper valve chamber portion 2157. The distance between the control plate 2000-1 and the valve chamber sealing diaphragm 2170 is minimized to reduce or eliminate sweep volume. Any suitable mounting method may be used such as press fit, swaging the head of the stub, a threaded fastener, welding, or similar design choices according to the desires of a practitioner, so long as the fluid passageways through the various control plate holes are not obscured. It should be appreciated that, rather than the control plate being mounted to the stub 2183 using a through hole 2052 as shown in FIGS. 21B-1 and FIG. 21D-1, a blind hole mounting may instead be used similar to what is depicted in FIGS. 9A-9D. In the design of the exemplary valve 2100-1, a first fluid conduit aperture 1712 provides fluid communication between the inner valve chamber portion 1759 and the first fluid conduit 1710. Similarly, a second fluid conduit aperture 1716 shaped as a curved slot provides fluid communication between the first intermediate valve chamber portion 1756 and the second fluid conduit 1714. Also provided is a third inner fluid conduit aperture 1718 shaped as a curved slot which provides fluid communication between the third intermediate valve chamber portion 1752 and the second fluid conduit 1714. In the present illustration of FIGS. 21A-1-21D-1, the valve 2100 is completely closed in a shut-off no-flow condition so the control plate 2000-1 is shown contacting all four orifice ridges: largest 1720, first smaller 1721, second smaller 1722, and smallest 1723. Designers will appreciate the first fluid conduit 1710 and second fluid conduit 1714 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 1790 may be used with a Hastelloy® nickel alloy control plate 1800-1 and an Elgiloy® cobalt alloy sealing diaphragm 1970. Alternatively, the valve body, sealing diaphragm, and control plate body, may all be made from the same stainless steel alloy. [154] Another example of a flow-through control plate 2000-1 illustrated in FIGS. 20A-1-20D-1 comprises a control plate body 2040 formed as a basically circular disk having a first side 2071-1 and an opposed second side 2072, axially separated by a circumferential perimeter 2050 of the control plate body 2040, and a polymer insert. One or more holes or features are formed in the circumferential perimeter 2050 and opposed sides of the control plate body 2040. Those holes may include a central mounting hole 2052 (blind or through) in the second side 2072, one or more axial pillar holes 2060-1, 2061 extending from the first side 2071-1 to the second side 2072, one or more radial lock holes 2057-1, 2059-1 extending from the circumferential perimeter 2050 into corresponding pillar holes, a centered counterbore 2042 in the first side, and one or more radial holes 2054-1, 20561, 2058-1 which provide fluid communication from the counterbore 2042 to the circumferential perimeter 2050.

A representative polymeric insert illustrated in FIGS. 20A-1-20D-1 may have specific features formed as a consequence of being compression molded into openings within the control plate body 2040. For example, the insert may include a plurality of pillars 2030-1, 2031-1 that are each received into corresponding pillar holes 2060-1, 2061 in the control plate body 2040 due to a molding process. A typical compression molding process starts with polychlorotrifluoroethylene (PCTFE) powder filling the control plate body openings 2057-1, 2059-1, 2060-1, 2061 and then polymerizes the powder under the effect of heat and pressure applied directly into the control plate body 2040 by known methods. The representative polymer insert has a plurality of polymer pillars 2030-1, 2031-1 formed into corresponding pillar holes 2060-1, 2061 and mating plugs 2032-1, 2034-1 in the corresponding lock holes 2057-1, 2059-1 while also being interconnected by a contiguous relatively thin polymer insert disk 2070 which covers the first side 2071-1 of the control plate body 2040. The polymer plugs 2032-1, 2034-1 lock the polymer insert firmly within the control plate body 2040. The polymer insert disk 2070 has a first side 2073-1 that is planar and facing toward the orifice ridges in a valve body as further explained with respect to a representative valve 2100 illustrated in FIGS. 21A-1-21D-1 described below. One or more axial thru-holes 2046-1, 2047-1 pierce the corresponding polymer pillars 2030-1, 2031-1 and constitute fluid passageways through which fluid may pass from the first side 2073-1 of the polymer insert disk 2070 to the opposite second side 2072 of the control plate body 2040 without need to transit around the circumferential perimeter 2050. The thin polymer insert disk 2070 is pierced by a centered hole 2044 approximately the same diameter and aligned with the centered counterbore 2042.

As illustrated in FIGS. 21B-1 and FIG. 21D-1, the diameter of the centered hole 2044 is chosen so as to create a continuous uninterrupted first surface region 2041-1, on the lower flat first side 2073-1 of the polymer insert disk 2070, such that the first surface region 2041-1 has radial extent sufficient to span between contacting the second smaller orifice ridge 1722 and the smallest orifice ridge 1723 while covering the entire third intermediate valve chamber portion 1752. The one or more axial thru-holes 2046-1, 2047-1 typically are uniformly spaced around a constant diameter circle further surrounding the first surface region 2041-1. In some embodiments, the axial thru-holes 2046-1, 2047-1 extend substantially straight through the one or more polymer pillars 2030-1, 2031-1 and thin polymer insert disk 2070. The diameter of the constant diameter circle and diameter of the axial thru-holes 2046-1, 2047-1 are chosen so those axial thru-holes only cover the second intermediate valve chamber portion 1754 and do not overlap the adjacent first smaller orifice ridge 1721 nor the second smaller orifice ridge 1722. More particularly, the axial thru-holes 2046-1, 2047-1 fluidly connect the intermediate valve chamber portion 1754 with the upper valve chamber portion 2157. Solid material of the control plate body 2040 provides additional mechanical support for the polymer insert disk 2070 that spans from the first surface region 2041-1 to a continuous uninterrupted second surface region 2043-1, on the lower flat first side 2073-1 of the polymer insert disk 2070, that second surface region 2043-1 having radial extent sufficient to span between contacting the largest orifice ridge 1720 and first smaller orifice ridge 1721 while covering the entire first intermediate valve chamber portion 1756.

The manner of the exemplary valve 2100-1 controlling fluid flow may be further understood by considering the inner valve chamber portion 1759 surrounded by the smallest orifice ridge 1723, being fed by the first fluid conduit aperture 1712 in fluid communication with the first fluid conduit 1710, whereby at least a portion of the control plate 2000-1 may be moved toward or away from the smallest orifice ridge 1723 to create a first control gap (not shown) through which a first fluid portion may controllably flow. The controllable first fluid portion may transit directly into the third intermediate valve chamber portion 1752 from whence it may exit through the third inner fluid conduit aperture 1718 in fluid communication with the second fluid conduit 1714. A second fluid portion may transit from the inner valve chamber portion 1759 upward via the centered hole 2044 into the control plate counterbore 2042 and the radial holes 2054-1, 2056-1, 2058-1 past the circumferential perimeter 2050 into the upper portion 2157 of the valve chamber, and therefrom transit downward through the axial thru-holes 2046-1, 2047-1 into the second intermediate valve chamber portion 1754. Moving at least a portion of the control plate 2000-1 toward or away from the second smaller orifice ridge 1722 will create a second control gap (not shown) through which the second fluid portion may also controllably flow directly into the third intermediate valve chamber portion 1752 from the second intermediate valve chamber portion 1754 and then exit through the third inner fluid conduit aperture 1718 in fluid communication with the second fluid conduit 1714. In the present example valve 2100-1, an actuator (not shown) may apply a force to the control shaft 2182 to deflect the diaphragm 2170, which will move the affixed control plate 2000-1, and thereby modulate the conductance through the valve 2100 by changing the first control gap and the second control gap.

Simultaneous with the preceding described flow of the first fluid portion and second fluid portion, moving at least a portion of the control plate 2000-1 toward or away from the largest orifice ridge 1720 similarly creates a third control gap (not shown) through which a third fluid portion may controllably flow. The controllable third fluid portion may transit from the inner valve chamber portion 1759 upward through the centered hole 2044 into the control plate counterbore 2042 and the radial holes 2054-1, 2056-1, 2058-1 past the circumferential perimeter 2050 and sweep through the upper valve chamber portion 2157 into the outer valve chamber portion 1758 from whence the third fluid portion may exit through the third control gap into the first intermediate valve chamber portion 1756. Upon reaching the first intermediate valve chamber portion 1756 the controllable third fluid portion may exit through the second fluid conduit aperture 1716 in fluid communication with the second fluid conduit 1714. A fourth fluid portion may transit from the inner valve chamber portion 1759 upward through the centered hole 2044 into control plate counterbore 2042 and the radial holes 2054-1, 2056-1, 2058-1 past the circumferential perimeter 2050 into the upper valve chamber portion 2157, and therefrom transit downward through the one or more axial thru-holes 2046-1, 2047-1 into the second intermediate valve chamber portion 1754. Moving at least a portion of the control plate 2000-1 toward or away from the first smaller orifice ridge 1721 will create a fourth control gap (not shown) through which the fourth fluid portion may also controllably flow directly into the first intermediate valve chamber portion 1756 from whence it may exit through the second inner fluid conduit aperture 1716 in fluid communication with the second fluid conduit 1714. Thus in the present example valve 2100-1, the actuator (not shown) applying a force to the control shaft 2182 and deflecting the diaphragm 2170 thereby additionally modulates the conductance through the valve 2100 by changing the third control gap and the fourth control gap. It should be appreciated that while the valve 2100 is closed, fluid may pass through the axial and radial holes in the control plate 2000-1 and into the upper portion 2157 of the valve chamber, the outer valve chamber portion 1758 and the second intermediate valve chamber portion 1754, but cannot go further. Thus, when the valve 2100 is closed, fluid cannot pass from the first fluid conduit 1710 to the second fluid conduit 1714.

Designers may appreciate the largest 1720 and first smaller 1721 orifice ridges need merely be nested rather than exactly concentric; moreover, the nested pair of orifice ridges 1220,1221 may be placed asymmetrically with respect to the shape and dimensions of the lower valve chamber. The flow-through control plate 2000-1 of course primarily needs to have a continuous uninterrupted second surface region 2043-1, on the lower first side 2073-1 of the polymer insert disk 2070, sufficient to span between contacting the largest 1720 and first smaller 1721 orifice ridges and cover the entire first intermediate valve chamber portion 1756. In similar fashion the second smaller 1722 and smallest 1723 orifice ridges need merely be nested rather than exactly concentric; moreover, the nested pair of orifice ridges 1722, 1723 may be placed asymmetrically with respect to the shape and dimensions of the lower valve chamber. The flow-through control plate 2000-1 of course primarily needs to have a continuous uninterrupted first surface region 2041-1, on the lower first side 2073-1 of the polymer insert disk 2070, sufficient to span between contacting the second smaller 1722 and smallest 1723 orifice ridges and cover the entire third intermediate valve chamber portion 1752. Designers will also appreciate the described directions of fluid flow, progressing from the first fluid conduit 1710 to the second fluid conduit 1714, are used for convenience and clarity but are not limiting. Fluid may flow in an opposite direction, from the second fluid conduit 1714 to the first fluid conduit 1710, and the complete valve chamber will still be beneficially swept by the controllable fluid flow. The valve design illustrated in FIGS. 21A-1-21D-1 substantially eliminates any concerns about internal dead space versus swept volumes and may also improve dynamic response of the exemplary valve design. The flow-through control plate enables the use of nested orifice ridges 1720,1721,1722,1723 that together create total control gap length about triple the circumference of a single large orifice while substantially reducing the area which must be closed to achieve shut-off. This combination provides high-conductance with low closing force and the inclusion of the relatively soft polymer insert will further improve shut-off tightness of the valve 2100-1.

Yet another example of a flow-through control plate 1800-2 illustrated in FIGS. 18A-2-18D-2 comprises a control plate body 1840 formed as a basically circular disk having a first side 1871 and an opposed second side 1872 axially separated by a circumferential perimeter 1850 of the control plate body 1840. One or more holes or features are formed in the circumferential perimeter 1850 and opposed sides of the disk. Those holes may include a central mounting hole 1848 (blind or through) in the second side 1872, a counterbore 1842 in the first side, one or more radial holes 1854-2, 1856-2, 1858-2 which provide fluid communication from the counterbore 1842 to the circumferential perimeter 1850, and one or more axial holes 1846-2, 1847-2 which provide fluid communication from the first side 1871 to a respective radial hole. As illustrated in FIGS. 19A-2-19D-2, the control plate 1800-2 may be mounted onto a stub 1983 projecting from the diaphragm 1970 and thereby suspended within the upper valve chamber portion 1957. Any suitable mounting method may be used such as press fit, swaging the head of the stub, a threaded fastener, welding, or similar design choices according to the desires of a practitioner, so long as the fluid passageways formed by the axial holes 1846-2, 1847-2 are not obscured. It should be appreciated that, rather than the control plate 1800-2 being mounted to the stub 1983 using a blind hole as shown in FIGS. 9A-9D, a through hole mounting may instead be used as depicted in FIGS. 2A-2D, 3A-3D, and 7A-7F.

The one or more axial holes 1846-2, 1847-2 are formed in the control plate body 1840 and typically are uniformly spaced around a constant diameter first circle surrounding the central mounting hole 1848. The diameter of the first circle and diameter of the axial holes 1846-2, 1847-2 are chosen so those axial holes only cover the second intermediate valve chamber portion 1754 and do not overlap the adjacent first smaller orifice ridge 721 nor the second smaller orifice ridge 1722. The axial holes 1846-2, 1847-2 constitute fluid passageways through which fluid may pass from the first side 1871 of the control plate body 1840 to the radial holes 1854-2, 1856-2,1858-2. More particularly, the axial holes 1846-2, 1847-2 fluidly connect the second intermediate valve chamber portion 1754 with the upper valve chamber portion 1957 via the respective radial holes. Solid material of the control plate body 1840 provides mechanical connection from the central mounting hole 1848 to a continuous uninterrupted first surface region 1841, on the first side 1871 of the disk shaped control plate body 1840, that first surface region 1841 having radial extent sufficient to span between contacting the second smaller orifice ridge 1722 and the smallest orifice ridge 1723 while covering the entire third intermediate valve chamber portion 1752. Solid portions 1861, 1862 of the control plate body 1840 between the one or more adjacent axial holes 1846-2, 1847-2 provide mechanical connection from the central mounting hole 1848 to a continuous uninterrupted second surface region 1843, on the first side 1871 of the disk shaped control plate body 1840, that second surface region 1843 having radial extent sufficient to span between contacting the largest orifice ridge 1720 and the first smaller orifice ridge 1721 while covering the entire first intermediate valve chamber portion 1756.

A central counterbore 1842 is formed in the first side 1871 of the control plate body 1840 projecting into the body toward the opposed second side 1872. One or more radial holes 1854-2, 1856-2, 1858-2 extend from the counterbore 1842 through the control plate body 1840 creating fluid passageways connecting to the circumferential perimeter 1850. The radial holes 1854-2, 1856-2, 1858-2 are typically formed at equal angles thereby resulting in uniform spacing around the circumferential perimeter 1850 alternating with solid regions 1855, 1857, 1859 between the holes. It should be appreciated the depth of the central counterbore 1842 may be varied but must be greater than the penetrating radial holes 1854-2, 1856-2, 1858-2. The counterbore diameter must be less than the inside diameter of the smallest orifice ridge 1723 to ensure the continuous uninterrupted first surface region 1841 seals the third intermediate valve chamber portion 1752 when the valve 1900-2 is in the illustrated closed condition. The counterbore 1842 may intersect the central mounting hole 1848, or may not (blind mounting hole), and may be of same or different diameter.

The manner of the exemplary valve 1900-2 controlling fluid flow may be further understood by considering the inner valve chamber portion 1759 surrounded by the smallest orifice ridge 1723, being fed by the first fluid conduit aperture 1712 in fluid communication with the first fluid conduit 1710, whereby at least a portion of the control plate 1800-2 may be moved toward or away from the smallest orifice ridge 1723 to create a first control gap (not shown) through which a first fluid portion may controllably flow. The controllable first fluid portion may transit directly into the third intermediate valve chamber portion 1752 from whence it may exit through the third inner fluid conduit aperture 1718 in fluid communication with the second fluid conduit 1714. A second fluid portion may transit from the inner valve chamber portion 1759 upward via the control plate counterbore 1842 and the radial holes 1854-2, 1856-2, 1858-2 past the circumferential perimeter 1850 into the upper portion 1957 of the valve chamber, and transit downward through the axial thru-holes 1846-2, 1847-2 into the second intermediate valve chamber portion 1754. Moving at least a portion of the control plate 1800-2 toward or away from the second smaller orifice ridge 1722 will create a second control gap (not shown) through which the second fluid portion may also controllably flow directly into the third intermediate valve chamber portion 1752 from the second intermediate valve chamber portion 1754 and then exit through the third inner fluid conduit aperture 1718 in fluid communication with the second fluid conduit 1714. In the present example valve 1900-2, an actuator (not shown) may apply a force to the control shaft 1982 to deflect the diaphragm 1970, which will move the affixed control plate 1800-2, and thereby modulate the conductance through the valve 1900 by changing the first control gap and the second control gap.

Simultaneous with the preceding described flow of the first fluid portion and second fluid portion, moving at least a portion of the control plate 1800-2 toward or away from the largest orifice ridge 1720 similarly creates a third control gap (not shown) through which a third fluid portion may controllably flow. The controllable third fluid portion may transit from the inner valve chamber portion 1759 upward through the control plate counterbore 1842 and the radial holes 1854-2, 1856-2, 1858-2 past the circumferential perimeter 1850 and sweep through the upper valve chamber portion 1957 into the outer valve chamber portion 1758 from whence the third fluid portion may exit through the third control gap into the first intermediate valve chamber portion 1756. Upon reaching the first intermediate valve chamber portion 1756 the controllable third fluid portion may exit through the second fluid conduit aperture 1716 in fluid communication with the second fluid conduit 1714. A fourth fluid portion may transit from the inner valve chamber portion 1759 upward through the control plate counterbore 1742 and the radial holes 1854-2, 1856-2, 1858-2 past the circumferential perimeter 1850 into the upper valve chamber portion 1957 and downward through the one or more axil thru-holes 1846-2, 1847-2 into the second intermediate valve chamber portion 1754. Moving at least a portion of the control plate 1800-2 toward or away from the first smaller orifice ridge 1721 will create a fourth control gap (not shown) through which the fourth fluid portion may also controllably flow directly into the first intermediate valve chamber portion 1756 from whence it may exit through the second inner fluid conduit aperture 1716 in fluid communication with the second fluid conduit 1714. Thus in the present example valve 1900-2, the actuator (not shown) applying a force to the control shaft 1982 and deflecting the diaphragm 1970 thereby additionally modulates the conductance through the valve 1900 by changing the third control gap and the fourth control gap. It should be appreciated that while the valve 1900 is closed, fluid may pass through the axial and radial holes in the control plate 1800-2 and into the upper portion 1957 of the valve chamber, the outer valve chamber portion 1758 and the second intermediate valve chamber portion 1754, but cannot go further. Thus, when the valve 1900 is closed, fluid cannot pass from the first fluid conduit 1710 to the second fluid conduit 1714.

Designers may appreciate the largest 1720 and first smaller 1721 orifice ridges need merely be nested rather than exactly concentric; moreover, the nested pair of orifice ridges 1220,1221 may be placed asymmetrically with respect to the shape and dimensions of the lower valve chamber. The flow-through control plate 1800-2 of course primarily needs to have a continuous uninterrupted second surface region 1843, on the lower first side 1871 of the disk shaped body 1840, sufficient to span between contacting the largest 1720 and first smaller 1721 orifice ridges and cover the entire first intermediate valve chamber portion 1756. In similar fashion the second smaller 1722 and smallest 1723 orifice ridges need merely be nested rather than exactly concentric; moreover, the nested pair of orifice ridges 1722, 1723 may be placed asymmetrically with respect to the shape and dimensions of the lower valve chamber. The flow-through control plate 1800-2 of course primarily needs to have a continuous uninterrupted first surface region 1841, on the lower first side 1871 of the disk shaped body 1840, sufficient to span between contacting the second smaller 1722 and smallest 1723 orifice ridges and cover the entire third intermediate valve chamber portion 1752. Designers will also appreciate the described directions of fluid flow, progressing from the first fluid conduit 1710 to the second fluid conduit 1714, are used for convenience and clarity but are not limiting. Fluid may flow in an opposite direction, from the second fluid conduit 1714 to the first fluid conduit 1710, and the complete valve chamber will still be beneficially swept by the controllable fluid flow. The valve design illustrated in FIGS. 19A-2-19D-2 substantially eliminates any concerns about internal dead space versus swept volumes and may also improve dynamic response of the exemplary valve design. The flow-through control plate enables the use of nested orifice ridges 1720,1721,1722, 1723 that together create total control gap length about triple the circumference of a single large orifice while substantially reducing the area which must be closed to achieve shut-off. This combination provides high-conductance with low closing force.

Another exemplary valve assembly 2100-2 may have a topworks including a valve housing 2160 removably joined to the valve body 1790, by deforming a metallic gasket 2165, as a leak-free assembly further illustrated in FIGS. 21A-2-21D-2. The topworks may include an actuator (not shown) chosen for a specific application. For example, a manual or solenoid actuator might be used for a simple on-off high-conductance valve, but a piezoelectric actuator might be used for a proportional control high-conductance valve adapted to a mass flow controller electronics system. Open cavities 1752, 1754, 1756, 1758, 1759 formed in an upper surface of the valve body 1790 may be considered as lower portions of a valve chamber while an upper portion 2157 of the valve chamber is formed in a lower surface of the valve housing 2160 thereabove.

The exemplary valve 2100-2 may further comprise a first fluid conduit 1710 (typically an inlet) and a second fluid conduit 1714 (typically an outlet), both which conduits communicate fluid to the valve chamber upper and lower portions, a valve chamber sealing diaphragm 2170, and a control element moveable by deflection of the valve chamber sealing diaphragm 2170. The moveable control element may be additionally comprised of a control plate 2000-2 (further described below) that is affixed to the valve chamber sealing diaphragm 2170. In the illustration of FIGS. 21B-2 and 21D-2 the control plate 2000-2 may be mounted onto a stub 2183 projecting from the diaphragm 2170 and thereby suspended within the upper valve chamber portion 2157. The distance between the control plate 2000-2 and the valve chamber sealing diaphragm 2170 is minimized to reduce or eliminate sweep volume. Any suitable mounting method may be used such as press fit, swaging the head of the stub, a threaded fastener, welding, or similar design choices according to the desires of a practitioner, so long as the fluid passageways through the various control plate holes are not obscured. It should be appreciated that, rather than the control plate being mounted to the stub 2183 using a through hole 2052 as shown in FIGS. 21B-2 and FIG. 21D-2, a blind hole mounting may instead be used similar to what is depicted in FIGS. 9A-9D. In the design of the exemplary valve 2100-2, a first fluid conduit aperture 1712 provides fluid communication between the inner valve chamber portion 1759 and the first fluid conduit 1710. Similarly, a second fluid conduit aperture 1716 shaped as a curved slot provides fluid communication between the first intermediate valve chamber portion 1756 and the second fluid conduit 1714. Also provided is a third inner fluid conduit aperture 1718 shaped as a curved slot which provides fluid communication between the third intermediate valve chamber portion 1752 and the second fluid conduit 1714. In the present illustration of FIGS. 21A-2-21D-2, the valve 2100 is completely closed in a shut-off no-flow condition so the control plate 2000-2 is shown contacting all four orifice ridges: largest 1720, first smaller 1721, second smaller 1722, and smallest 1723. Designers will appreciate the first fluid conduit 1710 and second fluid conduit 1714 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 1790 may be used with a Hastelloy® nickel alloy control plate 1800-2 and an Elgiloy® cobalt alloy sealing diaphragm 1970. Alternatively, the valve body, sealing diaphragm, and control plate body, may all be made from the same stainless steel alloy.

Another example of a flow-through control plate 2000-2 illustrated in FIGS. 20A-2-20D2 comprises a control plate body 2040 formed as a basically circular disk having a first side 2071-2 and an opposed second side 2072, axially separated by a circumferential perimeter 2050 of the control plate body 2040, and a polymer insert. One or more holes or features are formed in the circumferential perimeter 2050 and opposed sides of the control plate body 2040. Those holes may include a central mounting hole 2052 (blind or through) in the second side 2072, one or more axial pillar holes 2060-2, 2061 extending from the first side 2071-2 to the second side 2072, one or more radial lock holes 2057-2, 2059-2 extending from the circumferential perimeter 2050 into corresponding pillar holes, a centered counterbore 2042 in the first side, and one or more radial holes 2054-2, 2056-2, 2058-2 which provide fluid communication from the counterbore 2042 to the circumferential perimeter 2050.

A representative polymeric insert illustrated in FIGS. 20A-2-20D-2 may have specific features formed as a consequence of being compression molded into openings within the control plate body 2040. For example, the insert may include a plurality of pillars 2030-2, 2031-2 that are each received into corresponding pillar holes 2060-2, 2061 in the control plate body 2040 due to a molding process. A typical compression molding process starts with polychlorotrifluoroethylene (PCTFE) powder filling the control plate body openings 2057-2, 2059-2, 2060-2, 2061 and then polymerizes the powder under the effect of heat and pressure applied directly into the control plate body 2040 by known methods. The representative polymer insert has a plurality of polymer pillars 2030-2, 2031-2 formed into corresponding pillar holes 2060-2, 2061 and mating plugs 2032-2, 2034-2 in the corresponding lock holes 2057-2, 2059-2 while also being interconnected by a contiguous relatively thin polymer insert disk 2070 which covers the first side 2071-2 of the control plate body 2040. The polymer plugs 2032-2, 2034-2 lock the polymer insert firmly within the control plate body 2040. The polymer insert disk 2070 has a first side 2073-2 that is planar and facing toward the orifice ridges in a valve body as further explained with respect to a representative valve 2100 illustrated in FIGS. 21A-2-21D-2 described below. One or more axial holes 2046-2 pierce the first side 2073-2 of the polymer insert disk 2070 and into the one or more radial holes 2054-2, 2056-2, 2058-2 and constitute fluid passageways through which fluid may pass from the first side 2073-2 of the polymer insert disk 2070 to the opposite second side 2072 of the control plate body 2040 by channeling the fluid around the circumferential perimeter 2050. The thin polymer insert disk 2070 is pierced by a centered hole 2044 approximately the same diameter and aligned with the centered counterbore 2042.

As illustrated in FIGS. 21B-2 and FIG. 21D-2, the diameter of the centered hole 2044 is chosen so as to create a continuous uninterrupted first surface region 2041-2, on the lower flat first side 2073-2 of the polymer insert disk 2070, such that the first surface region 2041-2 has radial extent sufficient to span between contacting the second smaller orifice ridge 1722 and the smallest orifice ridge 1723 while covering the entire third intermediate valve chamber portion 1752. The one or more axial holes 2046-2 typically are uniformly spaced around a constant diameter circle further surrounding the first surface region 2041-2. In some embodiments, the one or more axial holes 2046-2 extend substantially straight through the first side 2073-2 of the thin polymer insert disk 2070 and into the one or radial holes 2054-2, 2056-2, 2058-2. The diameter of the constant diameter circle and diameter of the one or more axial holes 2046-2 are chosen so those axial holes only cover the second intermediate valve chamber portion 1754 and do not overlap the adjacent first smaller orifice ridge 1721 nor the second smaller orifice ridge 1722. More particularly, the one or more axial holes 2046-2, 2047 fluidly connect the intermediate valve chamber portion 1754 with the upper valve chamber portion 2157. Solid material of the control plate body 2040 provides additional mechanical support for the polymer insert disk 2070 that spans from the first surface region 2041-2 to a continuous uninterrupted second surface region 2043-2, on the lower flat first side 2073-2 of the polymer insert disk 2070, that second surface region 2043-2 having radial extent sufficient to span between contacting the largest orifice ridge 1720 and first smaller orifice ridge 1721 while covering the entire first intermediate valve chamber portion 1756.

The manner of the exemplary valve 2100-2 controlling fluid flow may be further understood by considering the inner valve chamber portion 1759 surrounded by the smallest orifice ridge 1723, being fed by the first fluid conduit aperture 1712 in fluid communication with the first fluid conduit 1710, whereby at least a portion of the control plate 2000-2 may be moved toward or away from the smallest orifice ridge 1723 to create a first control gap (not shown) through which a first fluid portion may controllably flow.

The controllable first fluid portion may transit directly into the third intermediate valve chamber portion 1752 from whence it may exit through the third inner fluid conduit aperture 1718 in fluid communication with the second fluid conduit 1714. A second fluid portion may transit from the inner valve chamber portion 1759 upward via the centered hole 2044 into the control plate counterbore 2042 and the radial holes 2054-2, 2056-2, 2058-2 past the circumferential perimeter 2050 into the upper portion 2157 of the valve chamber, and transit downward through the at least one axial holes 2046-2 from the radial holes 2054-2, 2056-2, 2058-2 into the second intermediate valve chamber portion 1754. Moving at least a portion of the control plate 2000-2 toward or away from the second smaller orifice ridge 1722 will create a second control gap (not shown) through which the second fluid portion may also controllably flow directly into the third intermediate valve chamber portion 1752 from the second intermediate valve chamber portion 1754 and then exit through the third inner fluid conduit aperture 1718 in fluid communication with the second fluid conduit 1714. In the present example valve 2100-2, an actuator (not shown) may apply a force to the control shaft 2182 to deflect the diaphragm 2170, which will move the affixed control plate 2000-2, and thereby modulate the conductance through the valve 2100-2 by changing the first control gap and the second control gap.

Simultaneous with the preceding described flow of the first fluid portion and second fluid portion, moving at least a portion of the control plate 2000-2 toward or away from the largest orifice ridge 1720 similarly creates a third control gap (not shown) through which a third fluid portion may controllably flow. The controllable third fluid portion may transit from the inner valve chamber portion 1759 upward through the centered hole 2044 into the control plate counterbore 2042 and the radial holes 2054-2, 2056-2, 2058-2 past the circumferential perimeter 2050 and sweep through the upper valve chamber portion 2157 into the outer valve chamber portion 1758 from whence the third fluid portion may exit through the third control gap into the first intermediate valve chamber portion 1756. Upon reaching the first intermediate valve chamber portion 1756 the controllable third fluid portion may exit through the second fluid conduit aperture 1716 in fluid communication with the second fluid conduit 1714. A fourth fluid portion may transit from the inner valve chamber portion 1759 upward through the centered hole 2044 into control plate counterbore 2042 and the radial holes 2054-2, 2056-2, 2058-2 past the circumferential perimeter 2050 into the upper valve chamber portion 2157, and transit downward through the one or more axial holes 2046-2 from the radial holes 2054-2, 2056-2, 2058-2 into the second intermediate valve chamber portion 1754. Moving at least a portion of the control plate 2000-2 toward or away from the first smaller orifice ridge 1721 will create a fourth control gap (not shown) through which the fourth fluid portion may also controllably flow directly into the first intermediate valve chamber portion 1756 from whence it may exit through the second inner fluid conduit aperture 1716 in fluid communication with the second fluid conduit 1714. Thus in the present example valve 2100-2, the actuator (not shown) applying a force to the control shaft 2182 and deflecting the diaphragm 2170 thereby additionally modulates the conductance through the valve 2100 by changing the third control gap and the fourth control gap. It should be appreciated that while the valve 2100 is closed, fluid may pass through the axial and radial holes in the control plate 2000-2 and into the upper portion 2157 of the valve chamber, the outer valve chamber portion 1758 and the second intermediate valve chamber portion 1754, but cannot go further. Thus, when the valve 2100 is closed, fluid cannot pass from the first fluid conduit 1710 to the second fluid conduit 1714.

Designers may appreciate the largest 1720 and first smaller 1721 orifice ridges need merely be nested rather than exactly concentric; moreover, the nested pair of orifice ridges 1220,1221 may be placed asymmetrically with respect to the shape and dimensions of the lower valve chamber. The flow-through control plate 2000-2 of course primarily needs to have a continuous uninterrupted second surface region 2043-2, on the lower first side 2073-2 of the polymer insert disk 2070, sufficient to span between contacting the largest 1720 and first smaller 1721 orifice ridges and cover the entire first intermediate valve chamber portion 1756. In similar fashion the second smaller 1722 and smallest 1723 orifice ridges need merely be nested rather than exactly concentric; moreover, the nested pair of orifice ridges 1722, 1723 may be placed asymmetrically with respect to the shape and dimensions of the lower valve chamber. The flow-through control plate 2000-2 of course primarily needs to have a continuous uninterrupted first surface region 2041-2, on the lower first side 2073-2 of the polymer insert disk 2070, sufficient to span between contacting the second smaller 1722 and smallest 1723 orifice ridges and cover the entire third intermediate valve chamber portion 1752. Designers will also appreciate the described directions of fluid flow, progressing from the first fluid conduit 1710 to the second fluid conduit 1714, are used for convenience and clarity but are not limiting. Fluid may flow in an opposite direction, from the second fluid conduit 1714 to the first fluid conduit 1710, and the complete valve chamber will still be beneficially swept by the controllable fluid flow. The valve design illustrated in FIGS. 21A-2-21D-2 substantially eliminates any concerns about internal dead space versus swept volumes and may also improve dynamic response of the exemplary valve design. The flow-through control plate enables the use of nested orifice ridges 1720,1721,1722,1723 that together create total control gap length about triple the circumference of a single large orifice while substantially reducing the area which must be closed to achieve shut-off. This combination provides high-conductance with low closing force and the inclusion of the relatively soft polymer insert will further improve shut-off tightness of the valve 2100.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A control plate for a high-conductance valve comprising:

a control plate body formed as a disk having a flat side and an opposed side opposite the flat side, the control plate configured to be moved within a valve by an actuator, the flat side having a continuous uninterrupted flat portion to shut-off fluid flow in the valve, the control plate body further comprises a spherical pocket extending inward from the flat side, the plurality of angled fluid flow paths extending through the control plate body from the pocket; and a plurality of angled fluid flow paths in the control plate body providing fluid communication from the flat side to the opposed side, wherein a linear portion of the plurality of angled fluid flow paths extends in both radial and axial directions through the control plate body.

2. The control plate as defined in claim 1, wherein a surface of the pocket is orthogonal to a direction of the angled fluid flow paths at the location at which the corresponding angled fluid flow path intersects the pocket.

3. A control plate for a high-conductance valve comprising:
   a control plate body formed as a disk having a flat side and an opposed side opposite the flat side, the control plate configured to be moved within a valve by an actuator, the flat side having a continuous uninterrupted flat portion to shut-off fluid flow in the valve, the control plate body further comprises a pocket extending inward from the flat side, the plurality of angled fluid flow paths extending through the control plate body from the pocket, wherein the control plate body further comprises a through-hole extending from the opposed side to the pocket; and
   a plurality of angled fluid flow paths in the control plate body providing fluid communication from the flat side to the opposed side, wherein a linear portion of the plurality of angled fluid flow paths extends in both radial and axial directions through the control plate body.

4. The control plate as defined in claim 3, wherein the control plate is mounted on a stub suspended beneath a diaphragm.

5. The control plate as defined in claim 4, wherein the distance between the control plate and the diaphragm is minimized to reduce sweep volume.

6. A valve assembly comprising:
   a valve body having a valve chamber and at least one pair of adjacent orifice ridge segments defining a first valve chamber portion between the at least one pair of adjacent orifice ridge segments;
   a control plate body formed as a disk having a flat side and an opposed side opposite the flat side, the control plate configured to be moved within a valve by an actuator, the flat side having a continuous uninterrupted flat portion to shut-off fluid flow in the valve, wherein the control plate body further comprises a spherical pocket extending inward from the flat side, the plurality of angled fluid flow paths extending through the control plate body from the pocket; and
   a plurality of angled fluid flow paths in the control plate body providing fluid communication from the flat side to the opposed side, wherein a linear portion of the plurality of angled fluid flow paths extends in both radial and axial directions through the control plate body;
   wherein the angled fluid flow paths provide fluid communication between the opposed side and the first valve chamber portion, the first valve chamber portion in fluid communication with a fluid conduit.

7. The valve assembly as defined in claim 6, wherein a surface of the pocket is orthogonal to a direction of the angled fluid flow paths at the location at which the corresponding angled fluid flow path intersects the pocket.

8. The valve assembly as defined in claim 6, further comprising an actuator configured to adjust a position of the control plate to fluidly couple the valve chamber to the fluid conduit at least partially through the angled fluid flow paths.

9. A valve assembly comprising:
   a valve body having a valve chamber and at least one pair of adjacent orifice ridge segments defining a first valve chamber portion between the at least one pair of adjacent orifice ridge segments;
   a control plate body formed as a disk having a flat side and an opposed side opposite the flat side, the control plate configured to be moved within a valve by an actuator, the flat side having a continuous uninterrupted flat portion to shut-off fluid flow in the valve, wherein the control plate body further comprises a pocket extending inward from the flat side, the plurality of angled fluid flow paths extending through the control plate body from the pocket and a through-hole extending from the opposed side to the pocket; and
   a plurality of angled fluid flow paths in the control plate body providing fluid communication from the flat side to the opposed side, wherein a linear portion of the plurality of angled fluid flow paths extends in both radial and axial directions through the control plate body;
   wherein the angled fluid flow paths provide fluid communication between the opposed side and the first valve chamber portion, the first valve chamber portion in fluid communication with a fluid conduit.

10. The valve assembly as defined in claim 9, further comprising a stub and a diaphragm, wherein the control plate is mounted on the stub suspended beneath the diaphragm.

11. The valve assembly as defined in claim 10, wherein the distance between the control plate and the diaphragm is minimized to reduce sweep volume.

* * * * *